US010643772B2

(12) United States Patent
Morita

(10) Patent No.: US 10,643,772 B2
(45) Date of Patent: May 5, 2020

(54) OXIDE SUPERCONDUCTING BULK MAGNET

(71) Applicant: NIPPON STEEL & SUMITOMO METAL CORPORATION, Tokyo (JP)

(72) Inventor: Mitsuru Morita, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 321 days.

(21) Appl. No.: 15/545,170

(22) PCT Filed: Jan. 21, 2016

(86) PCT No.: PCT/JP2016/051745

§ 371 (c)(1), (2) Date: Jul. 20, 2017

(87) PCT Pub. No.: WO2016/117658

PCT Pub. Date: Jul. 28, 2016

(65) Prior Publication Data

US 2018/0012690 A1 Jan. 11, 2018

(30) Foreign Application Priority Data

Jan. 21, 2015 (JP) ................................ 2015-009537
Jan. 21, 2015 (JP) ................................ 2015-009538

(Continued)

(51) Int. Cl.
*H01F 6/06* (2006.01)
*H01F 7/02* (2006.01)

(Continued)

(52) U.S. Cl.
CPC ................ *H01F 6/06* (2013.01); *C01G 1/00* (2013.01); *C01G 3/00* (2013.01); *H01B 12/00* (2013.01);

(Continued)

(58) Field of Classification Search
None
See application file for complete search history.

(56) References Cited

U.S. PATENT DOCUMENTS

2002/0000806 A1 1/2002 Nakamura et al.
2012/0231958 A1 9/2012 Morita et al.
2016/0155554 A1 6/2016 Morita et al.

FOREIGN PATENT DOCUMENTS

CN 1741203 A 3/2006
JP 10-310497 A 11/1998

(Continued)

OTHER PUBLICATIONS

Translation of JP 2012-214329 (Year: 2012).*

(Continued)

*Primary Examiner* — Paul A Wartalowicz
(74) *Attorney, Agent, or Firm* — Birch, Stewart, Kolasch & Birch, LLP

(57) ABSTRACT

An oxide superconducting bulk magnet able to prevent breakage of a superconducting bulk member and able to give a sufficient amount of total magnetic flux at a superconducting bulk member surface even under high magnetic field strength conditions, comprising an oxide superconducting bulk laminate formed from sheet-shaped oxide superconducting bulk members and high strength reinforcing members arranged between the stacked oxide superconducting bulk members, the outer circumference of the oxide superconducting bulk laminate being provided with an outer circumference reinforcing member.

26 Claims, 53 Drawing Sheets

100
111(110)
121(120)
113(110)
123(120)
115(110)
130

(30) Foreign Application Priority Data

Oct. 2, 2015 (JP) ................................ 2015-196575
Oct. 2, 2015 (JP) ................................ 2015-196576

(51) Int. Cl.
*H01B 12/00* (2006.01)
*C01G 3/00* (2006.01)
*H01F 6/00* (2006.01)
*C01G 1/00* (2006.01)
*H01F 1/053* (2006.01)
*H01F 1/10* (2006.01)

(52) U.S. Cl.
CPC ............... *H01F 1/053* (2013.01); *H01F 1/10* (2013.01); *H01F 6/00* (2013.01); *H01F 7/02* (2013.01); *Y02E 40/64* (2013.01)

(56) References Cited

FOREIGN PATENT DOCUMENTS

| | | | |
|---|---|---|---|
| JP | 11-284238 | A | 10/1999 |
| JP | 11-335120 | A | 12/1999 |
| JP | 2001-307916 | A | 11/2001 |
| JP | 2002-6021 | A | 1/2002 |
| JP | 2003-173719 | A | 6/2003 |
| JP | 2005-294471 | A | 10/2005 |
| JP | 2007-93059 | A | 4/2007 |
| JP | 2008-34692 | A | 2/2008 |
| JP | 2011-142303 | A | 7/2011 |
| JP | 2012-214329 | A | 11/2012 |
| JP | 2014-75522 | A | 4/2014 |
| JP | 2014-146760 | A | 8/2014 |
| WO | WO 2007/041532 | A2 | 4/2007 |
| WO | WO 2011/071071 | A1 | 6/2011 |
| WO | WO 2014/189043 | A1 | 11/2014 |

OTHER PUBLICATIONS

International Search Report for PCT/JP2016/051745 (PCT/ISA/210) dated Mar. 29, 2016.

Written Opinion of the International Searching Authority for PCT/JP2016/051745 (PCT/ISA/237) dated Mar. 29, 2016.

* cited by examiner 2200
2211(2210)
2212
2213
2214
2215
2216
2217
2218
2221(2220)
2222
2223
2224
2225
2226
2227
2228
2229
O
22311(22310)
22312
22313
22314
22315
22316
22317
22318
22300
22411(22410)
22412
22413
22414
22415
22416
22417
22418
22400

2230
2240
O
2221(2220)
2222
2223
2224
2225
2226
2227
2228
2229
2250
2211(2210)
2212
2213
2214
2215
2216
2217
2218

2230
2240
O
2290
2211(2210)
2212

OXIDE SUPERCONDUCTING BULK MAGNET

TECHNICAL FIELD

The present invention relates to an oxide superconducting bulk magnet having oxide superconducting bulk members and reinforcing members.

BACKGROUND ART

An oxide superconducting material comprising a single-crystal form $REBa_2Cu_3O_{7-x}$ (RE means rare earth element) phase in which a $RE_2BaCuO_5$ phase is dispersed has a high critical current density (below, also indicated as "$J_c$"), so is magnetized by cooling in a magnetic field or by pulse magnetization and can be used as a superconducting bulk magnet able to generate a strong magnetic field.

A superconducting bulk magnet has the excellent feature of being able to generate an extremely powerful magnetic field in a compact space, but since an extremely strong magnetic field is sealed in the compact space, a large electromagnetic stress acts inside an oxide superconducting bulk member. This electromagnetic stress acts so that the sealed-in magnetic field spreads, so is also called "hoop stress". In the case of a 5 to 10 T class strong magnetic field, the electromagnetic stress which acts sometimes exceeds the mechanical strength of the material of the superconducting bulk member itself. As a result, the oxide superconducting bulk member is liable to break. If the oxide superconducting bulk member breaks, the superconducting bulk member can no longer generate a strong magnetic field.

If possible to prevent breakage of a superconducting bulk member by electromagnetic stress, the features of a superconducting bulk magnet of compactness and a strong magnetic field can be expected to be made use of for help in improving the performance of the equipment and reducing the size and lightening the weight of equipment in applications utilizing magnets such as chemical transport systems utilizing small sized NMR (nuclear magnetic resonance) magnetic members or magnetic force.

To prevent breakage of a superconducting bulk member by electromagnetic stress, for example, PLT 1 proposes a superconducting bulk magnet configured by a circular columnar-shaped superconducting bulk member and a metal ring surrounding the same. By configuring the magnet in this way, at the time of cooling, a compressive stress due to the metal ring is applied to the superconducting bulk member. This compressive stress has the effect of reducing the electromagnetic stress, so it is possible to suppress breakage of the superconducting bulk member. In this way, PLT1 shows that it is possible to prevent breakage of a circular columnar-shaped superconducting bulk member.

In this regard, to use a general size (for example, diameter 40 to 100 mm or so) single-crystal form oxide superconducting material to generate a high strength magnetic field by magnetization, it is effective to make the single-crystal form oxide superconducting materials ring shaped and generate strong magnetic fields inside the ring. At this time, it is further effective to stack these rings with their inner circumferential and outer circumferential axes aligned.

In general, by working disk-shaped bulk materials into ring shapes, it is possible to utilize the relatively high strength, uniform magnetic fields at the insides of the rings. Due to this, application for NMR or MRI (magnetic resonance imaging) etc. where particularly high uniformity is demanded becomes possible.

Further, PLT 2 discloses a superconducting magnetic field generating device which is manufactured by combining seven hexagonal-shaped superconducting bulk members, arranging a reinforcing member comprising a fiber reinforced resin etc. around them, and further arranging a support member comprising stainless steel, aluminum, or other metal at an outer circumference thereof.

PLT 3 discloses an oxide superconducting bulk magnet obtained by stacking ring-shaped bulk superconducting members with thicknesses in the c-axial direction of the crystal axes of 0.3 to 15 mm.

Further, PLT 4 discloses a superconducting bulk magnet obtained by stacking a plurality of ring-shaped superconducting members reinforced at the outer circumferences and inner circumferences.

Furthermore, PLT 5 discloses a superconducting bulk magnet obtained by stacking superconducting members having multi-layer ring structures in the diametrical direction.

Further, PLT 6 discloses a bulk magnet comprised of a single bulk member reinforced at its outer circumference and top and bottom surfaces. PLT 7 discloses a bulk magnet having high temperature superconducting members placed inside a cup-shaped conductive member and having conductive members sandwiched between the plurality of high temperature superconducting members. However, in FIG. 3 of PLT 7, while the conductive members **17*b*** and high temperature superconducting members contact each other and transfer heat, the concept of reinforcement of the superconducting bulk members against the electromagnetic force is not shown.

CITATION LIST

Patent Literature

PLT 1: Japanese Patent Publication No. 11-335120A
PLT 2: Japanese Patent Publication No. 11-284238A
PLT 3: Japanese Patent Publication No. 10-310497A
PLT 4: Japanese Patent Publication No. 2014-75522
PLT 5: WO2011/071071A
PLT 6: Japanese Patent Publication No. 2014-146760A
PLT 7: Japanese Patent Publication No. 2002-006021A

SUMMARY OF INVENTION

Technical Problem

However, in the prior arts shown in PLTs 1 to 7, there was the problem that it was not possible to stably trap a high magnetic field (for example, 10 T class: 6 to 10 T).

The present invention has as its object to solve this problem and provide an oxide superconducting bulk magnet able to prevent breakage of a superconducting bulk member and able to give a sufficient amount of total magnetic flux at the superconducting bulk member surface even under high magnetic field strength conditions for securing the required magnetic field region.

Further, it has as its object, when making the respective single-crystal form oxide superconducting materials ring shapes and generating strong magnetic fields inside them, to provide an oxide superconducting bulk magnet able to prevent breakage of a superconducting bulk member, able to give a sufficient amount of total magnetic flux at the insides of the rings, and high in uniformity of the magnetic field even under high magnetic field strength conditions for securing the required magnetic field region.

Solution to Problem

To solve the above-mentioned problem, the present inventors engaged in intensive studies and as a result discovered that by stacking a plurality of oxide superconducting bulk members and arranging high strength reinforcing members joined or bonded between the oxide superconducting bulk members, it is possible to obtain a composite member to reinforce the relatively low strength oxide superconducting members to obtain higher strength and thereby prevent breakage of the superconducting bulk member even under a strong magnetic field and thereby completed the present invention. Note that, the assembly of the oxide superconducting bulk members and high strength reinforcing members joined or bonded together will also be referred to below as the "oxide superconducting bulk laminate", while the oxide superconducting bulk magnet comprised of the ring-shaped oxide superconducting bulk members and high strength reinforcing members joined or bonded together will also be referred to below as the "donut-shaped oxide superconducting bulk laminate".

Further, in the past, only the phenomenon of breakage due to electromagnetic stress had been reported, but the present inventors, in the process of their studies, found out that breakage also occurs due to the phenomenon called "quenching".

In a superconducting magnet prepared by winding a superconducting wire material into a coil, quenching is known both in metal-based and oxide superconducting wire materials. Measures are taken against this such as composite working with stabilizing metals. However, such a quenching phenomenon is not known much at all in RE-based bulk magnets. The reason is that in the case of an oxide superconducting material comprised of a single-crystal form $REBa_2Cu_3O_{7-x}$ phase in which a $RE_2BaCuO_5$ phase is dispersed, there is large freedom in the superconducting current paths etc., so quenching is observed in the about 10K or less low temperature region, but is not observed in the about 20K or more high temperature region. Further, it was believed that the quenching which occurs in wire coil magnets etc. does not cause breakage.

However, studies by the present inventors etc. revealed that even in bulk magnets, local heat generation (movement of magnetic flux) in the magnetization process or temperature raising process etc. acts as a trigger for a local drop in the critical current density Jc and, furthermore, that this drop in the critical current density Jc causes the generation of heat (movement of magnetic flux). This cycle occurs in an extremely short time. It was newly learned that the energy of the trapped magnetic field becomes heat which is instantaneously released and the thermal shock etc. at this time can cause breakage. For this reason, as explained above, it is necessary to provide reinforcement against electromagnetic stress and, furthermore, be able to suppress breakage of the bulk magnet due to quenching.

The gist of the present invention is as follows.

(1) An oxide superconducting bulk magnet comprising an oxide superconducting bulk laminate including a plurality of sheet-shaped oxide superconducting bulk members each made of a single-crystal form $RE_1Ba_2Cu_3O_y$ (RE is one or more elements selected from Y or rare earth elements, where $6.8 \le y \le 7.1$) in which $RE_2BaCuO_5$ is dispersed, and including one or more high strength reinforcing members arranged between the stacked oxide superconducting bulk members and one or more outer circumference reinforcing members provided at an outer circumference of the oxide superconducting bulk laminate, the oxide superconducting bulk members being joined or bonded with the high strength reinforcing members.

(2) The oxide superconducting bulk magnet according to (1), wherein the high strength reinforcing member is joined or bonded with the outer circumference reinforcing member.

(3) The oxide superconducting bulk magnet according to (1) or (2), wherein the oxide superconducting bulk members are joined or bonded with the outer circumference reinforcing member.

(4) The oxide superconducting bulk magnet according to any one of (1) to (3), wherein the high strength reinforcing member has a tensile strength at room temperature of 80 MPa or more.

(5) The oxide superconducting bulk magnet according to any one of (1) to (4), wherein the high strength reinforcing member has a thermal conductivity of 20 W/(m·K) or more.

(6) The oxide superconducting bulk magnet according to any one of (1) to (5), wherein the outer circumference reinforcing member is provided integrally with the outer circumference of the oxide superconducting bulk laminate.

(7) The oxide superconducting bulk magnet according to any one of (1) to (5), wherein the outer circumference reinforcing member is divided into a plurality of sections in a stacking direction of the oxide superconducting bulk laminate.

(8) The oxide superconducting bulk magnet according to (7), wherein the adjoining outer circumference reinforcing members are arranged across the high strength reinforcing member.

(9) The oxide superconducting bulk magnet according to any one of (1) to (8), wherein the outer circumference reinforcing member has a tensile strength at room temperature of 80 MPa or more.

(10) The oxide superconducting bulk magnet according to any one of (1) to (8), wherein the outer circumference reinforcing member has a thermal conductivity of 20 W/(m·K) or more.

(11) The oxide superconducting bulk magnet according to any one of (1) to (10), wherein the high strength reinforcing member is arranged at least at one of a topmost surface and a bottommost surface of the oxide superconducting bulk laminate.

(12) The oxide superconducting bulk magnet according to (11), wherein at least one of the high strength reinforcing members arranged at the topmost surface and the bottommost surface of the oxide superconducting bulk laminate has a thickness greater than a thickness of the high strength reinforcing member arranged between the oxide superconducting bulk members.

(13) The oxide superconducting bulk magnet according to (11) or (12), wherein the high strength reinforcing members arranged at the topmost surface and the bottommost surface of the oxide superconducting bulk laminate are bonded or joined with the outer circumference reinforcing member.

(14) The oxide superconducting bulk magnet according to any one of (1) to (13), further comprising a second outer circumference reinforcing member at an outside of the outer circumference reinforcing member.

(15) The oxide superconducting bulk magnet according to (14), wherein the second outer circumference reinforcing member has a tensile strength at room temperature of 80 MPa or more.

(16) The oxide superconducting bulk magnet according to (14) or (15), wherein the second outer circumference reinforcing member has a thermal conductivity of 20 W/(m·K) or more.

(17) The oxide superconducting bulk magnet according to any one of (1) to (16), wherein the oxide superconducting bulk members and a high strength reinforcing member are ring shaped and the oxide superconducting bulk laminate is a donut-shaped structure.

(18) The oxide superconducting bulk magnet according to (17), wherein an inner circumference reinforcing member is provided integrally at an inner circumference of the oxide superconducting bulk laminate.

(19) The oxide superconducting bulk magnet according to (17), wherein an inner circumference reinforcing member divided into a plurality of sections in the stacking direction of the oxide superconducting bulk laminate is provided at an inner circumference of the oxide superconducting bulk laminate.

(20) The oxide superconducting bulk magnet according to (19), wherein the adjoining inner circumference reinforcing members are arranged across the high strength reinforcing member.

(21) The oxide superconducting bulk magnet according to any one of (18) to (20), wherein the inner circumference reinforcing member has a tensile strength at room temperature of 80 MPa or more.

(22) The oxide superconducting bulk magnet according to any one of (18) to (21), wherein the inner circumference reinforcing member has a thermal conductivity of 20 W/(m·K) or more.

(23) The oxide superconducting bulk magnet according to any one of (18) to (22), wherein the high strength reinforcing member is joined or bonded to at least one of the topmost surface and the bottommost surface of the oxide superconducting bulk laminate and wherein the high strength reinforcing member is also joined or bonded to the inner circumference reinforcing member provided at an inner circumference of the oxide superconducting bulk laminate.

(24) The oxide superconducting bulk magnet according to any one of (18) to (23), further comprising a second inner circumference reinforcing member at an inside of the inner circumference reinforcing member.

(25) The oxide superconducting bulk magnet according to (24), wherein the second inner circumference reinforcing member has a tensile strength at room temperature of 80 MPa or more.

(26) The oxide superconducting bulk magnet according to (24) or (25), wherein the second inner circumference reinforcing member has a thermal conductivity of 20 W/(m·K) or more.

(27) The oxide superconducting bulk magnet according to any one of (17) to (26), wherein the oxide superconducting bulk members are stacked so that the c-axial directions of the crystal axes substantially match the inner circumferential axes of the oxide superconducting bulk members and the a-axial directions of the crystal axes are offset between the oxide superconducting bulk members by within a predetermined angular range.

(28) The oxide superconducting bulk magnet according to any one of (17) to (27), wherein the ring-shaped oxide superconducting bulk members at the donut-shaped oxide superconducting bulk laminate have multi-layer ring structures with matching inner circumferential axes.

Advantageous Effects of Invention

As explained above, according to the present invention, it is possible to provide a superconducting bulk magnet preventing breakage of a superconducting bulk member due to electromagnetic stress and quenching and enabling the generation of a strong magnetic field even under the high magnetic field strength conditions for securing a high magnetic field region. Further, when making the single-crystal form oxide superconducting materials ring shapes, it is possible to obtain a sufficiently high total amount of magnetic flux inside the rings and, furthermore, provide an oxide superconducting bulk magnet with a high uniformity of the magnetic field.

DESCRIPTION OF EMBODIMENTS

Figure 1:
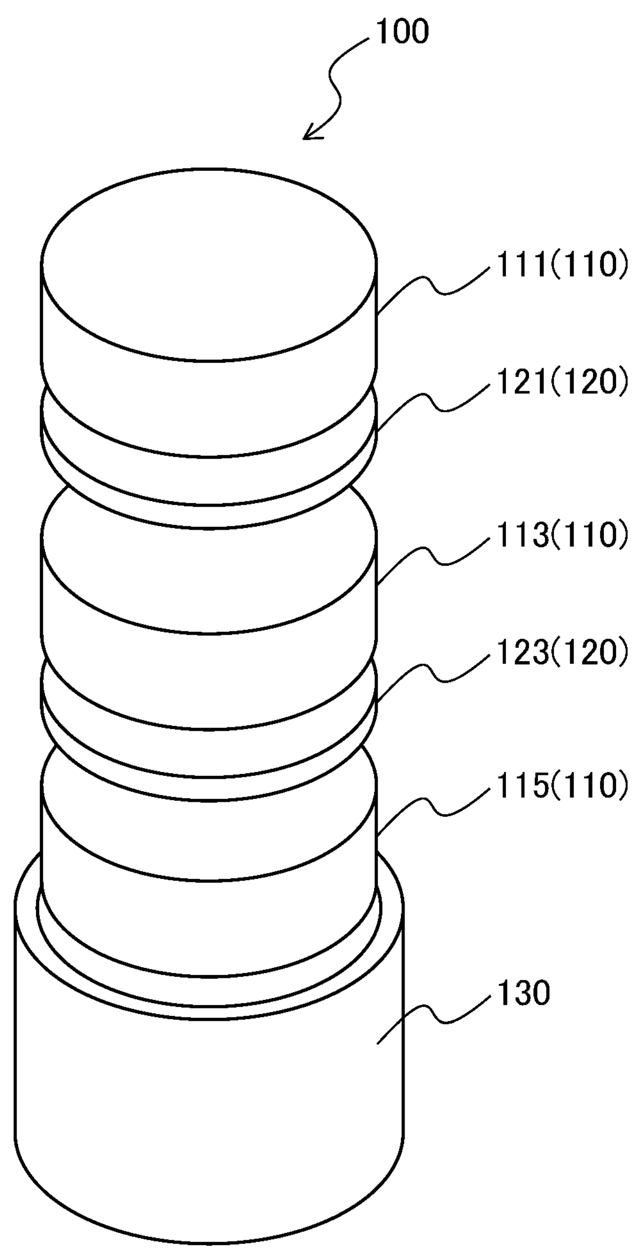
FIG. 1 is a schematic disassembled perspective view showing one example of an oxide superconducting bulk magnet according to one embodiment of the present invention.

Below, while referring to the attached drawings, preferred embodiments of the present invention will be explained in detail.

An oxide superconducting bulk member used in the oxide superconducting bulk magnet according to the present embodiment (below, also simply referred to as a "superconducting bulk member") has a structure comprised of a single-crystal form $REBa_2Cu_3O_{7-x}$ in which a nonsuperconducting phase such as a $RE_2BaCuO_5$ phase (211 phase) is dispersed. A bulk member having finely dispersed structures (so-called "QMG®" material) is particularly preferred. Here, a "single-crystal form" means not a perfect single crystal but including having defects not obstructing practical use such as small angle grain boundaries. The RE in the $REBa_2Cu_3O_{7-x}$ phase (123 phase) and $RE_2BaCuO_5$ phase (211 phase) is a rare earth element comprising Y, La, Nd, Sm, Eu, Gd, Dy, Ho, Er, Tm, Yb, or Lu and combinations of the same. The 123 phase including La, Nd, Sm, Eu, and Gd is outside the 1:2:3 stoichiometric composition. In some cases, Ba is partially substituted at the site of RE. Further, in the nonsuperconducting phase of the 211 phase as well, La and Nd differ somewhat from Y, Sm, Eu, Gd, Dy, Ho, Er, Tm, Yb, and Lu. It is known that the ratio of the metal elements is a nonstoichiometric composition or the crystal structure differs.

Substitution by the above-mentioned Ba element tends to lower the critical temperature. Further, in an environment with a smaller oxygen partial pressure, substitution by the Ba element tends to be suppressed.

The 123 phase can be formed by a peritectic reaction between the 211 phase and the liquid phase of the composite oxide of Ba and Cu, that is, 211 phase+liquid phase (composite oxide of Ba and Cu)→123 phase. Further, due to this peritectic reaction, the temperature at which the 123 phase can be formed (Tf: 123 phase generating temperature) is substantially related to the ion radius of the RE element. Along with the decrease of the ion radius, the Tf also falls. Further, the Tf tends to fall along with a low oxygen atmosphere and Ag addition.

A material comprising the single-crystal formed 123 phase in which the 211 phase is finely dispersed is formed since when the 123 phase grows as a crystal, the unreacted 211 grains are left in the 123 phase. That is, the above bulk material is formed by a reaction shown by 211 phase+liquid phase (composite oxide of Ba and Cu)→123 phase+211 phase.

Fine dispersion of the 211 phase in the bulk material is extremely important from the viewpoint of improvement of the critical current density $J_c$. By adding a fine amount of at least one of Pt, Rh, or Ce, grain growth of the 211 phase in the semimolten state (state comprising 211 phase and liquid phase) is suppressed and as a result the 211 phase in the material is refined to about 1 μm or so. The state of fine dispersion of the 211 phase can be confirmed by an optical microscope after polishing a sample to a mirror surface.

The amount of addition, from the viewpoint of the amount at which the effect of refinement appears and of the cost of the material, is preferably Pt: 0.2 to 2.0 massa, Rh: 0.01 to 0.5 massa, and Ce: 0.5 to 2.0 mass %. The added Pt, Rh, and Ce form partial solid solutions in the 123 phase. Further, the elements which are not able to form solid solutions form composite oxides with the Ba or Cu and remain scattered in the material.

Further, each bulk oxide superconducting member forming the magnet has to have a high critical current density ($J_c$) even in a magnetic field. To satisfy this condition, it has to be a single-crystal form 123 phase not containing high angle grain boundaries which become weak bonds superconductively. To obtain a further higher $J_c$ characteristic, pinning centers for stopping movement of the magnetic flux become necessary. What function as such pinning centers are the finely dispersed parts of the 211 phase. Finer dispersion of a large amount is preferable. As explained above, Pt, Rh, and Ce act to promote refinement of this 211 phase. Further, as pinning sites, $BaCeO_3$, $BaSiO_3$, $BaGeO_3$, $BaSnO_3$, and other possibilities are known. Further, the 211 phase and other nonsuperconducting phases finely disperse in the easily cleavable 123 phase and thereby play the important role of mechanically strengthening the superconducting members to make them viable as bulk materials.

The ratio of the 211 phase in the 123 phase is preferably 5 to 35 vol % from the viewpoint of the $J_c$ characteristic and mechanical strength. Further, the material generally contains voids (air bubbles) of 50 to 500 μm or so in a range of 5 to 20 vol %. Furthermore, when adding Ag, depending on the amount of addition, Ag or an Ag compound of 1 to 500 μm or so is contained in a range of over 0 vol % to 25 vol %.

Further, the oxygen deficiency (x) of the material after crystal growth shows the temperature change of the semiconductor-like resistance at 0.5 or so. By annealing this by each RE system at 350° C. to 600° C. for 100 hours or so in an oxygen atmosphere, oxygen is taken up into the material, the oxygen deficiency (x) becomes 0.2 or less, and a good superconducting characteristic is shown. At this time, a twin structure can be formed in the superconducting phase. However, including this matter, here, it will be called a single-crystal form.

Below, embodiments of the present invention will be explained along with the drawings.

FIG. 1 is a schematic disassembled perspective view showing one example of an oxide superconducting bulk magnet 100 according to the present embodiment. The oxide superconducting bulk magnet 100 according to the present embodiment, as shown in FIG. 1, is comprised of disk-shaped oxide superconducting bulk members 110, disk-shaped high strength reinforcing members 120, and an outer circumference reinforcing ring 130.

In the present embodiment, as the oxide superconducting bulk members 110, three superconducting bulk members 111, 113, and 115 are provided, while as the high strength reinforcing members 120, two high strength reinforcing members 121, 123 are provided. The oxide superconducting bulk members 110 and the high strength reinforcing members 120 are alternately stacked in the center axial line direction of the disks.

For example, as shown in FIG. 1, between the superconducting bulk members 111, 113, the high strength reinforcing member 121 is arranged, while between the superconducting bulk members 113, 115, the high strength reinforcing member 123 is arranged. The stacked oxide superconducting bulk members 110 and high strength reinforcing members 120 are preferably joined or bonded together. In this way, an oxide superconducting bulk laminate (110+120) is formed. Further, at its outer circumference, a hollow outer circumference reinforcing member comprised of an outer circumference reinforcing ring 130 is provided and is fit. The outer circumference reinforcing ring 130 is preferably joined or bonded with the high strength reinforcing members 120. Furthermore, the outer circumference reinforcing ring 130 may be joined or bonded with the oxide superconducting bulk members 110. In this way, an oxide superconducting bulk magnet 100 is formed. The superconducting bulk member 113 is ceramic, so has a strong yield strength relative to a compressive force, but has a weak yield strength with respect to a tensile force. For this reason, high strength reinforcing members 120 with strong yield strengths with respect to a tensile force are joined or bonded with them to obtain a composite structure to form the oxide superconducting bulk laminate (110+120) and thereby obtain high yield strengths against both compressive force and tensile force. Further, this laminate further has an outer circumference reinforcing ring 130 arranged at its outer circumference, whereby a much higher yield strength is obtained and it is possible to prevent breakage of a superconducting bulk member due to electromagnetic stress and quenching even under high magnetic field strength conditions.

When joining or bonding the oxide superconducting bulk members 110 and high strength reinforcing members 120 stacked in the center axial line direction, for example, a resin or grease etc. may be used. More preferably, soldering, which gives a stronger joined strength, is performed. When soldering, preferably the surfaces of the oxide superconducting bulk members 110 are formed with Ag thin films by sputtering and furthermore are annealed at 100° C. to 500° C. Due to this, the Ag thin films and bulk material surfaces closely contact. Solder itself has an action of improving the thermal conductivity, so soldering treatment is also preferable from the viewpoint of improving the thermal conductivity of the bulk magnet as a whole and making the temperature of the bulk magnet as a whole even.

Further, at this time, as a method of reinforcement against electromagnetic stress, as the high strength reinforcing members 120, a metal able to be soldered such as an aluminum alloy, Ni-based alloy, Nichrome, or stainless steel is preferable. From the viewpoint of suppressing separation and cleavage cracks near the interfaces of the oxide superconducting bulk members and high strength reinforcing members due to the difference in thermal expansion coefficient, furthermore, as the high strength reinforcing members 120, it is preferable to use Nichrome—which has a linear expansion coefficient relatively close to the oxide superconducting members and causes a slight compressive stress to act on the oxide superconducting bulk members 110 when cooling from room temperature. On the other hand, from the viewpoint of preventing breakage due to quenching, as the high strength reinforcing members 120, a metal having a high thermal conductivity and high electrical conductivity such as copper, a copper alloy, aluminum, aluminum alloy, silver, or silver alloy is preferable. Note that these metals can be soldered. Furthermore, oxygen-free copper, aluminum, and silver are preferable from the viewpoint of thermal conductivity and electrical conductivity.

Due to the reinforcement by the high strength reinforcing members 120 comprised of such high strength metals, because of the overall improved thermal conductivity, the thermal stability as a bulk magnet increases, quenching becomes harder to occur, and magnetization in a high magnetic field in a lower temperature region, that is, the high critical current density Jc region, becomes possible. Copper, aluminum, silver, and other metals are also high in electrical conductivity, so when, along with the movement of magnetic flux, a local rise in temperature causes the superconducting characteristics to deteriorate, an action in rerouting the superconducting current can be expected and, it is believed, there is a quench inhibiting effect. Further, at this time, to improve the quench inhibiting effect, the contact resistance of the interfaces between the oxide superconducting bulk and high electrical conductivity, high strength materials is preferably small. These are preferably joined by solder etc. after forming a silver film on the surface of the oxide superconducting bulk.

When using solder etc. for joining the members, to suppress the entrainment of air bubbles etc. and cause the solder to uniformly permeate, it is effective to use high strength reinforcing members 120 having fine pores. The high strength reinforcing members 120 and outer circumference reinforcing ring 130 are worked by general machining. In the actual design of a bulk magnet, the ratio of the superconducting material decreases by the amount of the insertion of high strength reinforcing members 120 comprised of high strength metals, so the ratio of the high strength reinforcing members 120 should be determined in accordance with the targeted conditions of use. Further, from the above-mentioned viewpoint, it is preferable to use pluralities of high strength metals with high strengths and the high strength metals with high thermal conductivities in combination in respectively determined ratios.

Further, the superconducting bulk members 110 have an ordinary temperature tensile strength of 60 MPa or so. Further, the solder for attaching the high strength reinforcing members 120 to the superconducting bulk members 110 have an ordinary temperature tensile strength of usually less than 80 MPa. Due to this, high strength reinforcing members 120 having an ordinary temperature tensile strength of 80 MPa or more are effective as reinforcing members. For this reason, the strength of the high strength reinforcing members 120 is preferably an ordinary temperature tensile strength of 80 MPa or more. Furthermore, as the thermal conductivity of the high strength metal with a high thermal conductivity, from the viewpoint of transfer and absorption of heat generated inside the superconducting material, 20 W/(m·K) or more in a 20K to 70K temperature region is preferable, while 100 W/(m·K) or more is more preferable. Further, when, as high strength reinforcing members 120, a plurality of disks are arranged between the oxide superconducting bulk members 110, at least one of these disks should have a thermal conductivity of 20 W/(m·K) or more.

Further, regarding the outer circumference reinforcing ring 130 as well, to improve the quench inhibiting effect, the ring may be formed from a material having a high thermal conductivity. In this case, for the outer circumference reinforcing ring 130, for example, a material containing as a main ingredient a metal having a high thermal conductivity such as copper, aluminum, silver, etc. may be used. The thermal conductivity of the outer circumference reinforcing ring 130 having a high thermal conductivity, from the viewpoint of transfer and absorption of heat generated inside the superconducting material, is preferably 20 W/(m·K) or more in a 20K to 70K temperature region in which cooling by a refrigerating machine etc. enables stable formation of a strong magnetic field, more preferably, 100 W/(m·K) or more.

Further, the outer circumference reinforcing ring 130 may also be comprised of a plurality of rings arranged concentrically. That is, the facing rings are made to contact each other at their circumferential surfaces so as to form overall a single outer circumference reinforcing ring. In this case, at least one of the rings forming the outer circumference reinforcing ring should have a thermal conductivity of 20 W/(m·K) or more.

Further, FIG. 1 to FIG. 3D show examples of bulk magnets comprised of three oxide superconducting bulk members, but the gist of the present invention lies in increasing the strength by forming a composite member of oxide superconducting bulk members with relatively low strengths and reinforcing members with high strengths, so by increasing the number of layers more, a greater effect of combining them is exhibited. The thicknesses of the oxide superconducting members depend on the diameters (outside diameters) as well, but 10 mm or less is preferable, while 6 mm or less and 0.3 mm or more are more preferable. If less than 0.3 mm, the fluctuation in crystallinity of the oxide superconducting members causes the superconducting characteristics to deteriorate.

Above, the oxide superconducting bulk magnet 100 according to the present embodiment was explained. According to the present embodiment, high strength reinforcing members 120 are arranged at least between the stacked oxide superconducting bulk members 110. In particular, by alternately stacking oxide superconducting bulk members 110 with relatively low strengths against tensile force and the high strength reinforcing members 120 to form a composite member, the strength can be raised. Furthermore, by using high strength reinforcing members 120 and an outer circumference reinforcing ring 130 comprised of materials with high thermal conductivity, the occurrence of quenching can also be suppressed. Due to this, it is possible to prevent breakage of the oxide superconducting bulk members 110 even under high magnetic field strength conditions and possible to obtain a sufficient total amount of magnetic flux.

Figure 2:
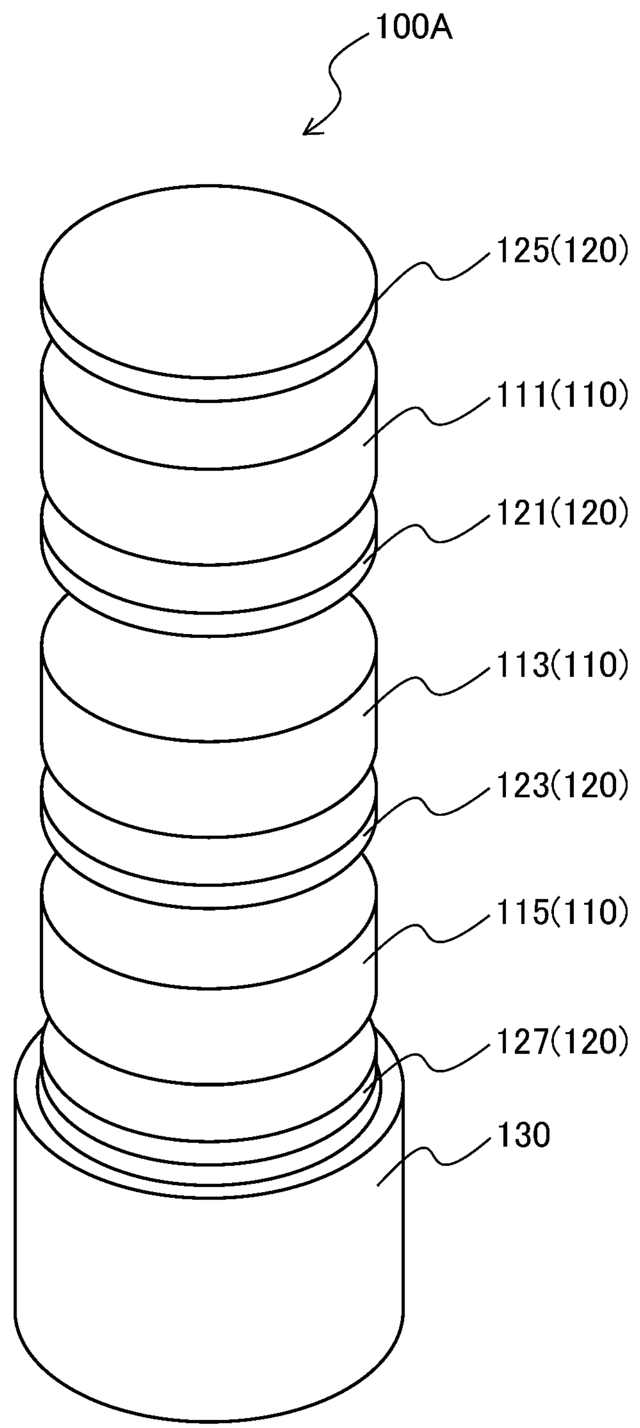
FIG. 2 is a schematic disassembled perspective view showing another example of the configuration of an oxide superconducting bulk magnet according to the same embodiment in which high strength reinforcing members are joined to a topmost surface and a bottommost surface of the oxide superconducting bulk laminate.
Figure 3A:
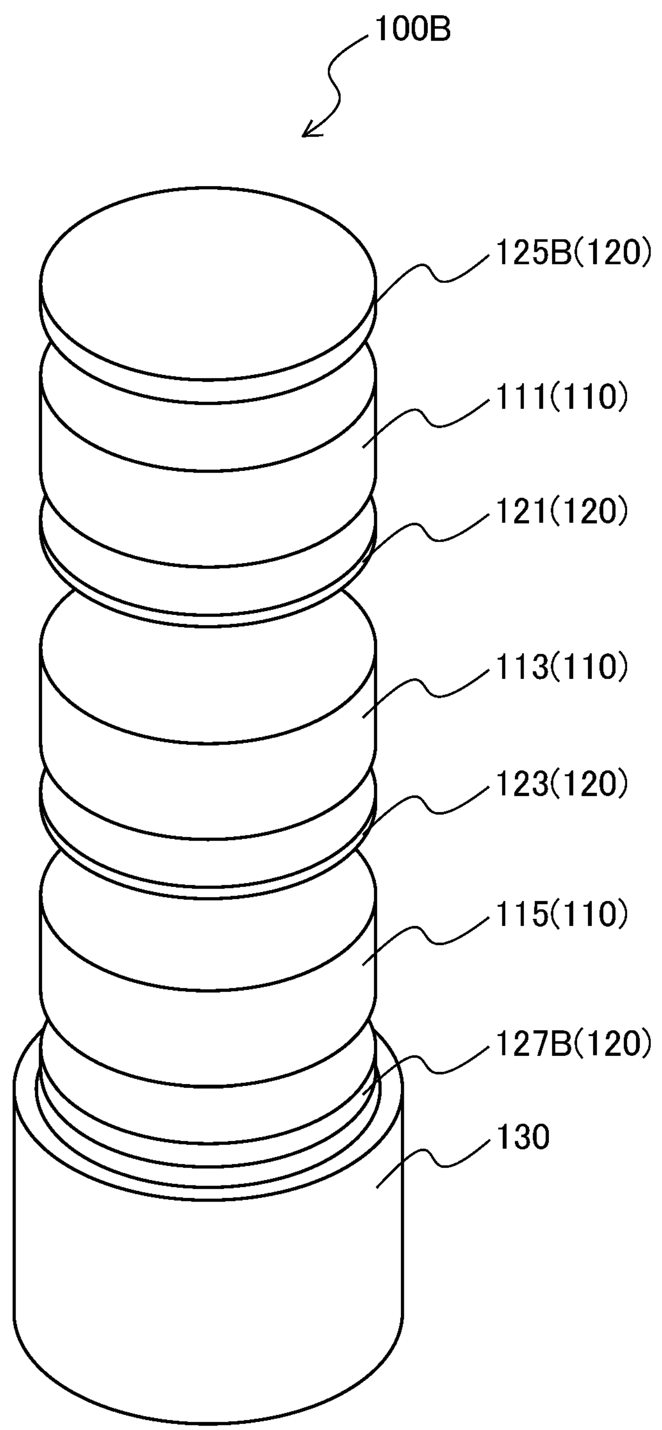
FIG. 3A is a schematic disassembled perspective view showing another example of the configuration of an oxide superconducting bulk magnet according to the same embodiment wherein the thicknesses of the high strength reinforcing members at the topmost part and the bottommost part are greater than the thicknesses of the other high strength reinforcing members.
Figure 3B:
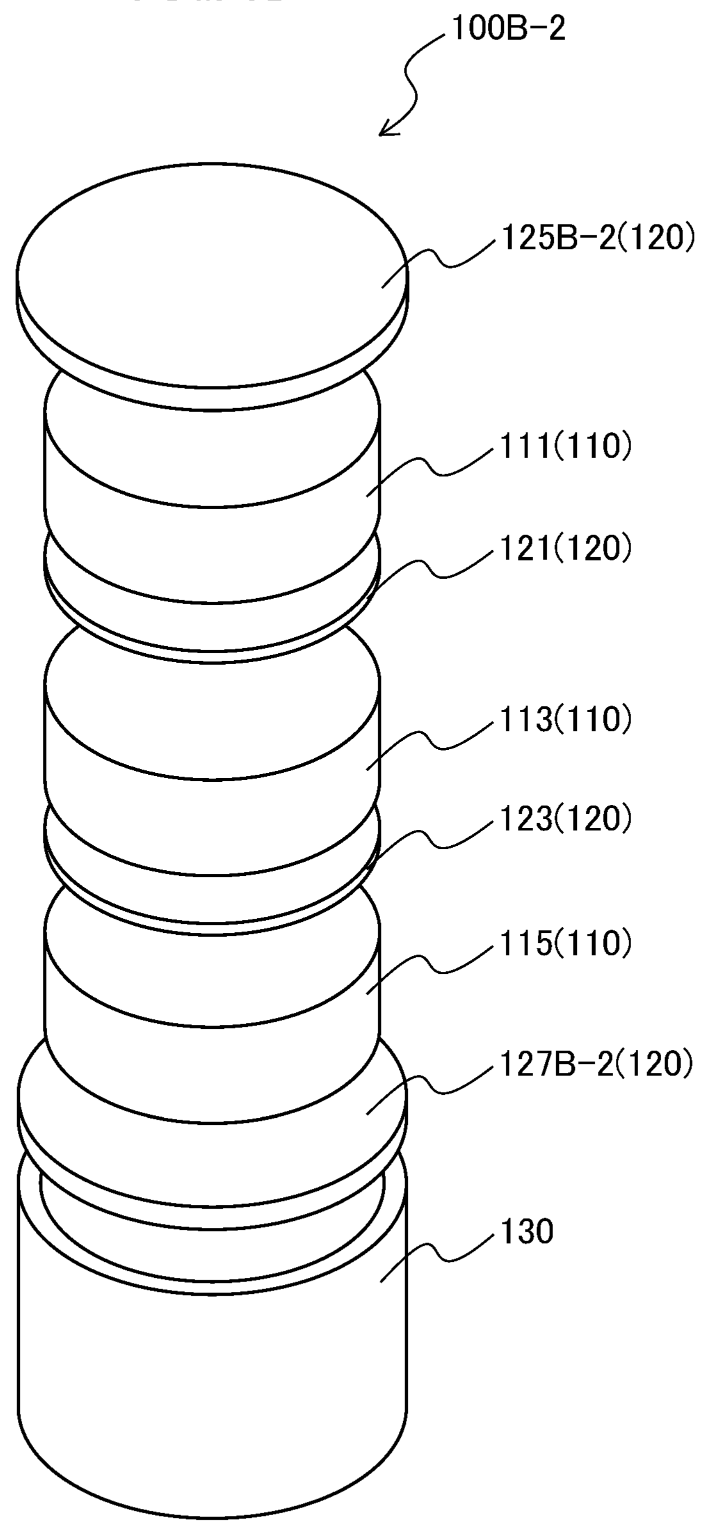
FIG. 3B is a modification of FIG. 3A and shows an example where the sizes of the high strength reinforcing members at the topmost part and the bottommost part are larger than the other high strength reinforcing members.
Figure 3C:
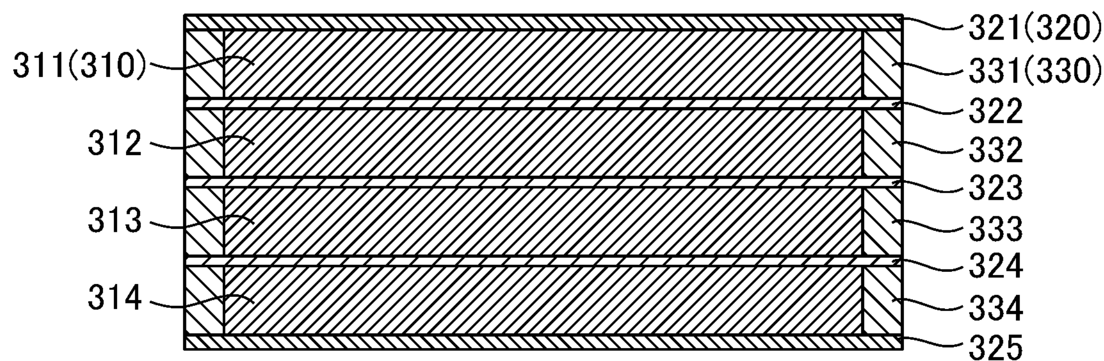
FIG. 3C is a cross-sectional view showing the state cutting along the plane parallel to the center axis an oxide superconducting bulk magnet where the outside diameters of the high strength reinforcing members are larger than the outside diameters of the oxide superconducting bulk members joined with the high strength reinforcing members and a plurality of outer circumference rings are provided.
Figure 3D:
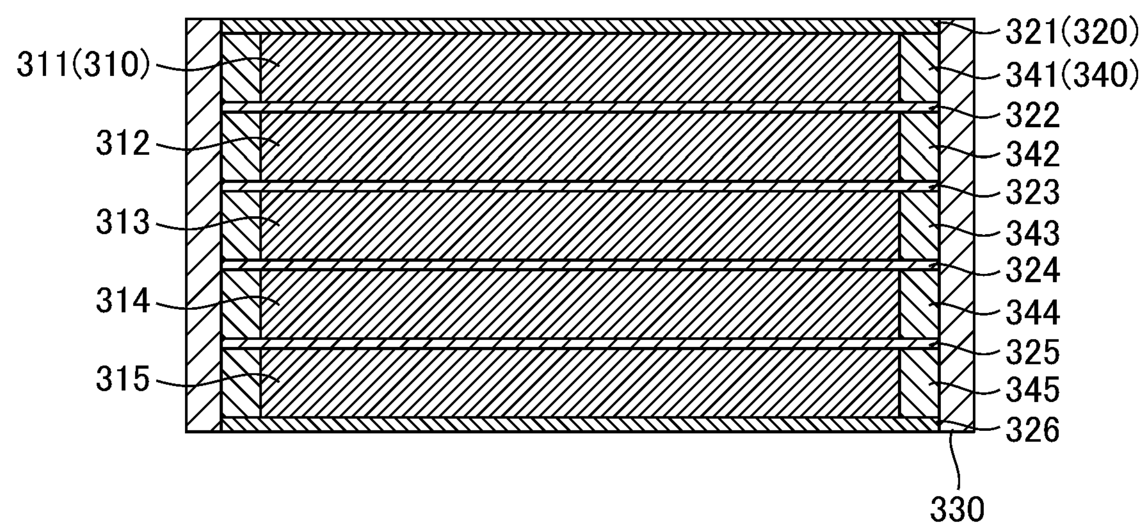
FIG. 3D is a cross-sectional view showing the state cutting along the plane parallel to the center axis an oxide superconducting bulk magnet where the outer circumference reinforcing ring has a two-layer structure in the diametrical direction and the inside diameters of inside outer circumference reinforcing rings are smaller than the outside diameters of the high strength reinforcing members.
Figure 4:
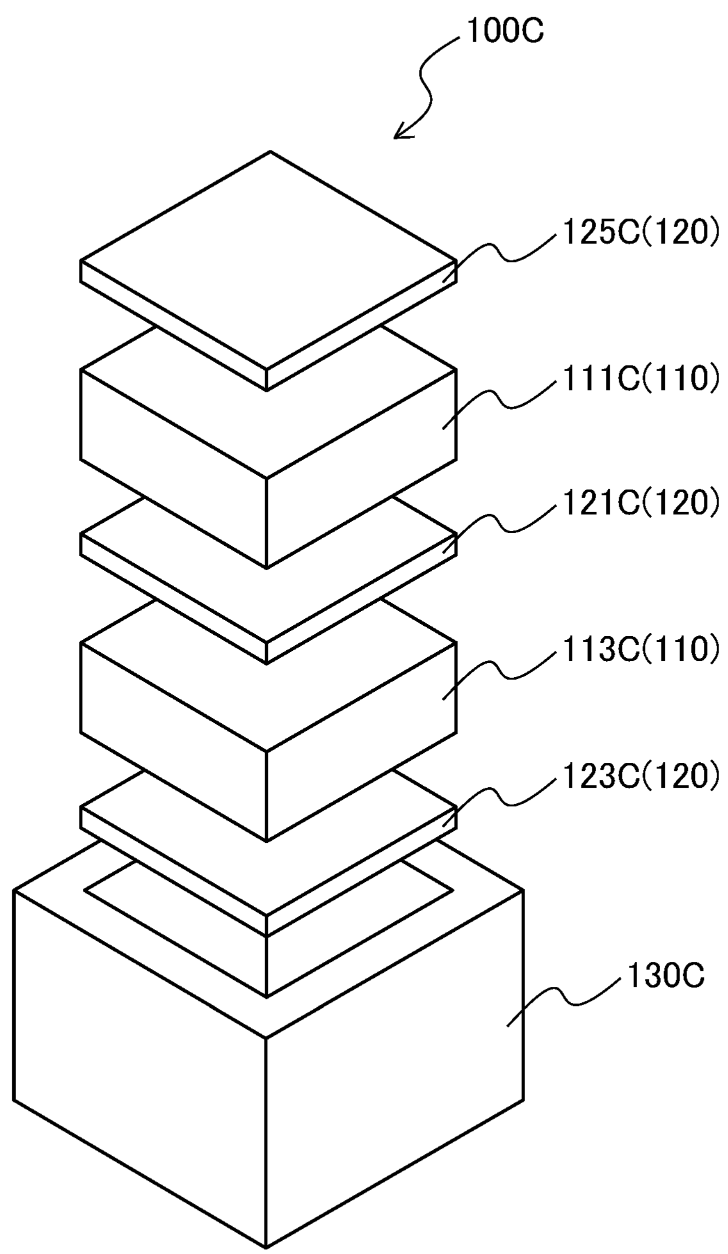
FIG. 4 is a schematic disassembled perspective view showing another example of the configuration of an oxide superconducting bulk magnet according to the same embodiment wherein rectangular-shaped high strength reinforcing members and rectangular-shaped oxide superconducting bulk members are alternately stacked.

Further, the oxide superconducting bulk laminate according to the present embodiment may also be configured such as shown in FIG. 2 to FIG. 4.

For example, in the oxide superconducting bulk magnet 100A shown in FIG. 2, high strength reinforcing members 120 are arranged at the topmost surface and the bottommost surface of the oxide superconducting bulk magnet 100A in the center axial line direction. That is, the topmost surface and the bottommost surface of the oxide superconducting bulk laminate of the configuration shown in FIG. 1 are provided with the high strength reinforcing members 125, 127. These are respectively joined or bonded with the facing oxide superconducting bulk members 111, 115.

Further, for example, as shown in the oxide superconducting bulk magnet 100B shown in FIG. 3A, the thickness of at least one of the high strength reinforcing members 125B, 127B at the topmost surface and the bottommost surface in the oxide superconducting bulk laminate of the configuration shown in FIG. 2 may be made thicker than the thicknesses of the other high strength reinforcing members 121, 123. In the magnetization process, the surfaces of the top surface and the bottom surface of the oxide superconducting bulk laminate are subjected to the maximum stress. For this reason, it is necessary to sufficiently reinforce these parts. Therefore, as shown in FIG. 3A, the thickness of at least one of the high strength reinforcing members 125B, 127B at the topmost surface or the bottommost surface can be made thicker than the other high strength reinforcing members 121, 123 so as to increase the strength of the end parts of the oxide superconducting bulk magnet 100B.

Further, as shown in the oxide superconducting bulk magnet 100B-2 shown in FIG. 3B, the outside diameters of the high strength reinforcing members 125B-2, 127B-2 of the topmost surface and the bottommost surface may be made substantially equal to the outside diameter of the outer circumference reinforcing ring 130 and the high strength reinforcing members 125B-2, 127B-2 may be joined with the top surface and bottom surface of the outer circumference reinforcing ring 130. Due to this, it is also possible to more strongly join the high strength reinforcing members 125B-2, 127B-2 of the topmost surface and the bottommost surface to the outer circumference reinforcing ring 130. Furthermore, by using high strength reinforcing members 120 and outer circumference reinforcing rings 125B-2, 127B-2 comprised of materials with high thermal conductivities, the occurrence of quenching can also be suppressed.

Further, as shown in FIG. 3C, it is particularly useful when the outer circumference end parts of the high strength reinforcing members 320 (321 to 325) are larger than the outside diameters of the oxide superconducting bulk members 310 (311 to 314) joined with the high strength reinforcing member and are strongly joined with a plurality of sections of the outer circumference ring 330 (331 to 334) and the high strength reinforcing members are relatively thin.

Further, furthermore, as shown in FIG. 3D, when the outer circumference reinforcing ring has a two-layer structure in the diametrical direction, the inside diameters of the sections of the inside outer circumference reinforcing ring 330 (331 to 335) are smaller than the outside diameters of the high strength reinforcing members, and the outer circumference ends of the high strength reinforcing members are joined with the outside outer circumference reinforcing ring (340), the outer circumference ends of the high strength reinforcing members are more strongly joined with the outer circumference reinforcing ring and a greater reinforcement effect can be exhibited.

Furthermore, the superconducting bulk members 110 and high strength reinforcing members 120 forming the oxide superconducting bulk laminate according to the present embodiment do not necessarily have to be disk shaped. For example, as shown by the oxide superconducting bulk magnet 100C shown in FIG. 4, the superconducting bulk members 110 and high strength reinforcing members 120 may also be rectangular in shape. At this time, the outer circumference reinforcing member 130C is also formed as a hollow member formed with a rectangular through hole corresponding to the shapes of the superconducting bulk members 110 and high strength reinforcing members 120.

Figure 5:
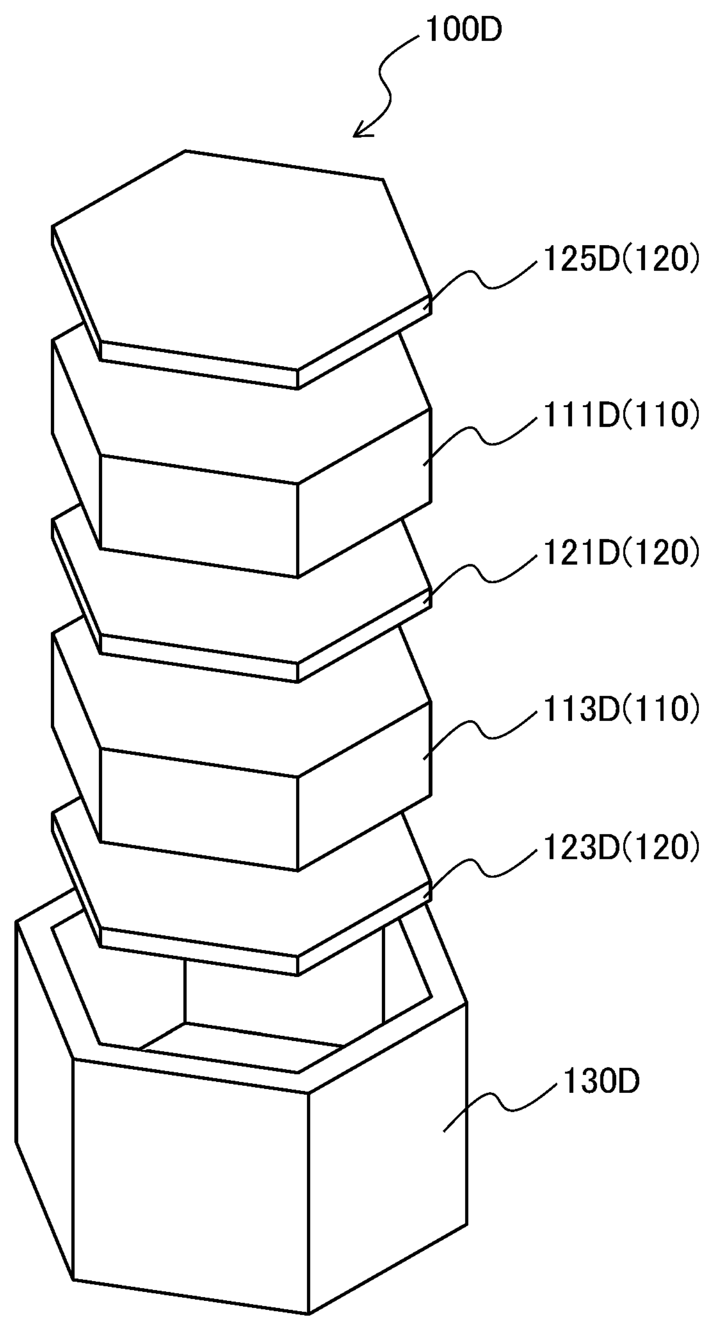
FIG. 5 is a schematic disassembled perspective view showing another example of the configuration of an oxide superconducting bulk magnet according to the same embodiment wherein hexagonal-shaped high strength reinforcing members and hexagonal-shaped oxide superconducting bulk members are alternately stacked.

Alternatively, as shown by the oxide superconducting bulk magnet 100D shown in FIG. 5, the superconducting bulk members 110 and high strength reinforcing members 120 may also be hexagonal in shape. At this time, the outer circumference reinforcing member 130D is also formed as a hollow member formed with a hexagonal through hole corresponding to the shapes of the superconducting bulk members 110 and high strength reinforcing members 120.

Next, first to eighth embodiments for the case of making the single-crystal form oxide superconducting materials ring shaped will be explained with reference to the drawings.

First Embodiment

Figure 9A:
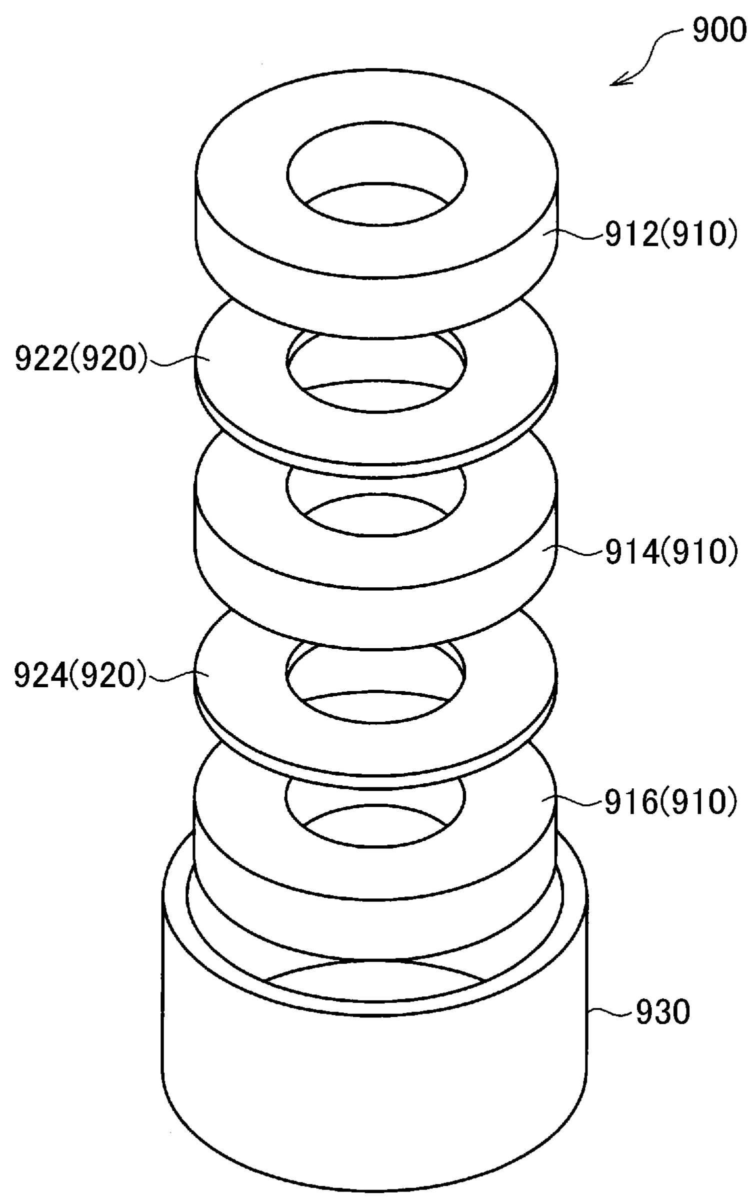
FIG. 9A is a schematic disassembled perspective view showing one example of an oxide superconducting bulk magnet of a ring shape according to a first embodiment of the present invention.
Figure 9B:
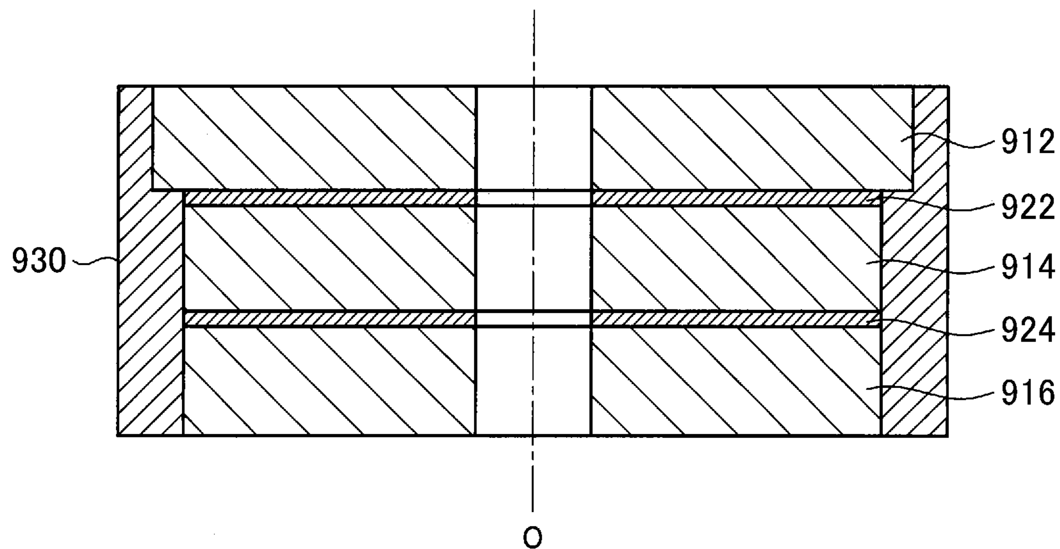
FIG. 9B is a partial cross-sectional view of the oxide superconducting bulk magnet shown in FIG. 9A.
Figure 9C:
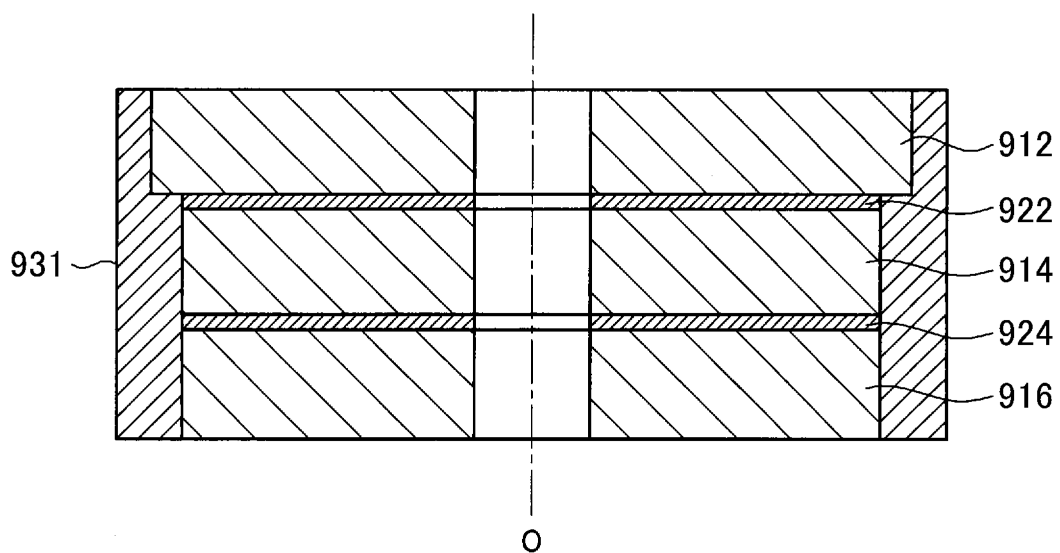
FIG. 9C is a partial cross-sectional view of a modification of the oxide superconducting bulk magnet according to the same embodiment when cut along the center axial line of the oxide superconducting bulk magnet (different outside diameter of superconducting bulk members and same outside shape of outer circumference reinforcing ring).
Figure 9D:
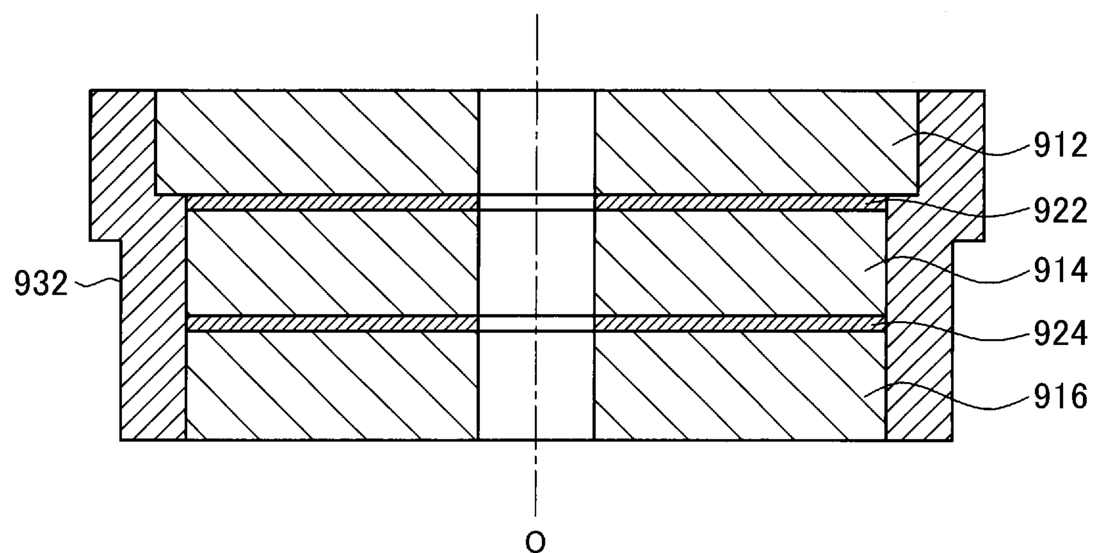
FIG. 9D is a partial cross-sectional view of a modification of the oxide superconducting bulk magnet according to the same embodiment when cut along the center axial line of the oxide superconducting bulk magnet (outside diameters of superconducting bulk members differ and there is a step difference in the outer circumferential surface of the outer circumference reinforcing ring).
Figure 9E:
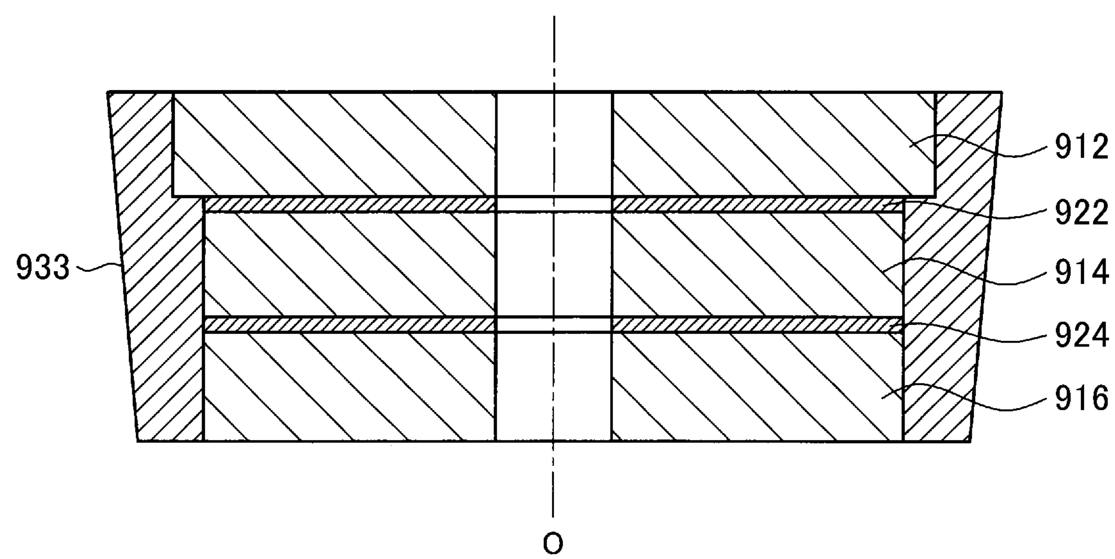
FIG. 9E is a partial cross-sectional view showing a modification of the oxide superconducting bulk magnet according to the same embodiment when cut along the center axial line of the oxide superconducting bulk magnet (outside diameters of superconducting bulk members differ and the outer circumferential surface of the outer circumference reinforcing ring is tapered in shape).

First, a first embodiment will be explained using FIG. 9A to FIG. 9E. FIG. 9A is a schematic disassembled perspective view showing an example of an oxide superconducting bulk magnet 900 according to the present embodiment. FIG. 9B is a partial cross-sectional view of the oxide superconducting bulk magnet 900 shown in FIG. 9A. FIG. 9C to FIG. 9E are partial cross-sectional views of modifications of the oxide superconducting bulk magnet 900 according to the present embodiment when cut along the center axial line of the oxide superconducting bulk magnet 900.

The oxide superconducting bulk magnet 900 according to the present embodiment is comprised of ring-shaped oxide superconducting bulk members 910 comprised of disks having through holes at the center parts, ring-shaped high strength reinforcing members 920 comprised of disks having through holes at the center parts, and an outer circumference reinforcing ring 930. In the present embodiment, as the oxide superconducting bulk members 910, three superconducting bulk members 912, 914, 916 are provided, while as the high strength reinforcing members 920, two high strength reinforcing members 922, 924 are provided. The oxide superconducting bulk members 910 and the high strength reinforcing members 920 are alternately stacked in the center axial line direction of the rings. For example, as shown in FIG. 9A, the high strength reinforcing member 922 is arranged between the superconducting bulk members 912, 914, while the high strength reinforcing member 924 is arranged between the superconducting bulk members 914, 916. The stacked oxide superconducting bulk members 910 and high strength reinforcing members 920 are joined or bonded together. At their outer circumferences, a hollow metal outer circumference reinforcing ring 930 is fit. In this way, a donut-shaped oxide superconducting bulk laminate with a through hole at its center is formed. The outer circumference reinforcing ring 930 is preferably joined or bonded with the high strength reinforcing members 920. Furthermore, the outer circumference reinforcing ring 930 may be joined or bonded with the oxide superconducting bulk members 910. In this way, the oxide superconducting bulk magnet 900 is formed. The ring-shaped superconducting bulk members 910 are ceramic, so are relatively strong in yield strength against a compressive force, but are weak in yield strength against a tensile force. For this reason, high strength reinforcing members 920 with strong yield strengths against tensile force are joined or bonded with them to form a composite structure and obtain an oxide superconducting bulk laminate (910+920) to thereby obtain high yield strengths against both compressive force and tensile force. Further, at the outer circumference of this laminate, the outer circumference reinforcing ring 930 is arranged, whereby the yield strengths become even higher and it becomes possible to prevent breakage of the superconducting bulk members due to electromagnetic stress and quenching even under high magnetic field strength conditions.

For joining or bonding the oxide superconducting bulk members 910 and high strength reinforcing members 920 stacked in the center axial line direction, for example, a resin or grease etc. may be used. More preferably, soldering, which gives a stronger joined strength, may be performed. When soldering, preferably the surfaces of the ring-shaped oxide superconducting bulk members 910 are formed with Ag thin films by sputtering and furthermore are annealed at 100° C. to 500° C. Due to this, the Ag thin films and bulk material surfaces closely contact. Solder itself has an action of improving the thermal conductivity, so soldering treatment is also preferable from the viewpoint of improving the thermal conductivity and making the temperature of the bulk magnet as a whole even.

Further, at this time, as a method of reinforcement against electromagnetic stress, as the high strength reinforcing members 920, a metal able to be soldered such as an aluminum alloy, Ni-based alloy, Nichrome, or stainless steel is preferable. From the viewpoint of suppressing separation and cleavage cracks near the interfaces of the oxide superconducting bulk members and high strength reinforcing members due to the difference in thermal expansion coefficient, furthermore, Nichrome, which has a linear expansion coefficient relatively close to the oxide superconducting members 910 and causes a slight compressive stress to act on the oxide superconducting bulk members 910 when cooling from room temperature, is more preferable. On the other hand, from the viewpoint of preventing breakage due to quenching, as the high strength reinforcing members 920, a metal having a high thermal conductivity and high electrical conductivity such as copper, a copper alloy, aluminum, aluminum alloy, silver, or silver alloy is preferable. Note that these metals can be soldered. Furthermore, oxygen-free copper, aluminum, and silver are preferable from the viewpoint of thermal conductivity and electrical conductivity. Further, when using solder etc. for joining members, to suppress entrainment of air bubbles etc. and make the solder uniformly permeate, it is effective to use high strength reinforcing members 920 having pores.

By reinforcement by high strength reinforcing members 920 comprised of such high strength metal, due to the overall improvement in thermal conductivity, the thermal stability as a bulk magnet is increased, quenching becomes harder to occur, and magnetization in a high magnetic field at a low temperature region, that is, a high critical current density Jc region, becomes possible. Copper, aluminum, silver, and other metals are also high in electrical conductivity, so when factors arise causing local deterioration of the superconducting characteristics, an action in rerouting the superconducting current can be expected and, it is believed, there is a quench inhibiting effect. Further, at this time, to improve the quench inhibiting effect, the contact resistance of the interfaces between the oxide superconducting bulk and high electrical conductivity and high strength materials is preferably small. These are preferably joined by solder etc. after forming a silver film on the surface of the oxide superconducting bulk.

In the actual design of a bulk magnet, the ratio of the superconducting material decreases by the amount of the insertion of high strength reinforcing members 920 comprised of high strength metals, so the ratio of the high strength reinforcing members 920 should be determined in accordance with the targeted conditions of use. Further, from the above-mentioned viewpoint, it is preferable to form the high strength reinforcing members 920 using pluralities of high strength metals with high strengths and the high strength metals with high thermal conductivities in combination in respectively determined ratios.

Further, the superconducting bulk members 910 have an ordinary temperature tensile strength of 60 MPa or so. Further, the solder for attaching the high strength reinforcing members 920 to the superconducting bulk members 910 has an ordinary temperature tensile strength of usually less than 80 MPa. Due to this, high strength reinforcing members 920 having an ordinary temperature tensile strength of 80 MPa or more are effective as reinforcing members. For this reason, the strength of the high strength reinforcing members 920 is preferably an ordinary temperature tensile strength of 80 MPa or more. Furthermore, as the thermal conductivity of the high strength metal with a high thermal conductivity, from the viewpoint of transfer and absorption of heat generated inside the superconducting material, 20 W/(m·K) or more in a 20K to 70K temperature region is preferable, while 100 W/(m·K) or more is more preferable. Further, when, as high strength reinforcing members 920, a plurality of ring-shaped sheets are arranged between the oxide superconducting bulk members 910, at least one of these sheets should have a thermal conductivity of 20 W/(m·K) or more.

Further, regarding the outer circumference reinforcing ring 930 as well, to improve the quench inhibiting effect, the ring may be formed from a material having a high thermal conductivity. In this case, for the outer circumference reinforcing ring 930, for example, a material containing as a main ingredient a metal having a high thermal conductivity such as copper, aluminum, silver, etc. may be used. The thermal conductivity of the outer circumference reinforcing ring 930 having a high thermal conductivity, from the viewpoint of transfer and absorption of heat generated inside the superconducting material, is preferably 20 W/(m·K) or more in a 20K to 70K temperature region in which cooling by a refrigerating machine etc. enables stable formation of a strong magnetic field, more preferably, 100 W/(m·K) or more.

Further, the outer circumference reinforcing ring 930 may also be comprised of a plurality of rings arranged concentrically. That is, the facing rings are made to contact each other at their circumferential surfaces so as to form overall a single outer circumference reinforcing ring. In this case, at least one of the rings forming the outer circumference reinforcing ring should have a thermal conductivity of 20 W/(m·K) or more.

The high strength reinforcing members 920 and the outer circumference reinforcing ring 930 are formed by general machining methods. The center axes of the inner and outer circumferences of the ring-shaped oxide superconducting bulk members 910 must be aligned for improvement of the strength of the magnetic field generated and improvement of uniformity (or symmetry). Further, the diameters of the outer circumferences and the diameter of the inner circumferences of the ring-shaped oxide superconducting bulk members 910 are design matters and do not necessarily have to be made to match. For example, in the case of bulk magnets for NMR or MRI use, sometimes it is necessary to place shim coils etc. near the centers for improving the uniformity of the magnetic field. At that time, preferably the inside diameters near the centers are increased to facilitate placement of the shim coils etc. Further, regarding the diameters of the outer circumferences as well, to increase the strength of the magnetic field at the center parts and improve the uniformity, it is effective to change the diameters of the outer circumference parts to adjust the strength or uniformity of the magnetic field targeted.

The shape of the outer circumference reinforcing ring 930 (outer circumference and inner circumference) should be one where the outer circumferential surfaces of the ring-shaped oxide superconducting bulk members 910 closely contact the inner circumferential surface of the outer circumference reinforcing ring 930. For example, as shown in FIG. 9B, if the oxide superconducting bulk members 910 are all the same in outside diameter, the inside diameter of the outer circumference reinforcing ring 130 also becomes the same. Alternatively, as shown in FIG. 9C, FIG. 9D, and FIG. 9E, sometimes the outside diameter of the superconducting bulk member 912 is larger than the outside diameters of the other superconducting bulk members 914, 916. At this time, the outer circumference reinforcing rings 931, 932, 933 are provided with a step difference so that the inner circumferential surfaces contact the outer circumferential surfaces of the superconducting bulk members 912, 914, 916.

The shape of the outer circumferential surface of the outer circumference reinforcing ring 930 is not particularly limited. For example, as shown in FIG. 9C, it is also possible to make the outside diameter the same at different positions in the center axial line direction. Further, as shown in FIG. 9D, it is also possible to form an outer circumference reinforcing ring 931 having a step difference in its outer circumferential surface so that the thickness in the diametrical direction becomes the same. Alternatively, as shown in FIG. 9E, it is also possible to form an outer circumference reinforcing ring 932 having an outer circumferential surface of a tapered shape so that the thickness in the diametrical direction becomes substantially the same.

Further, the outside diameters of the high strength reinforcing members 920, as shown in FIG. 9B, do not necessarily have to be made to match the outside diameters of the ring-shaped superconducting bulk members 910. For example, as shown in FIG. 9C to FIG. 9E, the superconducting bulk member 912 and the high strength reinforcing members 920 may differ in outside diameter.

Furthermore, when stacking a plurality of outer circumference reinforcing rings 930 etc., it is effective to insert screws into the outer circumference reinforcing rings 930 having screw holes to align the center axes.

Further, FIGS. 9A to 9E show examples of bulk magnets comprised of three oxide superconducting bulk members, but the gist of the present invention lies in increasing the strength by forming a composite member of oxide superconducting bulk members with relatively low strengths and reinforcing members with high strengths, so by increasing, the number of layers more, a greater effect of combining them is exhibited. The thicknesses of the oxide superconducting members depend on the diameters (outside diameters) as well, but 10 mm or less is preferable, while 6 mm or less and 0.3 mm or more are more preferable. If less than 0.3 mm, the fluctuation in crystallinity of the oxide superconducting members causes the superconducting characteristics to deteriorate. (As the number of layers, three or more is preferable and five or more is more preferable.)

Above, the oxide superconducting bulk magnet 900 according to the present embodiment was explained. According to the present embodiment, ring-shaped high strength reinforcing members 920 are arranged at least between the stacked ring-shaped oxide superconducting bulk members 910. In particular, by alternately stacking oxide superconducting bulk members 910 with relatively low strengths against tensile force and the high strength reinforcing members 920 to form a composite member, the strength can be raised. Furthermore, by using high strength reinforcing members 920 and an outer circumference reinforcing ring 930 comprised of materials with high thermal conductivity, the occurrence of quenching can also be suppressed. Due to this, it is possible to prevent breakage of the oxide superconducting bulk members 910 even under high magnetic field strength conditions and possible to obtain a sufficient total amount of magnetic flux inside the rings. Furthermore, it is possible to provide an oxide superconducting bulk magnet 900 with a high uniformity of magnetic field.

Second Embodiment

Figure 10A:
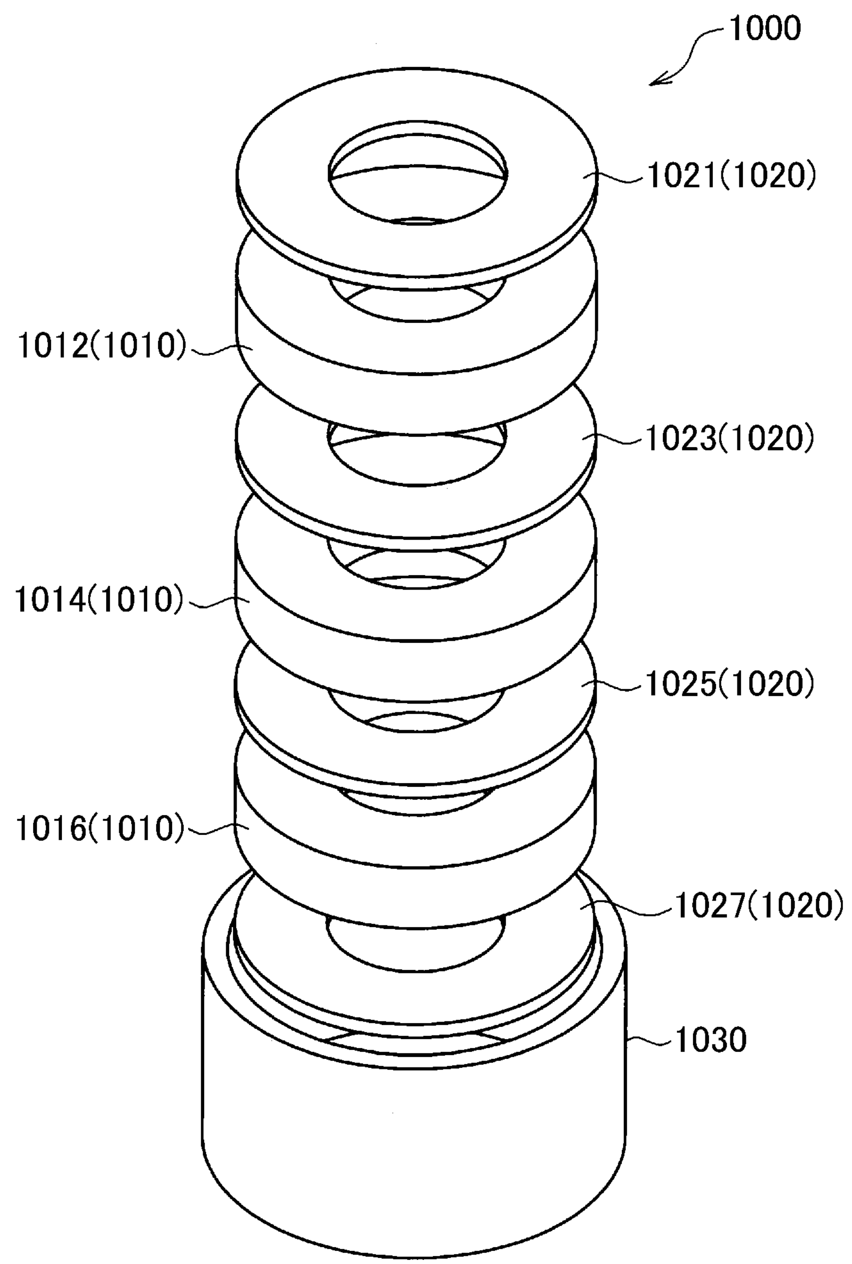
FIG. 10A is a schematic disassembled perspective view showing an example of a superconducting bulk magnet according to a second embodiment of the present invention wherein high strength reinforcing members are joined to the top and bottom surfaces of a donut-shaped oxide superconducting bulk laminate.
Figure 10B:
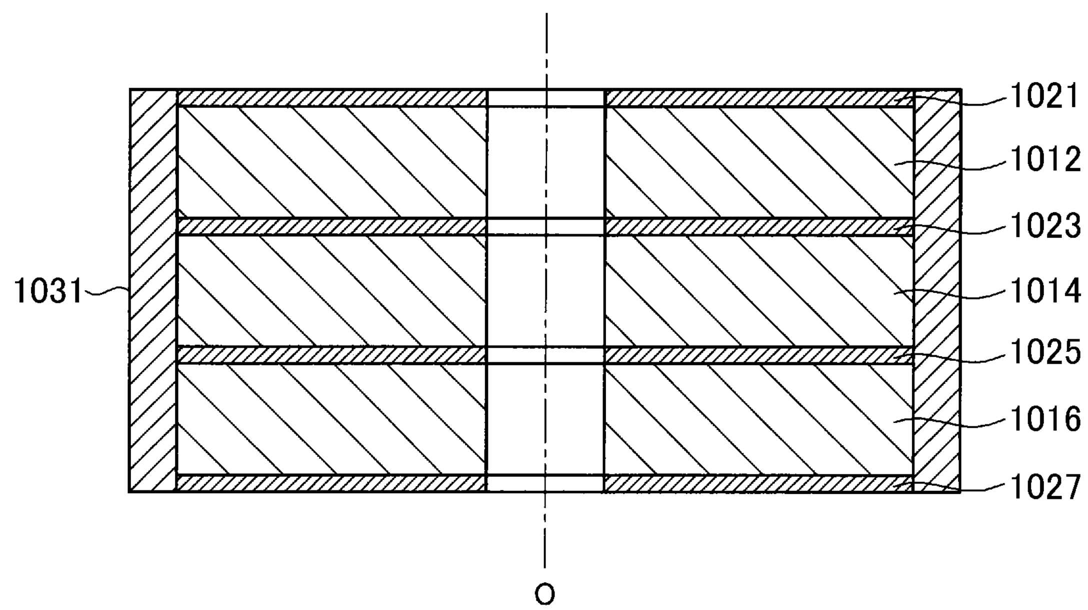
FIG. 10B is a partial cross-sectional view showing an example of the positional relationship of an outer circumference reinforcing ring, high strength reinforcing members, and a donut-shaped oxide superconducting bulk laminate according to the same embodiment.
Figure 10C:
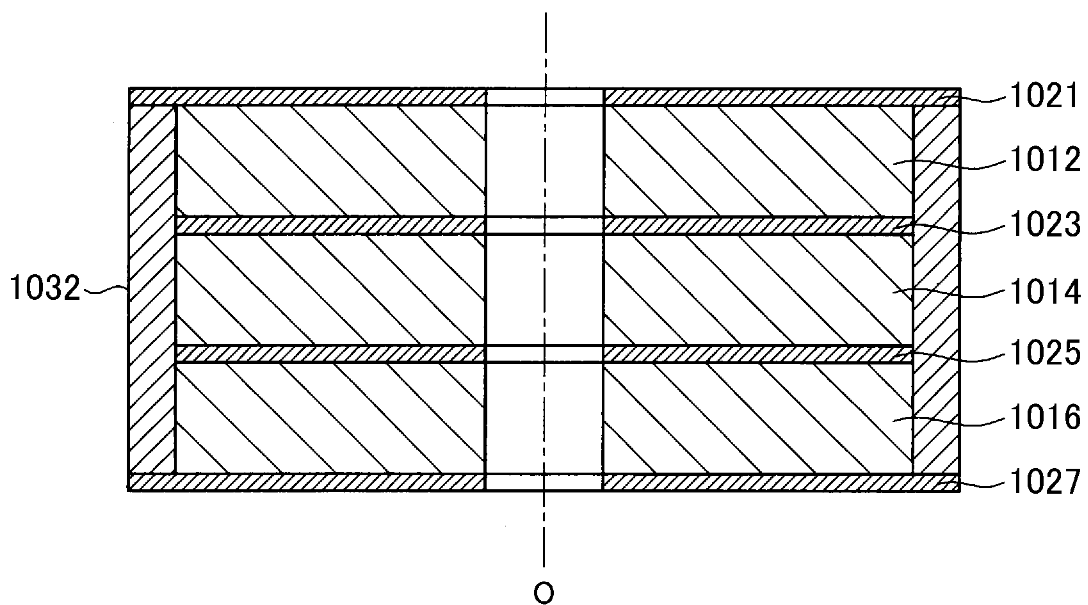
FIG. 10C is a view showing an example of the positional relationship of an outer circumference reinforcing ring, high strength reinforcing members, and a donut-shaped oxide superconducting bulk laminate according to the same embodiment.

Next, a second embodiment will be explained using FIG. 10A to FIG. 10C. FIG. 10A is a schematic disassembled perspective view of one example of an oxide superconducting bulk magnet 1000 according to the present embodiment. FIG. 10B is a partial cross-sectional view of the oxide superconducting bulk magnet 1000 shown in FIG. 10A. FIG. 10C is a partial cross-sectional view of a modification of the oxide superconducting bulk magnet 1000 according to the present embodiment when cut along the center axial line of the oxide superconducting bulk magnet 1000.

The oxide superconducting bulk magnet 1000 according to the present embodiment differs from the first embodiment on the point that the end parts in the center axial line direction are provided with high strength reinforcing members 1020. As shown in FIG. 10A, the oxide superconducting bulk magnet 1000 is comprised of ring-shaped oxide superconducting bulk members 1010, ring-shaped high strength reinforcing members 1020, and an outer circumference reinforcing ring 1030. In the present embodiment, as the oxide superconducting bulk members 1010, three superconducting bulk members 1012, 1014, 1016 are provided, while as the high strength reinforcing members 1020, four high strength reinforcing members 1021, 1023, 1025, 1027 are provided. The oxide superconducting bulk members 1010 and the high strength reinforcing members 1020 are alternately stacked in the center axial line direction of the rings. For example, as shown in FIG. 10A, the high strength reinforcing member 1023 is arranged between the superconducting bulk members 1012, 1014 while the high strength reinforcing member 1025 is arranged between the superconducting bulk members 1014, 1016.

Further, the superconducting bulk member 1012 is provided with a high strength reinforcing member 1021 at the surface at the opposite side to the side where the high strength reinforcing member 1023 is arranged. Similarly, the superconducting bulk member 1016 is provided with a high strength reinforcing member 1027 at the surface at the opposite side to the side where the high strength reinforcing member 1025 is arranged. At this time, the positional relationship among the topmost surface high strength reinforcing member 1021, the bottommost surface high strength reinforcing member 1027, and the outer circumference reinforcing ring 1030, as shown in FIG. 10B, may be made one such that the high strength reinforcing members 1021, 1027 are held in the outer circumference reinforcing ring 1030. Alternatively, as shown in FIG. 10C, the high strength reinforcing members 1021, 1027 may be made substantially the same in outside diameters as the outside shape of the outer circumference reinforcing ring 1030 and the end faces of the outer circumference reinforcing ring 1030 may be covered by the high strength reinforcing members 1021, 1027.

The stacked oxide superconducting bulk members 1010 and high strength reinforcing members 1020 are joined or bonded and a hollow metal outer circumference reinforcing ring 1030 is fit over their outer circumferences. In this way, a donut-shaped oxide superconducting bulk laminate with a hole running through its center is formed. Note that the oxide superconducting bulk members 1010 and the high strength reinforcing members 1020 stacked in the center axial line direction may be joined or bonded together in the same way as in the first embodiment.

FIG. 10A to FIG. 10E show examples where the two end parts of the oxide superconducting bulk magnet 1000 in the center axial line direction are provided with high strength reinforcing members 1021, 1027, but both the topmost surface and the bottommost surface do not necessarily have to have high strength reinforcing members 1021, 1027 arranged at them. For example, it is also possible to arrange below a "donut-shaped oxide superconducting bulk laminate" where only the topmost surface of FIG. 10A has the high strength reinforcing member 1021 arranged at it a "donut-shaped oxide superconducting bulk laminate" where only the bottommost surface of FIG. 10A has the high strength reinforcing member 1027 arranged at it so as to configure a "donut-shaped oxide superconducting bulk laminate" where overall both the topmost surface and the bottommost surface have the high strength reinforcing members 1021, 1027 arranged at them.

Figure 10D:
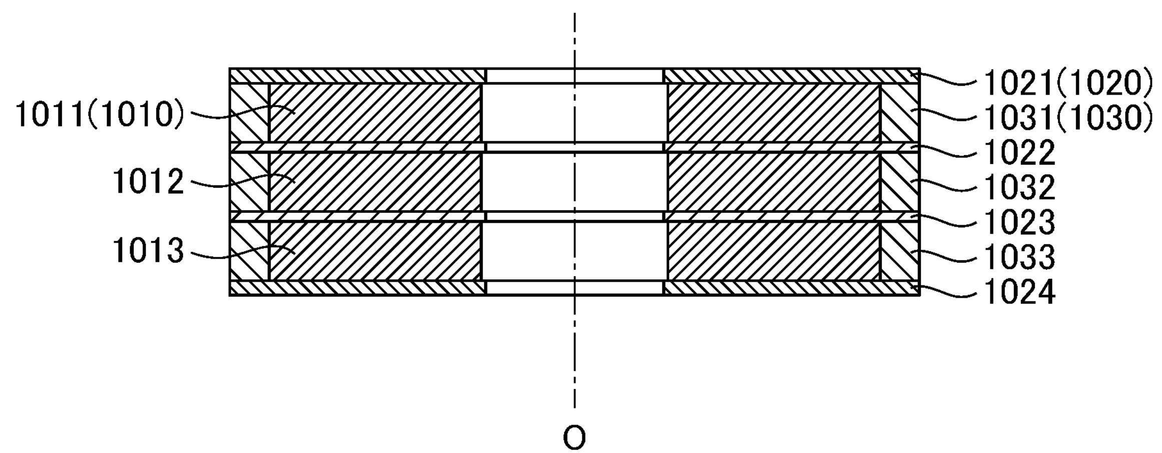
FIG. 10D is a view showing a positional relationship of (a plurality of) outer circumference reinforcing rings, high strength reinforcing members, and a donut-shaped oxide superconducting bulk laminate according to the same embodiment.

Above, the oxide superconducting bulk magnet 1000 according to the present embodiment was explained. According to the present embodiment, ring-shaped high strength reinforcing members 1020 are arranged between the stacked ring-shaped oxide superconducting bulk members 1010 and at the end parts in the center axial line direction. By alternately stacking oxide superconducting bulk members 1010 and high strength reinforcing members 1020 in this way to form a composite member, it is possible to improve the strength. Furthermore, by using high strength reinforcing members 1020 and an outer circumference reinforcing ring 1030 comprised of materials with high thermal conductivity, the occurrence of quenching can also be suppressed. Due to this, it is possible to prevent breakage of an oxide superconducting bulk member 1010 even under high magnetic field strength conditions and possible to obtain a sufficient total amount of magnetic flux inside the rings. Furthermore, it is possible to provide an oxide superconducting bulk magnet 1000 with a high uniformity of magnetic field. Further, FIG. 10D shows the case where the outer circumference reinforcing ring is divided into sections.

Third Embodiment

Figure 11:
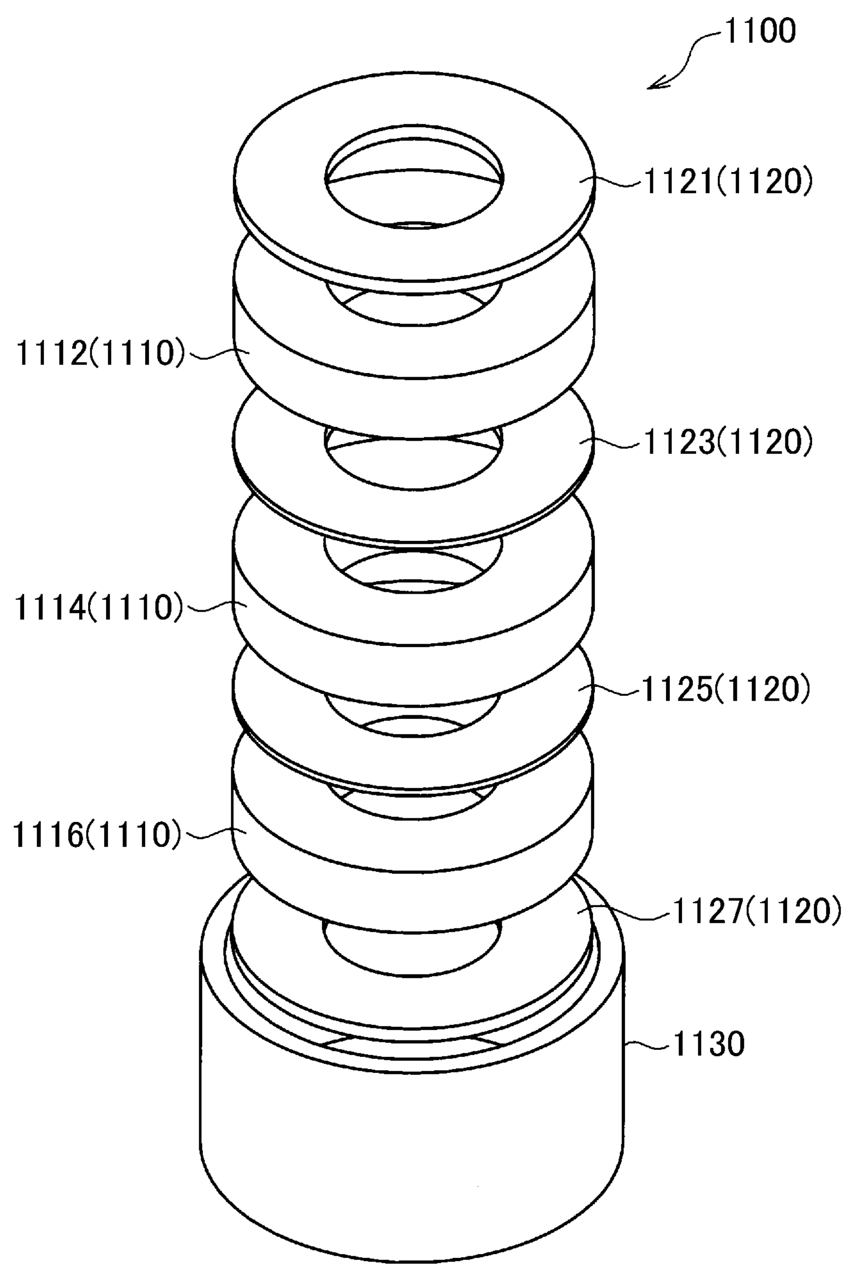
FIG. 11 is a schematic disassembled perspective view showing an example of a donut-shaped oxide superconducting bulk laminate according to a third embodiment of the present invention wherein the thicknesses of the high strength reinforcing members at the top and bottom surfaces are greater than the thicknesses of the other high strength reinforcing members.

Next, a third embodiment will be explained using FIG. 11. FIG. 11 is a schematic disassembled perspective view showing one example of an oxide superconducting bulk magnet 1100 according to the present embodiment. The oxide superconducting bulk magnet 1100 is comprised of ring-shaped oxide superconducting bulk members 1110, ring-shaped high strength reinforcing members 1120, and an outer circumference reinforcing ring 1130. In the present embodiment, as the oxide superconducting bulk members 1110, three superconducting bulk members 1112, 1114, 1116 are provided, while as the high strength reinforcing members 1120, four high strength reinforcing members 1121, 1123, 1125, 1127 are provided.

The oxide superconducting bulk members 1110 and the high strength reinforcing members 1120 are alternately stacked in the center axial line direction of the rings. For example, as shown in FIG. 11, the high strength reinforcing member 1123 is arranged between the superconducting bulk members 1112, 1114, while the high strength reinforcing member 1125 is arranged between the superconducting bulk members 1114, 1116. Further, the superconducting bulk member 1112 is provided with the high strength reinforcing member 1121 at the surface at the opposite side to the side where the high strength reinforcing member 1123 is arranged. Similarly, the superconducting bulk member 1116 is provided with the high strength reinforcing member 1127 at the surface at the opposite side to the side where the high strength reinforcing member 1125 is arranged. Note that the oxide superconducting bulk members 1110 and the high strength reinforcing members 1120 stacked in the center axial line direction may be joined or bonded in the same way as the first embodiment.

The oxide superconducting bulk magnet 1100 according to the present embodiment, compared with the second embodiment, has the thickness of at least one of the high strength reinforcing members 1121, 1127 of the topmost surface and the bottommost surface formed greater than the thicknesses of the other high strength reinforcing members 1123, 1125. This is because the surfaces of the top surface and the bottom surface of the oxide superconducting bulk magnet 1100 are subjected to the maximum stress in the magnetization process. This part has to be sufficiently reinforced. In particular, when using the "donut-shaped oxide superconducting bulk laminate" shown in FIG. 11 alone, that necessity rises. Therefore, by making the thickness of the high strength reinforcing member 1121, 1127 of the topmost surface or the bottommost surface of the oxide superconducting bulk magnet 1100 greater like in the oxide superconducting bulk magnet 1100 according to the present embodiment, it is possible to secure a sufficient strength enabling the maximum stress to be withstood.

Note that, in the same way as the second embodiment, for example, it is also possible to arrange under the "donut-shaped oxide superconducting bulk laminate" with the high strength reinforcing member 1121 arranged only at the topmost surface of FIG. 11 the "donut-shaped oxide superconducting bulk laminate" with the high strength reinforcing member 1127 arranged at only the bottommost surface of FIG. 11 so as to configure a "donut-shaped oxide superconducting bulk laminate" with high strength reinforcing members 1121, 1127 arranged at both of the topmost surface and the bottommost surface.

Fourth Embodiment

Figure 12:
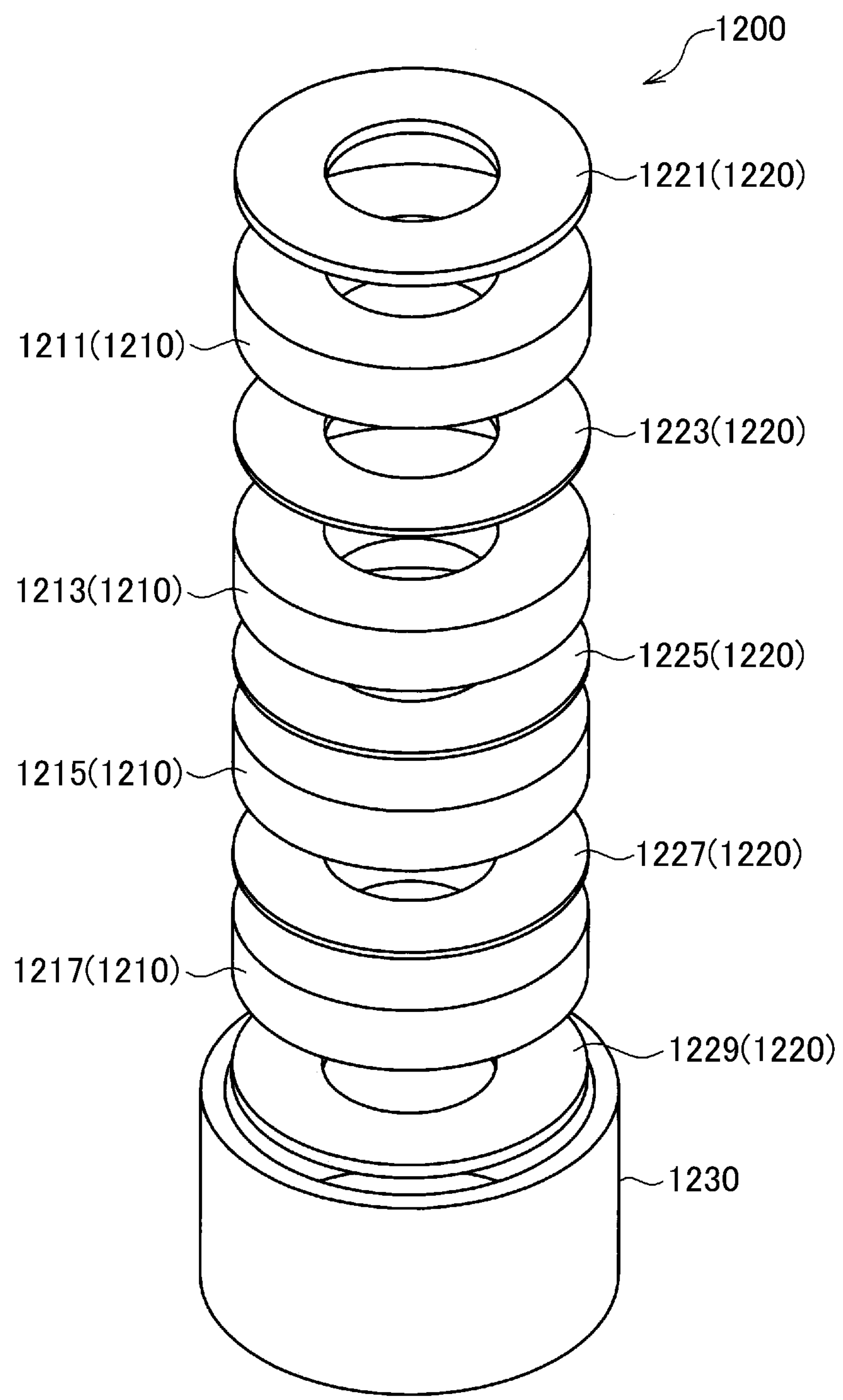
FIG. 12 is a schematic disassembled perspective view showing an example of a donut-shaped oxide superconducting bulk laminate according to a fourth embodiment of the present invention wherein the inside diameters of the ring-shaped high strength reinforcing members are smaller than the inside diameters of the ring-shaped oxide superconducting bulk members.

Next, a fourth embodiment will be explained using FIG. 12. FIG. 12 is a schematic disassembled perspective view of one example of an oxide superconducting bulk magnet 1200 according to the present embodiment. The oxide superconducting bulk magnet 1200 is comprised of ring-shaped oxide superconducting bulk members 1210, ring-shaped high strength reinforcing members 1220, and an outer circumference reinforcing ring 1230. In the present embodiment, as the oxide superconducting bulk members 1210, four superconducting bulk members 1212, 1214, 1216, 1218 are provided, while as the high strength reinforcing members 1220, five high strength reinforcing members 1221, 1223, 1225, 1227, 1229 are provided.

The oxide superconducting bulk magnet 1200 according to the present embodiment, compared with the first to third embodiments, has the inside diameters of the high strength reinforcing members 1220 smaller than the inside diameters of the oxide superconducting bulk members 1210. The inner circumferential surfaces of the ring-shaped oxide superconducting bulk members 1210 are the parts where stress concentrates in the magnetization process. If cracks form at the oxide superconducting bulk magnet 1200, they often start from these parts. By making the inside diameters of the high strength reinforcing members 1220 smaller, it is possible to increase the effect of suppression of formation of cracks from the inner circumferential surfaces of the oxide superconducting bulk members 1210. Further, when the inside diameters of the top and bottom ring-shaped oxide superconducting bulk members 1210 differ, the inside diameters of the high strength reinforcing members 1220 have to be made smaller than the smaller inside diameters. By reinforcing the parts forming the starting points of cracks, it is possible to enhance the effect of reinforcement against cracks. Cracks of the ring-shaped oxide superconducting bulk members 1210 start at the inner circumferential surfaces. In particular, it is preferable to reinforce intersecting parts of the top surfaces or bottom surfaces with the inner circumferential surfaces. Therefore, by making the inside diameters of the high strength reinforcing members 1220 smaller than the oxide superconducting bulk members 1210 of the smaller inside diameters, it is possible to reinforce the oxide superconducting bulk members 1210 of the smaller inside diameters. Furthermore, by using high strength reinforcing members 1220 and an outer circumference reinforcing ring 1230 comprised of materials with high thermal conductivities, the occurrence of quenching can be suppressed.

Fifth Embodiment

Figure 13A:
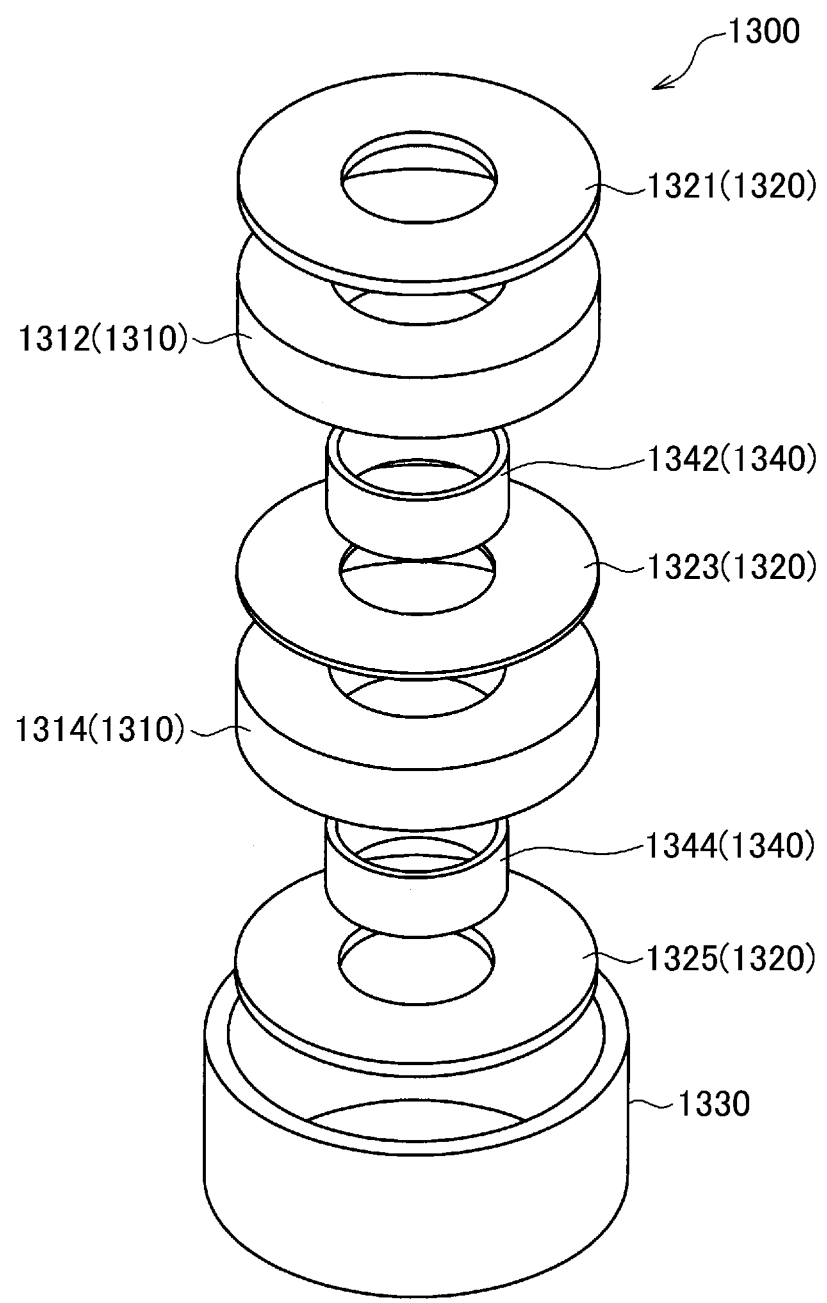
FIG. 13A is a schematic disassembled perspective view showing an example of a donut-shaped oxide superconducting bulk laminate according to a fifth embodiment of the present invention wherein the inside diameters of the ring-shaped high strength reinforcing members are smaller than the inside diameters of the ring-shaped oxide superconducting bulk members and wherein inner circumference reinforcing rings are provided.

Next, the fifth embodiment will be explained using FIG. 13A to FIG. 13E. FIG. 13A is a schematic disassembled perspective view showing one example of an oxide superconducting bulk magnet 1300 according to the present embodiment. FIG. 13B to FIG. 13E show partial cross-sectional views of modifications of the oxide superconducting bulk magnet 1300 according to the present embodiment when cut along the center axial line of the oxide superconducting bulk magnet 1300.

The oxide superconducting bulk magnet 1300 is comprised of ring-shaped oxide superconducting bulk members 1310, ring-shaped high strength reinforcing members 1320, an outer circumference reinforcing ring 1330, and inner circumference reinforcing rings 1340. In the example shown in FIG. 13A, as the oxide superconducting bulk members 1310, two superconducting bulk members 1312, 1314 are provided, while as the high strength reinforcing members 1320, three high strength reinforcing members 1321, 1323, 1325 are provided. Further, as the inner circumference reinforcing rings 1340, two inner circumference reinforcing rings 1342, 1344 are provided.

The oxide superconducting bulk magnet 1300 according to the present embodiment differs from the first to fourth embodiments in the point that the inner circumference reinforcing rings 1340 for reinforcing the inner circumferential surfaces of the oxide superconducting bulk members 1310 are joined or bonded with the inner circumferential surfaces of the oxide superconducting bulk members 1310. The inner circumference reinforcing rings 1340 are joined or bonded together with the high strength reinforcing members 1320, so even in the case of materials with linear expansion coefficients larger than the oxide superconducting bulk members 1310, it is possible to strongly join the inner circumferential surfaces of the oxide superconducting bulk members 1310 and high strength reinforcing members 1320. Therefore, it is possible to reinforce these inner circumferential surfaces and there is the effect of suppression of cracking.

Furthermore, by using high strength reinforcing members 1320, inner circumference reinforcing rings 1340, and an outer circumference reinforcing ring 1330 comprised of materials with high thermal conductivities, the occurrence of quenching can also be suppressed. At this time, the high strength reinforcing members 1320 and the outer circumference reinforcing ring 1330 can be configured in the same way as the above-mentioned first embodiment. Further, regarding the inner circumference reinforcing rings 1340 as well, to improve the quench inhibiting effect, for example, it is possible to use materials containing mainly metals having a high thermal conductivity such as copper, aluminum, and silver. The thermal conductivities of the inner circumference reinforcing rings 1340 having high thermal conductivities, from the viewpoint of transfer and absorption of the heat generated in the superconducting material, are preferably 20 W/(m·K) or more in a 20K to 70K temperature region in which cooling by a refrigerating machine etc. enables stable formation of a strong magnetic field, more preferably, 100 W/(m·K) or more. Further, the inner circumference reinforcing rings 1340 may also be comprised of pluralities of rings arranged concentrically. That is, the facing rings are made to contact each other at their circumferential surfaces so as to form overall single inner circumference reinforcing rings. In this case, at least one of the rings forming the inner circumference reinforcing rings should have a thermal conductivity of 20 W/(m·K) or more.

Figure 13B:
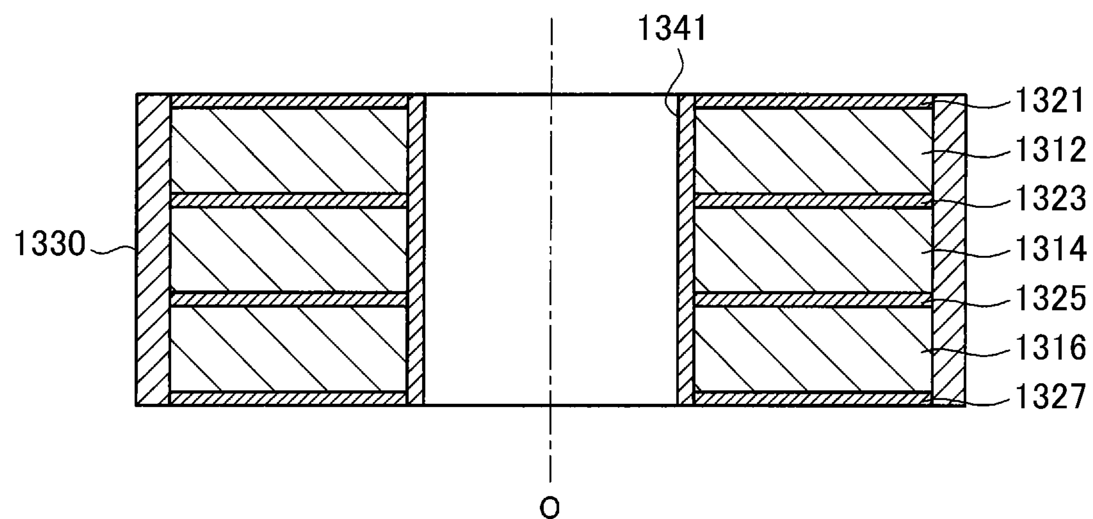
FIG. 13B is a partial cross-sectional view showing an example of the positional relationship of an inner circumference reinforcing ring, high strength reinforcing members, and ring-shaped oxide superconducting bulk members according to the same embodiment.

Further, at this time, it is preferable to make the inner circumferential surfaces of the ring-shaped oxide superconducting bulk members 1310 and the outer circumferential surfaces of the inner circumference reinforcing rings 1340 closely contact each other. Further, as the basic positional relationship between the inner circumference reinforcing rings 1340 and the high strength reinforcing members 1320, for example, as shown in FIG. 13B, it is possible to make the inside diameters of the oxide superconducting bulk members 1310 and high strength reinforcing members 1320 the same and provide a single inner circumference reinforcing ring 1341.

Figure 13C:
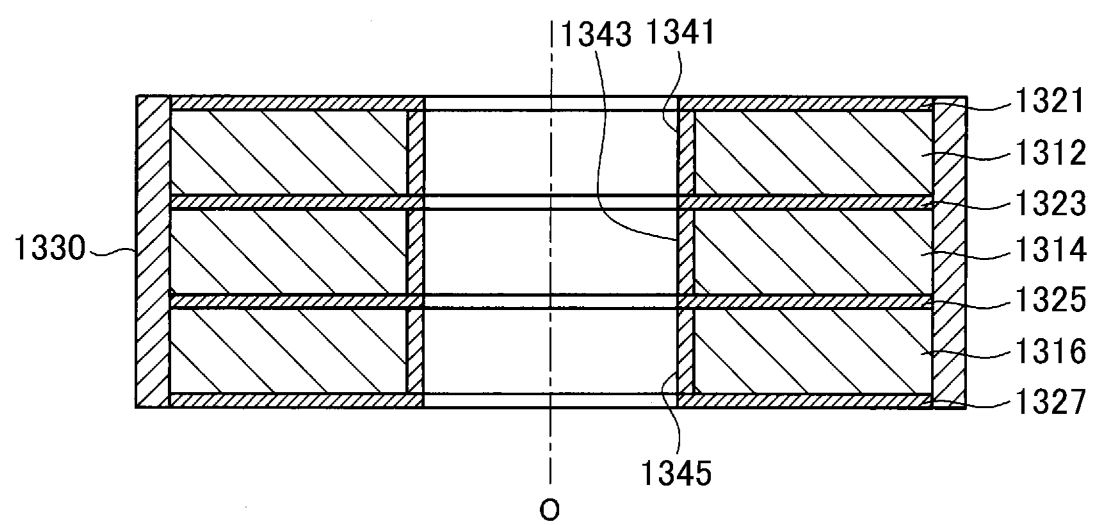
FIG. 13C is a partial cross-sectional view showing an example of the positional relationship of inner circumference reinforcing rings, high strength reinforcing members, and ring-shaped oxide superconducting bulk members according to the same embodiment.
Figure 13D:
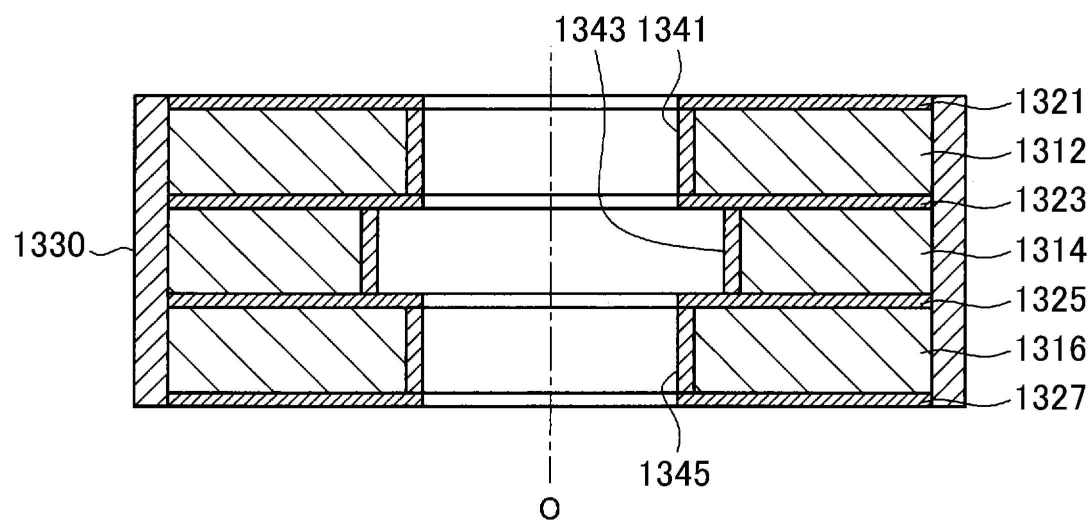
FIG. 13D is a partial cross-sectional view showing an example of the positional relationship of inner circumference reinforcing rings, high strength reinforcing members, and ring-shaped oxide superconducting bulk members according to the same embodiment.
Figure 13E:
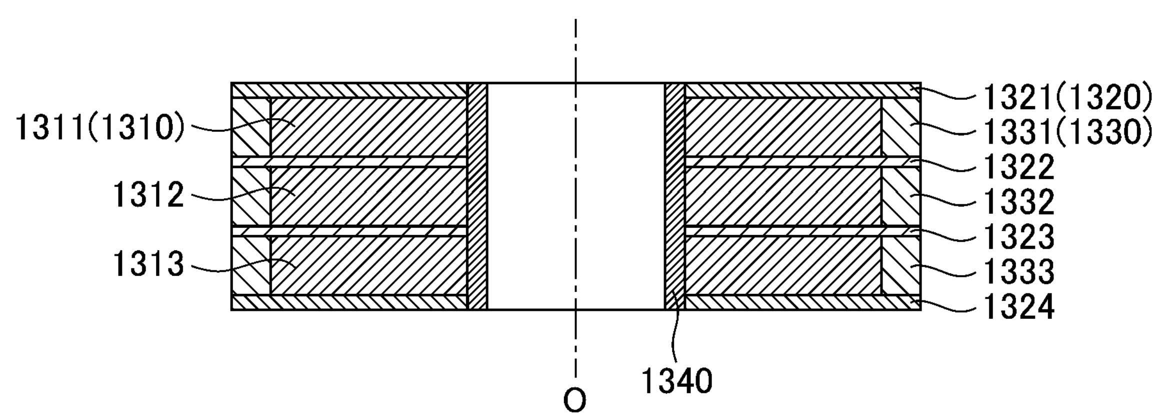
FIG. 13E is a partial cross-sectional view showing an example of the positional relationship of an inner circumference reinforcing ring, high strength reinforcing members, and ring-shaped oxide superconducting bulk members according to the same embodiment.

Alternatively, as shown in FIG. 13C, it is also possible to make the inside diameters of the high strength reinforcing members 1320 slightly smaller than the inside diameters of the oxide superconducting bulk members 1310, provide inner circumference reinforcing rings 1341, 1343, 1345 at the inner circumferential surfaces of the oxide superconducting bulk members 1312, 1314, 1316, and make the inside diameters of the high strength reinforcing members 1321, 1323, 1325, 1327 and the inside diameters of the inner circumference reinforcing rings 1341, 1343, 1345 the same. If the thicknesses of the inner circumference reinforcing rings 1340 are greater than the thicknesses of the high strength reinforcing members 1320, from the viewpoint of the strength, FIG. 13C is preferable. Due to this, it is possible to increase the contact areas between the inner circumference reinforcing rings 1340 and the high strength reinforcing members 1320 and possible to increase the strengths of the connecting parts of the inner circumference reinforcing rings 1340 and the high strength reinforcing members 1320. Further, when the inner circumference diameters of the ring-shaped oxide superconducting bulk members 1310 differ, from the viewpoint of the work efficiency, as shown in FIG. 13D, it is preferable that the inner circumference reinforcing rings 1340 be divided into sections such as the inner circumference reinforcing rings 1341, 1343, 1345. FIG. 13E shows the case where the outer circumference reinforcing ring is divided into sections.

Sixth Embodiment

Figure 14A:
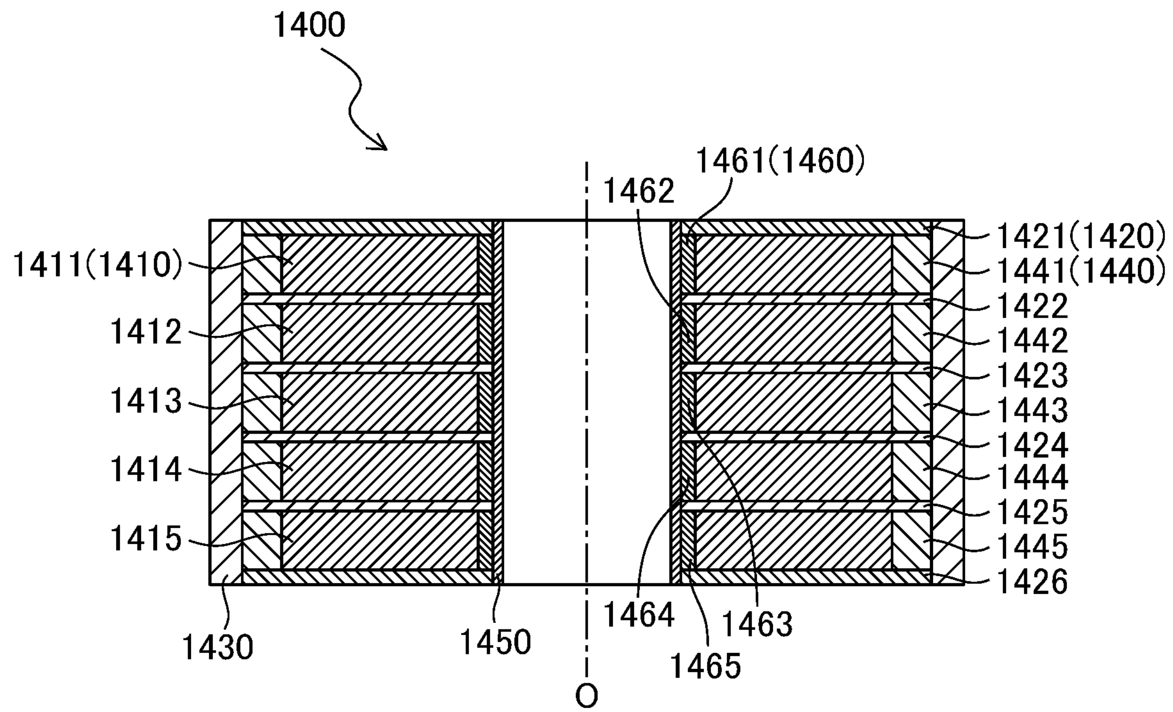
FIG. 14A is a partial cross-sectional view showing an example of a positional relationship of one example of a donut-shaped oxide superconducting bulk laminate according to a sixth embodiment of the present invention wherein the inner circumference reinforcing ring has a two-layer structure in the diametrical direction and the outside diameters of the outside inner circumference reinforcing rings are larger than the inside diameters of the high strength reinforcing members. Further, it also shows an example where the outside diameters of the high strength reinforcing members are larger than the outside diameter of at least one of the oxide superconducting bulk members joined or bonded with the high strength reinforcing members.
Figure 14B:
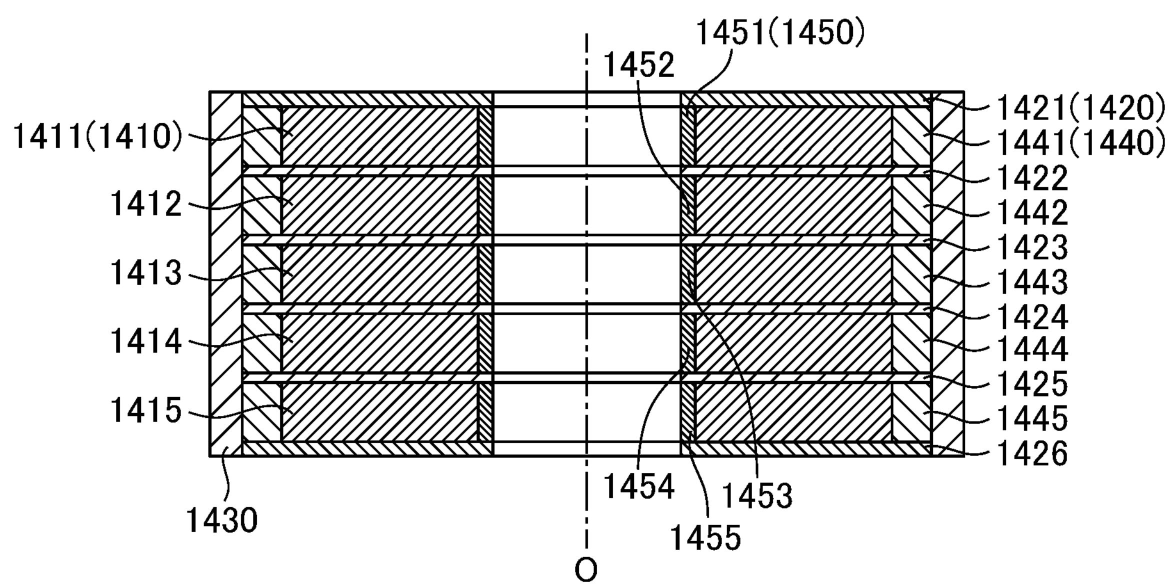
FIG. 14B is a partial cross-sectional view showing an example where the outer circumference reinforcing ring has a two-layer structure in the diametrical direction and the inside diameters of the inside outer circumference reinforcing rings are smaller than the outside diameters of the high strength reinforcing members.
Figure 14C:
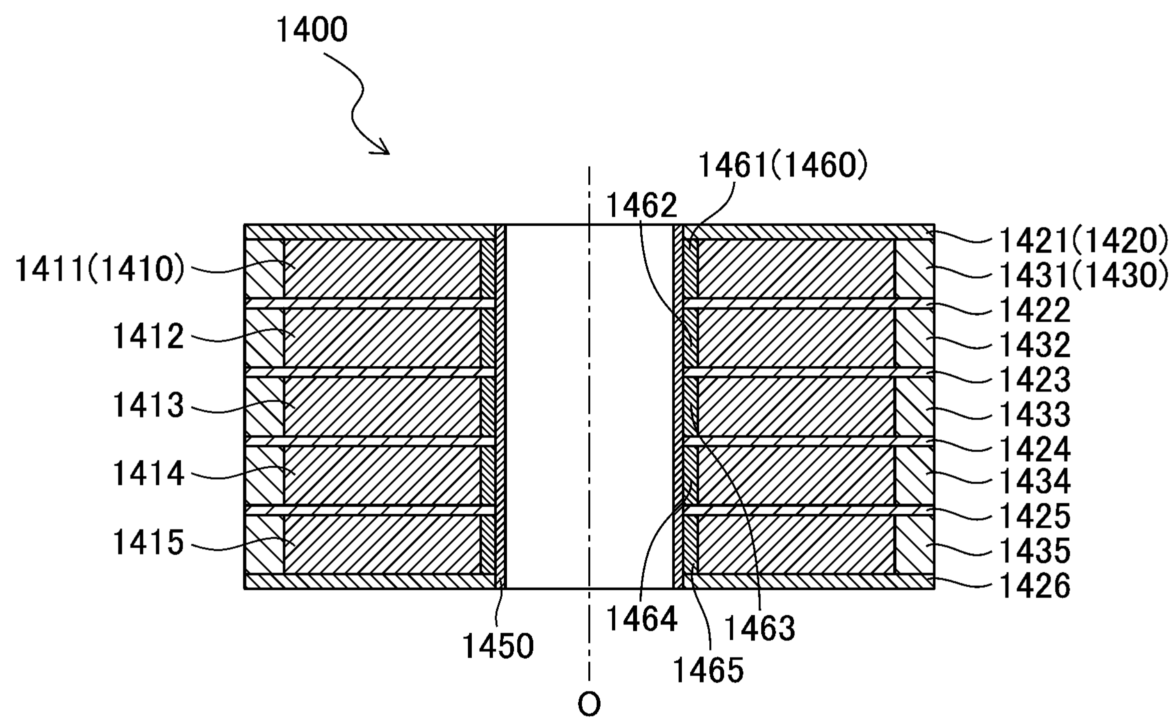
FIG. 14C is a partial cross-sectional view showing an example where the outer circumference reinforcing ring and inner circumference ring have two-layer structures in the diametrical direction, the inside diameter of an inside outer circumference reinforcing ring is smaller than the outside diameters of the high strength reinforcing members contacted, and the outside diameter of an outside inner circumference reinforcing ring is larger than the inside diameters of the high strength reinforcing members contacted.

Next, a sixth embodiment will be explained using FIG. 14A to FIG. 14C. FIGS. 14A to 14C are partial cross-sectional views showing an example of the oxide superconducting bulk magnet 1400 according to the present embodiment when cut along the center axial line.

The oxide superconducting bulk magnet 1400 is comprised of ring-shaped oxide superconducting bulk members 1410, ring-shaped high strength reinforcing members 1420, an outside outer circumference reinforcing ring 1430, inside outer circumference reinforcing rings 1440, an inside inner circumference reinforcing ring 1450, and outside inner circumference reinforcing rings 1460. In the example shown in FIG. 14A, as the oxide superconducting bulk members 1410, five superconducting bulk members 1411 to 1415 are provided, while as the high strength reinforcing members 1420, six high strength reinforcing members 1421 to 1426 are provided. In the example shown in FIG. 14A, five inside outer circumference reinforcing rings 1440 (1441 to 1445) and five outside inner circumference reinforcing rings 1460 (1461 to 1465) are provided. As the oxide superconducting bulk members 1410, five superconducting bulk members 1411 to 1415 are provided, while as the high strength reinforcing members 1420, six high strength reinforcing members 1421 to 1426 are provided.

The oxide superconducting bulk magnet 1400 according to the present embodiment differs from the first to fifth embodiments in the point that the outer circumference end parts of the high strength reinforcing members 1420 are joined at the inside outer circumference reinforcing rings 1440 and the outside outer circumference reinforcing ring 1430. Furthermore, it differs in that the inner circumference end parts of the high strength reinforcing members 1420 are joined at the inside inner circumference reinforcing ring 1450 and the outside inner circumference reinforcing rings 1460.

The outer circumference and inner circumference reinforcing rings can be made using metal, so can be strongly connected with the metal high strength reinforcing members by solder etc. The two-layer inner circumference and outer circumference rings enable strong joining from the two directions of the side surfaces and the top and bottom surfaces. Due to this effect, there is the remarkable advantageous effect that the oxide superconducting bulk members 1410 can be strongly joined with the surrounding reinforcing members and cracks can be suppressed.

Furthermore, by using high strength reinforcing members 1420, two-layer inner circumference reinforcing rings (1450, 1460), and two-layer outer circumference reinforcing rings (1430, 1440) comprised of materials with high thermal conductivities, the occurrence of quenching can be suppressed. At this time, the high strength reinforcing members 1420 and outer circumference reinforcing rings (1430, 1440) can be configured in the same way as in the above-mentioned first embodiment. Further, regarding the inner circumference reinforcing rings (1450, 1460) as well, to improve the quench inhibiting effect, for example, a material containing as a main ingredient a metal having a high thermal conductivity such as copper, aluminum, or silver may be used. The thermal conductivity of the inner circumference reinforcing rings (1450, 1460) having a high thermal conductivity, from the viewpoint of transfer and absorption of heat generated inside the superconducting material, is preferably 20 W/(m·K) or more in a 20K to 70K temperature region in which cooling by a refrigerating machine etc. enables stable formation of a strong magnetic field, more preferably, 100 W/(m·K) or more. Further, the inner circumference reinforcing rings (1450, 1460) can be formed by arranging pluralities of rings concentrically. That is, the facing rings are made to contact each other at their circumferential surfaces so as to form overall single inner circumference reinforcing rings. In this case, at least one of the rings forming the inner circumference reinforcing rings should have a thermal conductivity of 20 W/(m·K) or more.

FIG. 14B shows one example of the case of joining the high strength reinforcing sheets at only the outer circumferences from the side surfaces and top and bottom surfaces of the outer circumference end parts by the two-layer ring structure. The case where, in design, it is necessary to secure the inside diameter and other cases where the inner circumference end parts of inner circumference reinforcing high strength reinforcing sheets are joined by the inner circumference rings only from the top and bottom surfaces may also be considered.

FIG. 14C shows an example of the case of joining the high strength reinforcing sheets at only the inner circumferences from the side surfaces and top and bottom surfaces of the outer circumference end parts by the two-layer ring structure. The case where, in design, there are restrictions on the outside diameter and other cases where the outer circumference end parts of the reinforcing high strength reinforcing sheets are joined by the outer circumference ring only from the top and bottom surfaces may also be considered.

Seventh Embodiment

Figure 15:
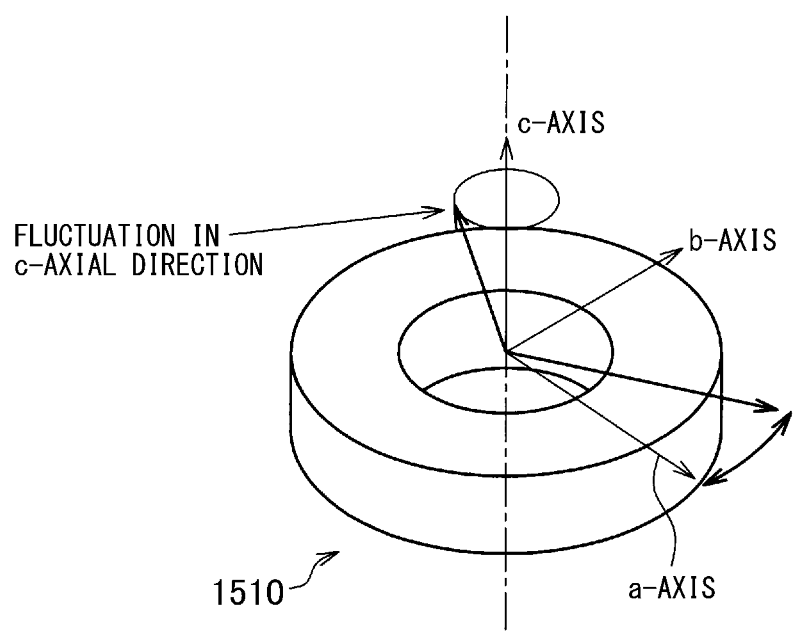
FIG. 15 is an explanatory view showing fluctuations in the crystallographic orientation of a superconducting bulk material.

Next, the seventh embodiment will be explained using FIG. 15. FIG. 15 is an explanatory view showing the fluctuation in the crystallographic orientation of a superconducting bulk member 1510.

An oxide superconducting bulk member 1510 is a single-crystal material, so anisotropy of crystal orientation appears as disturbances in the distribution of trapped magnetic flux density (deviation from axial symmetry). To reduce the anisotropy of crystal orientation, the oxide superconducting bulk members 1510 may be offset in crystal orientation while stacking the oxide superconducting bulk members 1510.

When stacking a plurality of ring-shaped oxide superconducting bulk members 1510, for the relative crystal axes, it is preferable that the members be arranged so that the c-axial directions substantially match the inner circumference axes of the rings and simultaneously that the orientations of the a-axes be offset. Comprised of single-crystal form $RE_1Ba_2Cu_3O_y$, in which $RE_2BaCuO_5$ is finely dispersed, the ring-shaped oxide superconducting bulk members 1510 generally have fluctuation in the crystal orientation of the single-crystal form $RE_1Ba_2Cu_3O_y$. The magnitude of the fluctuation in the c-axial direction is about ±15°. The fact that "the c-axial direction substantially matches the inner circumference axes of the rings" discussed here means that the offset in single crystal orientation is about ±15°. The angle of offset of the a-axis depends on the number stacked, but preferably is 180°, 90°, or other angle not four-fold symmetric.

In this way, by offsetting the crystal orientations of the oxide superconducting bulk members 1510 while stacking the oxide superconducting bulk members 1510, it is possible to reduce anisotropy of crystal orientation.

Eighth Embodiment

Figure 16A:
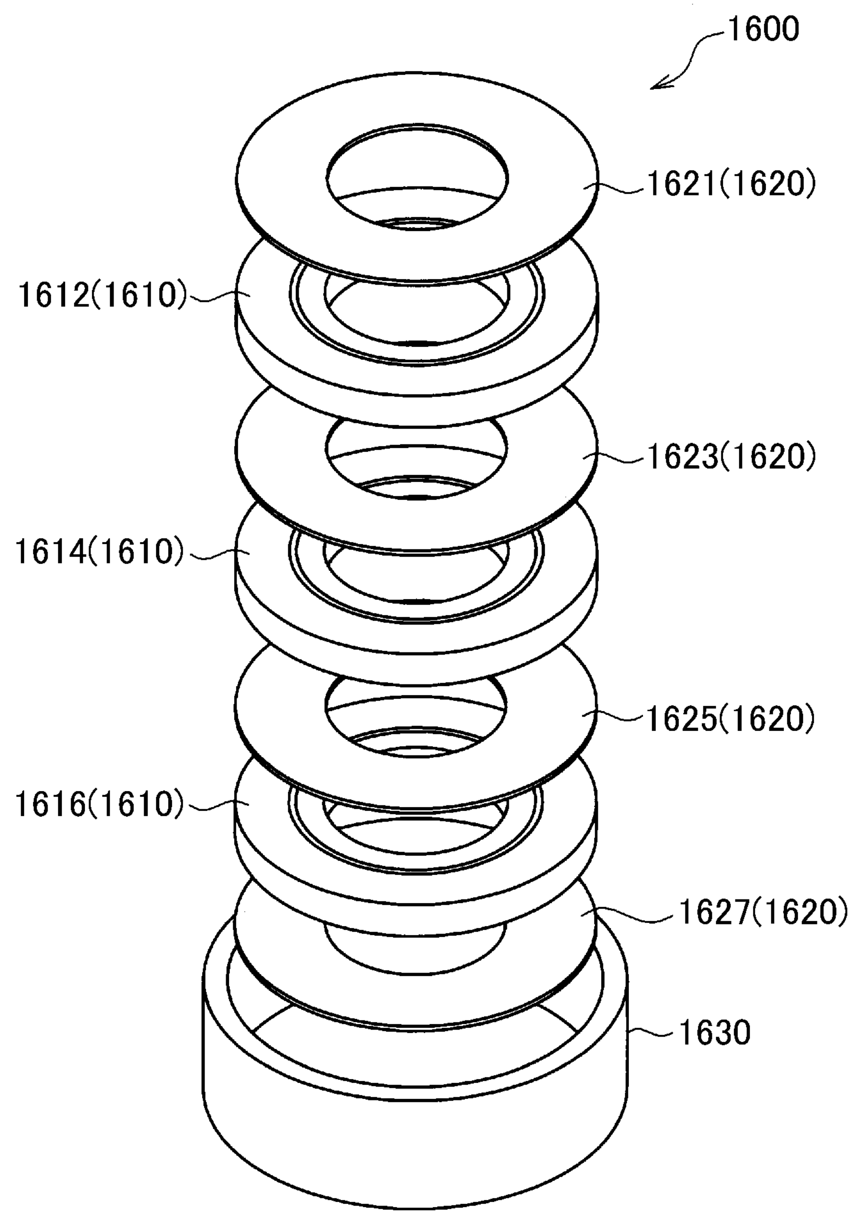
FIG. 16A is a schematic disassembled perspective view showing an example of a donut-shaped oxide superconducting bulk laminate according to a seventh embodiment of the present invention wherein the ring-shaped oxide superconducting bulk members have multi-layer ring structures.
Figure 16B:
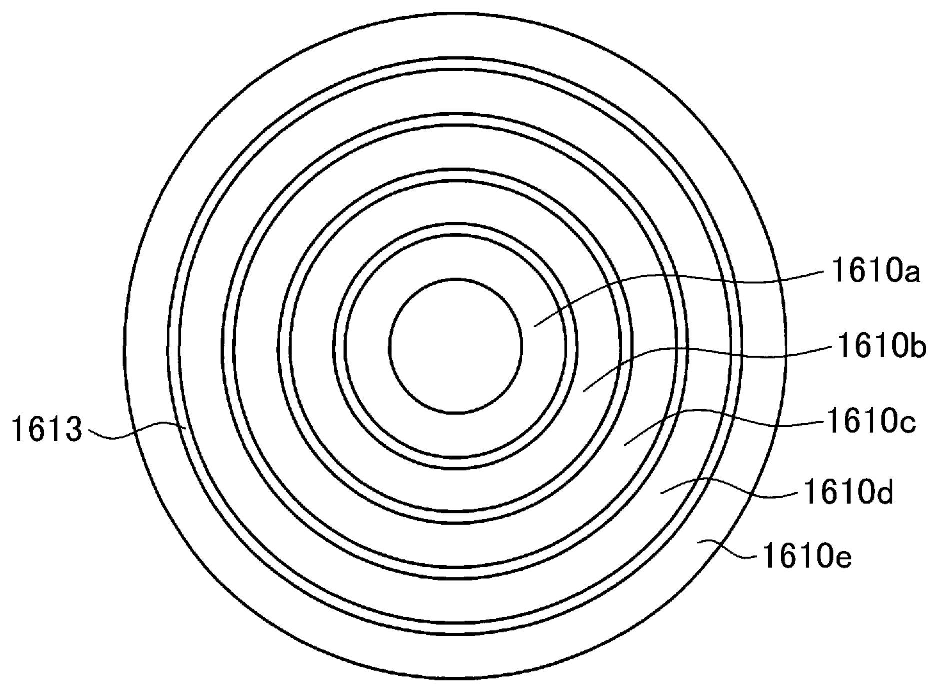
FIG. 16B is a plan view showing one example of a multi-layer ring-shaped superconducting bulk member according to the same embodiment.
Figure 16C:
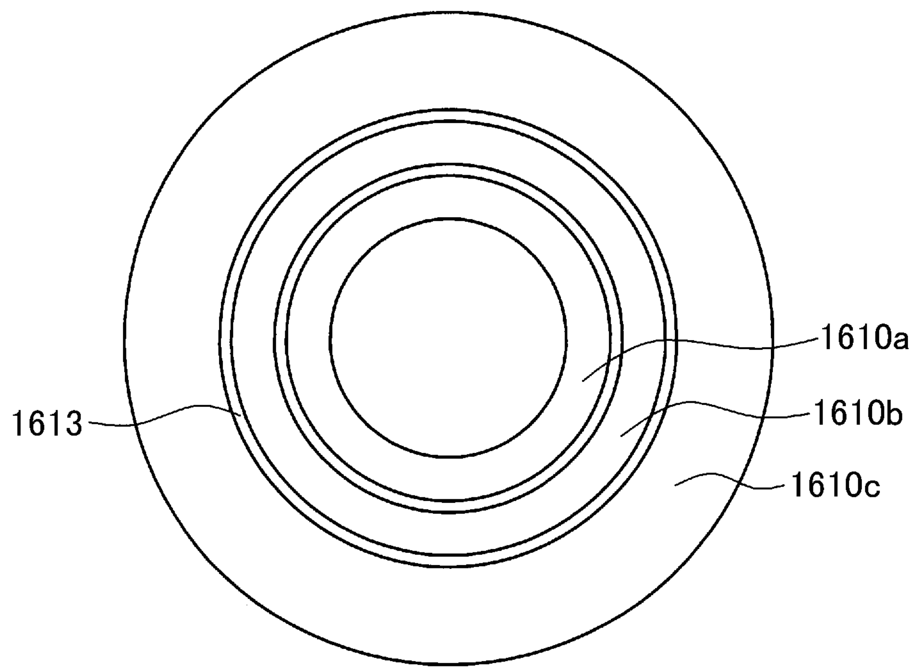
FIG. 16C is a plan view showing another example of a multi-layer ring-shaped superconducting bulk member according to the same embodiment.
Figure 16D:
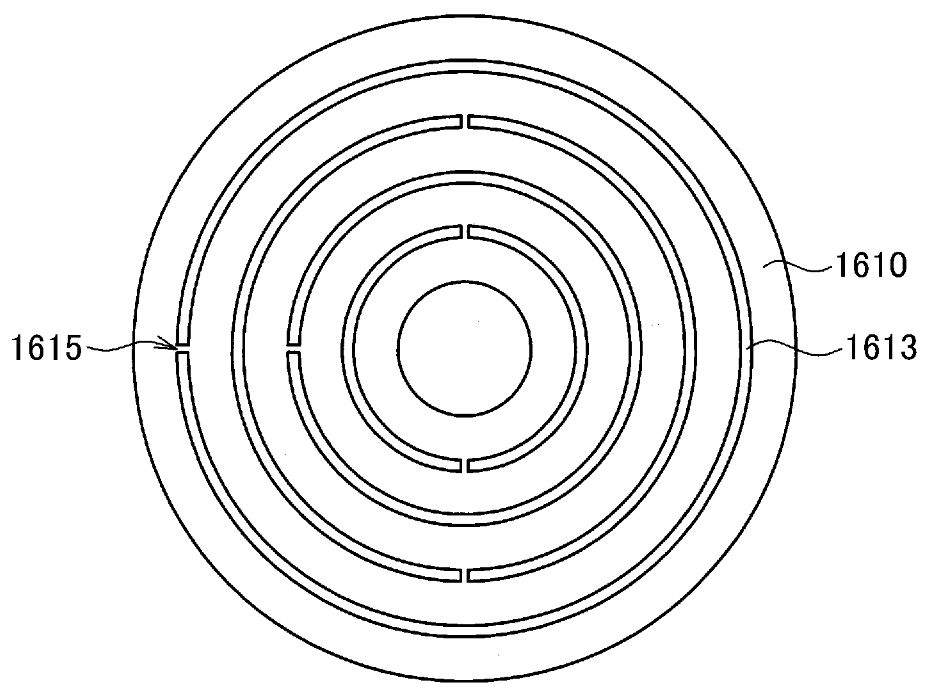
FIG. 16D is a plan view showing still another example of a multi-layer ring-shaped superconducting bulk member according to the same embodiment.

Next, an eighth embodiment will be explained using FIG. 16A to FIG. 16D. FIG. 16A is a schematic disassembled perspective view showing one example of an oxide superconducting bulk magnet 1600 according to the present embodiment. FIG. 16B to FIG. 16D show examples of the configuration of the oxide superconducting bulk member 1610 according to the present embodiment and are plan views of oxide superconducting bulk members 1610.

The oxide superconducting bulk magnet 1600 according to the present embodiment differs from the first to the sixth embodiments in the point that the oxide superconducting bulk members 1610 have multi-layer ring structures in the diametrical direction. A "multi-layer ring structure" means a structure not of a single ring in the diametrical direction but a plurality of rings arranged concentrically. For example, as shown in FIG. 16B, an oxide superconducting bulk member 1610 may be made a five-layer ring structure comprised of rings 1610*a* to 1610*e* with different inside diameters and outside diameters and substantially the same widths of the diametrical direction arranged concentrically with predetermined gaps 1613 in the diametrical direction.

Further, for example, as shown in FIG. 16C, an oxide superconducting bulk member 1610 may also be made a four-layer ring structure comprised of rings 1610*a* to 1610*c* with different inside diameters and outside diameters arranged concentrically with predetermined gaps 1613 in the diametrical direction. At this time, the width of the ring 1610*c* in the diametrical direction may be made larger than the widths of the other rings 1610*a*, 1610*b* in the diametrical direction. The widths of the rings are design matters.

By stacking such multi-layer ring structure ring-shaped oxide superconducting bulk members 1610, the oxide superconducting bulk members 1610 tend to have four-fold symmetry slightly reflected in the superconducting current distribution as well due to the crystal growth accompanied with four-fold symmetry, but by making a concentric multilayer ring shape, the action arises of making the path of the superconducting current induced by the magnetization approach axial symmetry. Due to this effect, the uniformity of the trapped magnetic field is improved. An oxide superconducting bulk magnet 1600 having such characteristics is particularly suitable for NMR or MRI applications where high uniformity of the magnetic field is sought.

Further, an oxide superconducting bulk member 1610, for example, as shown in FIG. 16D, may also be comprised of a single ring in which concentric arc-shaped gaps 1613 are formed and in which a plurality of connecting parts 1615 are provided in the circumferential direction of the gaps 1613 on the same circumferences. Due to this, it is possible to simplify the assembly work of the oxide superconducting bulk magnet 1600.

EXAMPLES

Example 1

Figure 6A:
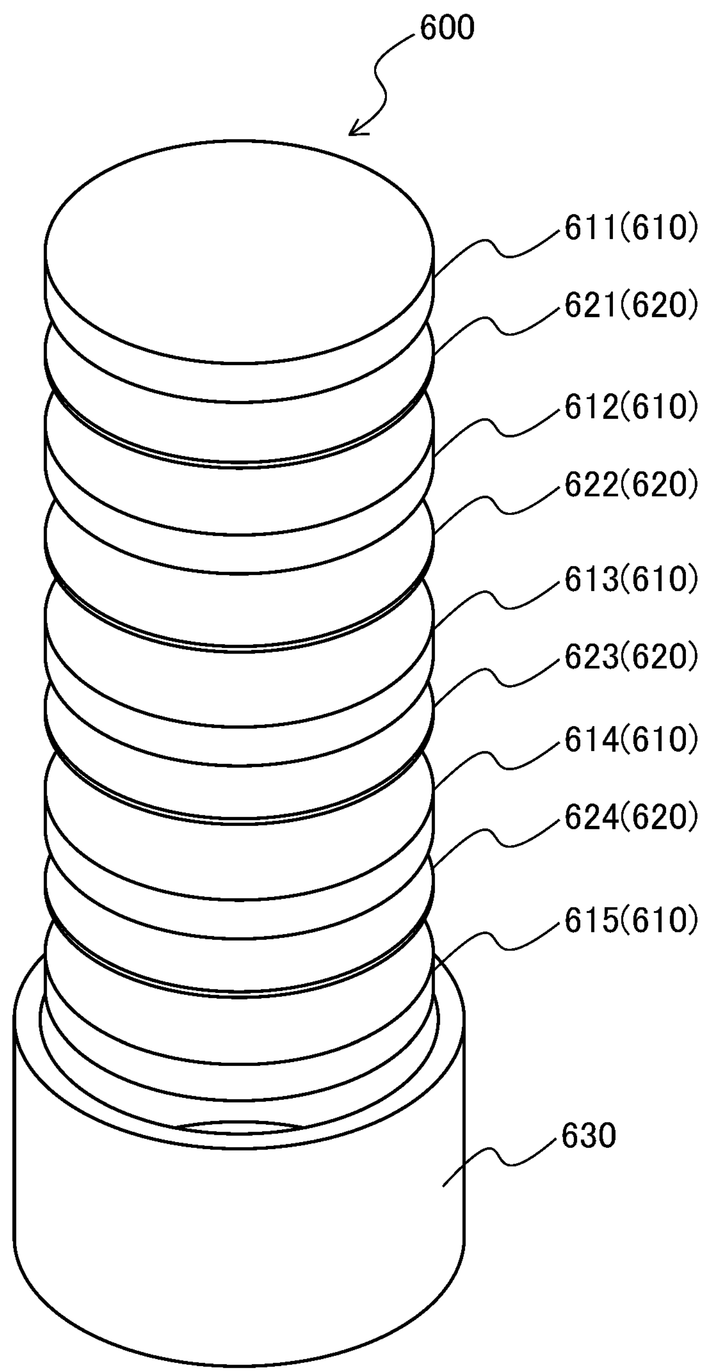
FIG. 6A is a schematic disassembled perspective view showing an oxide superconducting bulk magnet according to Example 1.

FIG. 6A shows an oxide superconducting bulk magnet of Example 1. In the oxide superconducting bulk magnet 600 of Example 1, Gd—Ba—Cu—O-based oxide superconducting bulk members were used. First, powders of oxides of commercially available purity 99.9 mass % gadolinium (Gd), barium (Ba), and copper (Cu) were weighed to give a molar ratio of Gd:Ba:Cu=1.6:2.3:3.3. To this, platinum was added in 0.5 mass % and silver was added in 10 mass %. The weighed powders were fully kneaded over 1 hour, then were calcined in the atmosphere at 1173K for 8 hours.

Next, a mold was used to shape the calcined powder to a disk shape. This shaped part was heated to 1423K to a molten state, was held there for 30 minutes, then in the middle of being lowered in temperature, was seeded, and was gradually cooled over a temperature region of 1278K to 1252K over 180 hours to grow the crystal and obtain a diameter 70 mm single-crystal form oxide superconducting bulk member. This single-crystal form oxide superconducting bulk member was worked to an outside diameter 65.0 mm and height 8.0 mm. At this time, the end material formed by this working was polished to a mirror surface and was examined for microcrystalline structure by an optical microscope, whereupon 1 μm or so parts of a 211 phase were dispersed.

Furthermore, sputtering was used to coat the surface of the superconducting bulk member with silver to about 2 μm. This was heat treated in an oxygen stream at 703K for 100 hours. Similar processing was performed to prepare five superconducting bulk members 610 (611 to 615).

Further, a thickness 1.0 mm Nichrome sheet was worked to an outside diameter of 65.0 mm to similarly prepare four high strength reinforcing members 620 (621 to 624). The surfaces of the Nichrome were thinly coated with solder in advance. For the outer circumference reinforcing ring 630, an SUS316L outside diameter 73.0 mm, inside diameter 65.05 mm, height 44.5 mm ring was used. Its inner circumferential surface was also lightly coated with solder.

Next, the superconducting bulk members 610 and Nichrome (high strength reinforcing members 620) were alternately inserted into the outer circumference reinforcing ring 630 heated to a temperature at which the solder melts, the solder was made to evenly coat them, then the overall assembly was cooled to room temperature to thereby join the members and prepare an oxide superconducting bulk magnet 600. FIG. 6A shows the stacked state of the obtained donut-shaped oxide superconducting bulk magnet. Further, FIG. 6C shows a cross-sectional view of FIG. 6A.

The obtained oxide superconducting bulk magnet 600 was placed at room temperature in a 9 T magnetic field, then was cooled to 45K using a refrigerating machine, then the external magnetic field was demagnetized by 0.1 T/min in speed until a zero magnetic field. As a result, a 7.92 T trapped magnetic flux density was confirmed on the axial surface of the oxide superconducting bulk magnet 600. It could be confirmed that by this magnetization, magnetization was possible without a superconducting bulk member 610 cracking.

Figure 6B:
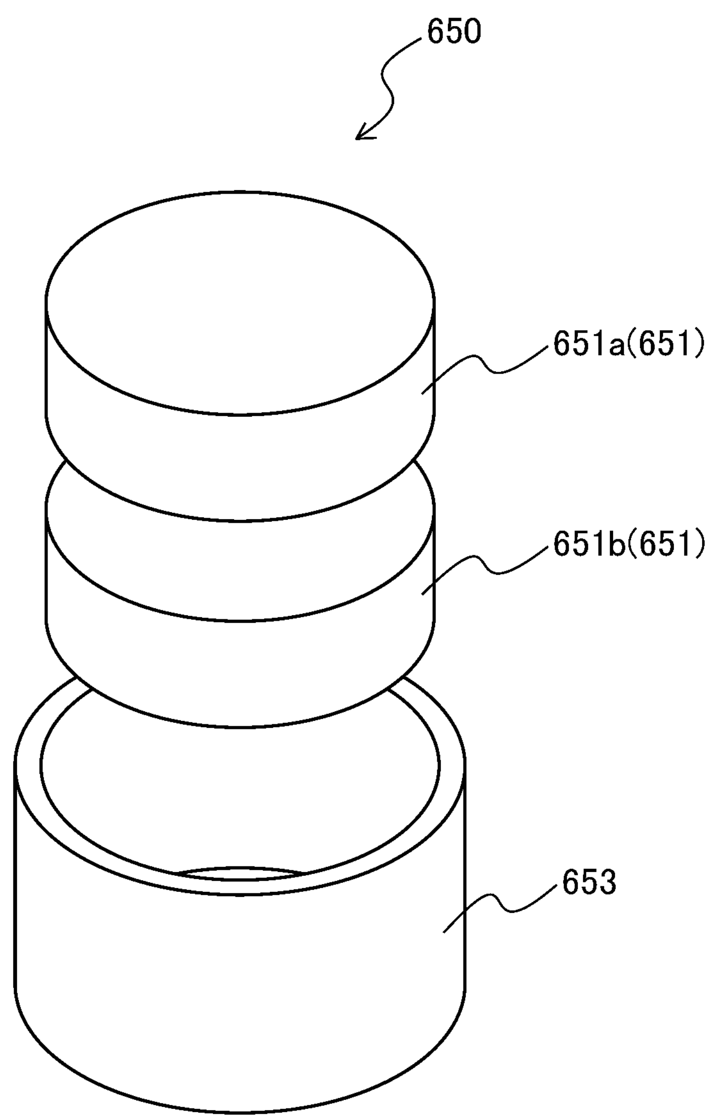
FIG. 6B is a schematic disassembled perspective view showing an oxide superconducting bulk magnet of a comparative member.
Figure 6C:
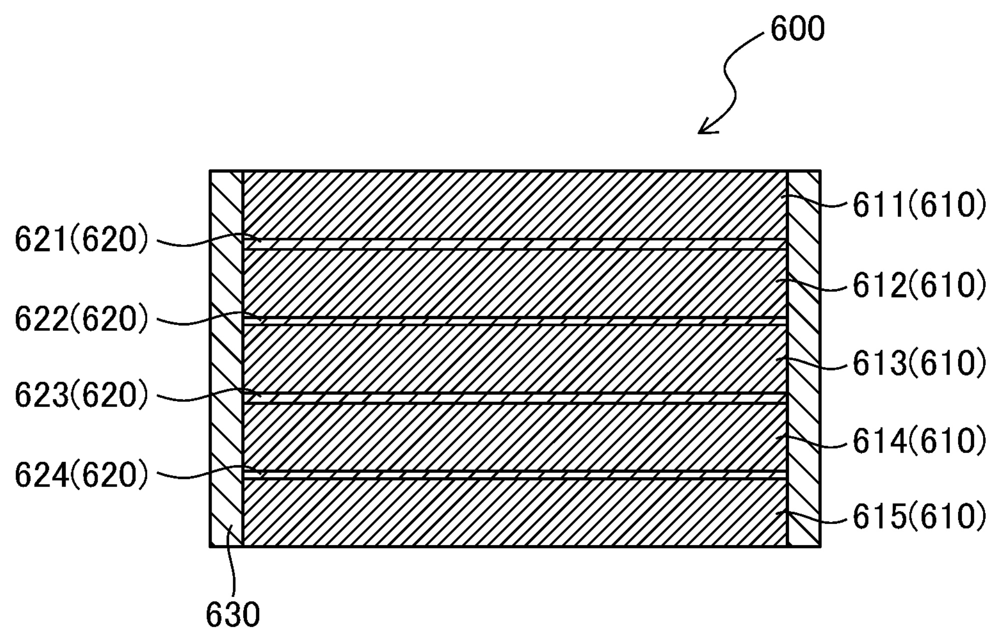
FIG. 6C is a cross-sectional view showing the state of cutting along the plane parallel to the center axis the oxide superconducting bulk magnet shown in FIG. 6A.
Figure 6D:
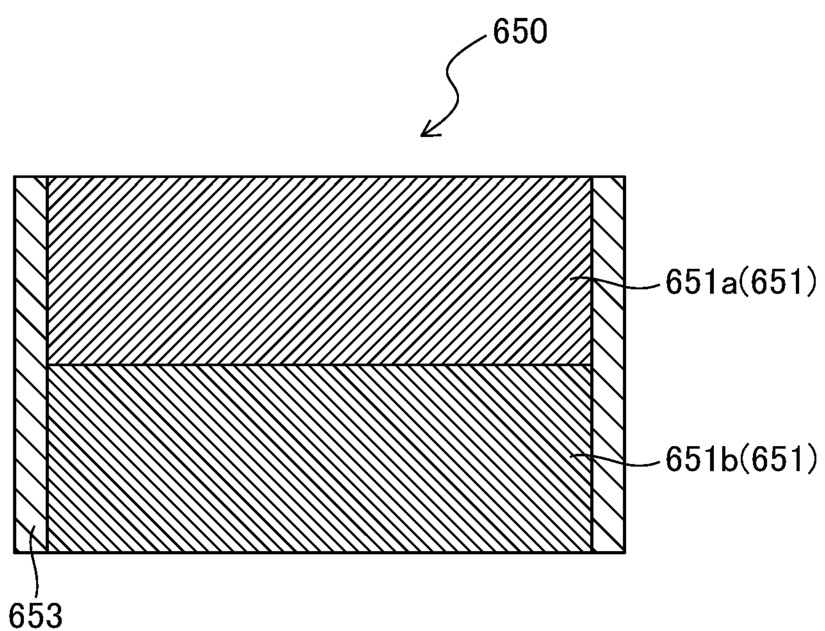
FIG. 6D is a cross-sectional view showing the state of cutting along the plane parallel to the center axis the oxide superconducting bulk magnet of the comparative member shown in FIG. 6B.

FIG. 6B shows an oxide superconducting bulk magnet prepared as a comparative member. As a comparative member, two outside diameter 65.0 mm, height 22.2 mm superconducting bulk members 651 (651*a*, 651*b*) were prepared in the same way as explained above from a single-crystal form oxide superconducting bulk member prepared in the same way as explained above. These were placed inside an SUS316L outside diameter 73.0 mm, inside diameter 65.05 mm, height 44.5 mm outer circumference reinforcing ring 653 prepared in the same way as explained above and joined by solder to prepare a comparative member oxide superconducting bulk magnet 650. That is, the comparative member is not provided with high strength reinforcing members. FIG. 6B shows the state of the obtained comparative member. Further, FIG. 6D shows a cross-sectional view of the FIG. 6B.

The comparative member was placed in the same as explained above at room temperature in a 9 T magnetic field, then was cooled to 45K using a refrigerating machine, then the external magnetic field was demagnetized by 0.1 T/min in speed until a zero magnetic field. At the stage of demagnetization down to 4.9 T in this magnetization process, a rapid drop in the magnetic flux density was confirmed at the axial center part of the oxide superconducting bulk magnet 650. The trapped magnetic flux density at the axial surface when demagnetized to a zero magnetic field was 2.65 T. After the magnetization tests the superconducting bulk member 651 was examined at room temperature, whereupon cracks were confirmed in a superconducting bulk member 651.

From these tests, it became clear that by arranging high strength reinforcing members between the oxide superconducting bulk members and joining or bonding the top and bottom oxide superconducting bulk members, an oxide superconducting bulk laminate having a high trapped magnetic flux density can be obtained without a superconducting bulk member cracking.

Table 1 shows the results of magnetization tests for the above-mentioned Example 1. At the time of the magnetization tests, the oxide superconducting bulk members, high strength reinforcing members, and outer circumference reinforcing rings used as the present inventions and comparative example in the tests described in Table 1 were prepared. For the oxide superconducting bulk members, diameter 70 mm single-crystal form oxide superconducting bulk members prepared in the same way as the above-mentioned Example 1 were used. These were worked to different thickness outside diameter 65.0 mm columnar shapes based on the manufacturing conditions of the tests of Table 1 to thereby prepare columnar-shaped oxide superconducting bulk members. Further, for the high strength members as well, the sheets of the materials and thicknesses described in Table 1 were worked to outside diameter 65.0 mm disk-shaped sheets. Furthermore, for the outer circumference reinforcing rings as well, the sheets were worked to rings of the materials and sizes described in Table 1.

TABLE 1

| | | Manufacturing conditions | | | | | | | | | | |
|---|---|---|---|---|---|---|---|---|---|---|---|---|
| | | High strength member | | | | | Oxide superconducting bulk member | | | | Outer circumference reinforcing ring | |
| Test no. | | Material | Thickness (mm) | Outside diameter (mm) | No. | Presence of top and bottom surfaces | Thickness (mm) | Outside diameter (mm) | No. | Presence of top and bottom surfaces | Material | Height (mm) |
| 1-1 | Present invention | Nichrome | 1.0 | 65.0 | 4 | None | 8.0 | 65.0 | 5 | Top and bottom surface | SUS316L | 44.5 |
| | Comp. member | — | — | — | — | — | 22.2 | 65.0 | 2 | Top and bottom surface | SUS316L | 44.5 |
| 1-2 | Present invention | SUS304L | 0.8 | 65.0 | 3 | None | 7.0 | 65.0 | 4 | Top and bottom surface | SUS316L | 30.8 |
| | Comp. member | — | — | — | — | — | 10.1 | 65.0 | 3 | Top and bottom surface | SUS316L | 30.8 |
| 1-3 | Present invention | Nichrome | 1.0 | 65.0 | 4 | None | 8.0 | 65.0 | 5 | Top and bottom surface | Oxygen-free copper | 44.5 |
| | Comp. member | — | — | — | — | — | 14.8 | 65.0 | 3 | Top and bottom surface | SUS316L | 44.5 |
| 1-4 | Present invention | Oxygen-free copper | 0.5 | 65.0 | 5 | None | 7.0 | 65.0 | 6 | Top and bottom surface | Oxygen-free copper | 45.0 |
| | Comp. member | — | — | — | — | — | 14.9 | 65.0 | 3 | Top and bottom surface | SUS316L | 45.0 |
| 1-5 | Present invention | Aluminum alloy A5056 | 0.8 | 65.0 | 3 | None | 8.0 | 65.0 | 4 | Top and bottom surface | Inside: Cu Outside: SUS316L composite member | 35.0 |
| | Comp. member | — | — | — | — | — | 17.7 | 65.0 | 2 | Top and bottom surface | SUS316L | 35.5 |
| 1-6 | Present invention | Oxygen-free copper clad material of Nichrome | About each 0.5 mm | 65.0 | 4 | None | 6.0 | 65.0 | 5 | Top and bottom surface | Oxygen-free copper | 37.0 |
| | Comp. member | — | — | — | — | — | 18.5 | 65.0 | 2 | Top and bottom surface | SUS316L | 37.0 |

TABLE 1-continued

| | | | | | | | | | | | | |
|---|---|---|---|---|---|---|---|---|---|---|---|---|
| 1-7 | Present invention | Silver | 0.5 | 65.0 | 4 | None | 6.0 | 65.0 | 5 | Top and bottom surface | Oxygen-free copper | 32.4 |
| | Comp. member | — | — | — | — | — | 16.2 | 65.0 | 2 | Top and bottom surface | SUS316L | 32.4 |

| Test no. | | Manufacturing conditions: Outer circumference reinforcing ring | | | Magnetization tests: Magnetization conditions | | | Magnetization tests: Magnetization results | |
|---|---|---|---|---|---|---|---|---|---|
| | | Outside diameter (mm) | Inside diameter (mm) | Other conditions | Applied magnetic field (T) | Magnetization temperature (K) | Demagnetization rate (T/min) | Presence of cracking | Trapped magnetic flux density (T) |
| 1-1 | Present invention | 73.0 | 65.05 | — | 9.0 | 45.0 | 0.10 | No | 7.92 |
| | Comp. member | 73.0 | 65.05 | — | 9.0 | 45.0 | 0.10 | Yes | — |
| 1-2 | Present invention | 73.0 | 65.05 | — | 8.5 | 30.0 | 0.10 | No | 7.75 |
| | Comp. member | 73.0 | 65.05 | — | 8.5 | 30.0 | 0.10 | Yes | — |
| 1-3 | Present invention | 87.0 | 65.05 | — | 8.5 | 30.0 | 0.15 | No | 8.12 |
| | Comp. member | 87.0 | 65.05 | — | 8.0 | 30.0 | 0.15 | Yes | — |
| 1-4 | Present invention | 87.0 | 65.05 | — | 9.0 | 30.0 | 0.20 | No | 8.72 |
| | Comp. member | 87.0 | 65.05 | — | 9.0 | 30.0 | 0.20 | Yes | — |
| 1-5 | Present invention | 87.0 | 65.05 | Thickness: each 5.6 mm | 8.0 | 20.0 | 0.15 | No | 7.65 |
| | Comp. member | 87.0 | 65.05 | — | 8.0 | 20.0 | 0.15 | Yes | — |
| 1-6 | Present invention | 87.0 | 65.05 | — | 8.5 | 40.0 | 0.20 | No | 8.24 |
| | Comp. member | 87.0 | 65.05 | — | 8.5 | 40.0 | 0.20 | Yes | — |
| 1-7 | Present invention | 87.0 | 65.05 | — | 8.0 | 40.0 | 0.20 | None | 7.84 |
| | Comp. member | 87.0 | 65.05 | — | 8.0 | 40.0 | 0.20 | Yes | — |

These columnar-shaped oxide superconducting bulk members, high strength reinforcing members, and outer circumference reinforcing rings were joined to prepare the oxide superconducting bulk magnets used in the tests. For assembly of the bulk magnets of the present inventions and comparative example, solder was used. When using solder for assembly, in the same way as the above-mentioned Example 1, the superconducting bulk members and high strength reinforcing members were alternately inserted into outer circumference reinforcing rings heated on a hot plate to a temperature at which the solder melts, the solder was made to evenly coat them, and the overall assemblies were cooled to room temperature to thereby join the members and prepare superconducting bulk magnets.

Further, as the materials of the outer circumference reinforcing rings, in Table 1, Test No. 1-5, the "inner circumference: oxygen-free copper, outer circumference: SUS316L composite member" means a composite member comprised of an outside diameter 87.6 mm, inside diameter 76.35 mm, height 53.6 mm SUS316L ring in which an outside diameter 76.3 mm, inside diameter 65.05 mm, height 53.6 mm oxygen-free copper ring is bonded by an Sn—Zn-based solder. Further, as the materials of the high strength reinforcing members, in Table 1, Test No. 1-6, "oxygen-free copper clad material of Nichrome" means a material of a thickness 0.5 mm Nichrome sheet on both surfaces of which thickness 0.5 mm oxygen-free copper sheets are laminated by soldering by Sn—Zn-based solder.

The magnetization tests for evaluation of performance were conducted under the magnetization conditions shown in Table 1. The results of the magnetization tests, as shown in Table 1, were that superconducting bulk magnets with high strength reinforcing members alternately stacked did not crack, while comparative members without high strength reinforcing members alternately stacked cracked. From this, it became clear that the reinforcement by the high strength reinforcing members functioned effectively and a strong magnetic field could be generated.

Example 2

Figure 7A:
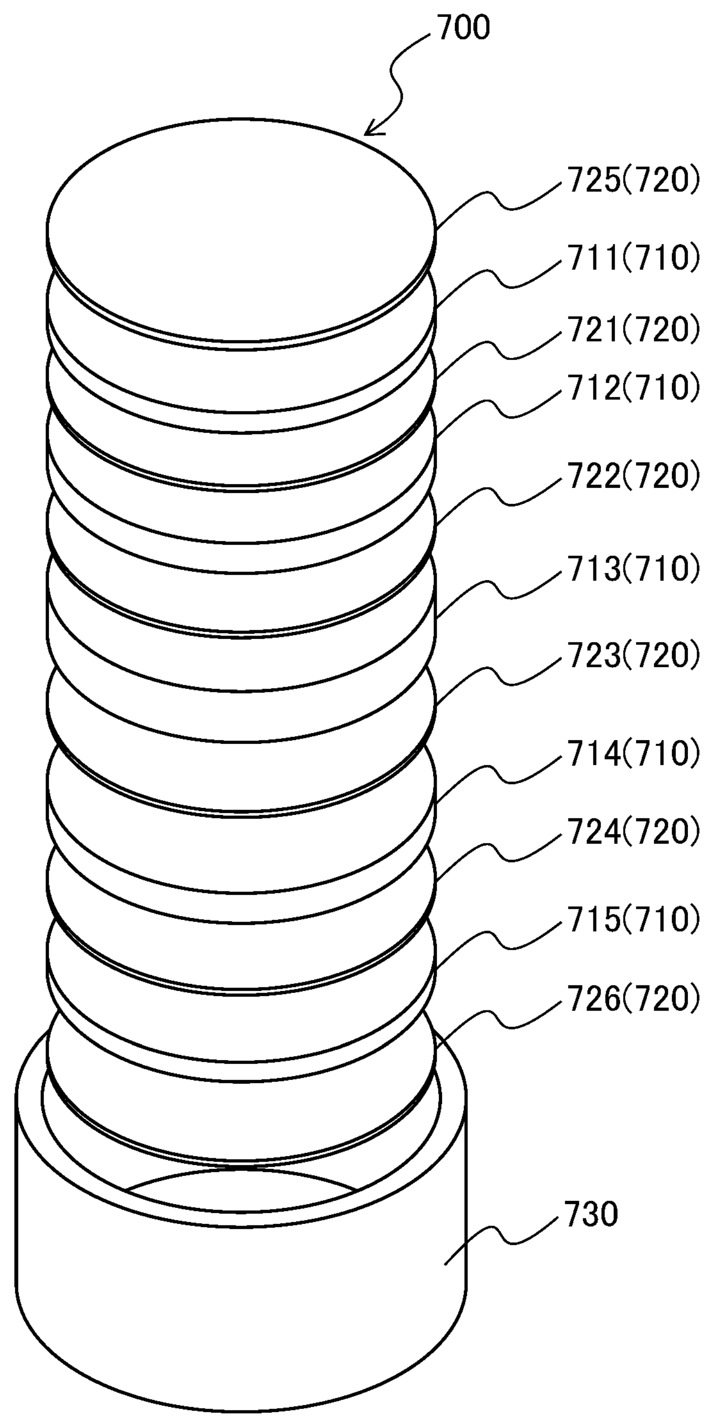
FIG. 7A is a schematic disassembled perspective view showing an oxide superconducting bulk magnet according to Example 2.

FIG. 7A shows an oxide superconducting bulk magnet of Example 2. In the oxide superconducting bulk magnet 700 of Example 2, a Gd—Dy—Ba—Cu—O-based oxide superconducting bulk member was used. First, powders of oxides of commercially available purity 99.9 mass % gadolinium (Gd), barium (Ba), and copper (Cu) were weighed to give a molar ratio of Gd:Dy:Ba:Cu=4.5:0.5:7:10. To this, $BaCeO_3$ was added in 1.0 mass % and silver was added in 10 mass %. The weighed powders were fully kneaded over 1 hour, then were calcined in the atmosphere at 1173K for 8 hours.

Next, a mold was used to shape the calcined powder to a disk shape. This shaped part was heated to 1423K to a molten state, was held there for 30 minutes, then in the middle of being lowered in temperature, was seeded, and was gradually cooled over a temperature region of 1275K to 1248K over 180 hours to grow the crystal and obtain a diameter 70 mm single-crystal form oxide superconducting bulk member. The thus obtained single-crystal form oxide superconducting bulk member was worked to obtain two outside diameter 65.0 mm height 4.0 mm disk-shaped superconducting bulk members 710 (711, 715), two height 6.0 mm disk-shaped superconducting bulk members 710 (712, 714), and one height 10.0 mm disk-shaped superconducting bulk member 710 (713).

Furthermore, sputtering was used to coat the surfaces of the superconducting members with silver to about 2.5 μm. These were heat treated in an oxygen stream at 703K for 100 hours to prepare oxide superconducting bulk members 710 (total five).

Further, from a thickness 1.5 mm Nichrome sheet, two outside diameter 65.0 mm disk-shaped high strength reinforcing members 720 (725, 726), from a thickness 1.0 mm Nichrome sheet, two outside diameter 65.0 mm disk-shaped high strength reinforcing members 720 (721, 724), and from a thickness 0.5 mm Nichrome sheet, two outside diameter 65.0 mm disk-shaped high strength reinforcing members 720 (722, 723) were prepared. The surfaces of the Nichrome were thinly coated with solder in advance. For the outer circumference reinforcing ring 730, an SUS316L outside diameter 73.0 mm, inside diameter 65.05 mm, height 36.5 mm ring was used. Its inner circumferential surface was also lightly coated with solder.

Next, inside the outer circumference reinforcing ring 730 heated to a temperature at which solder melts, the Nichrome (high strength reinforcing members 720) and superconducting bulk members 710 were alternately inserted. These were made to be coated evenly with the solder, then the entire assembly was cooled to room temperature to join them together and thereby prepare an oxide superconducting bulk magnet 700. Note that, for the superconducting bulk members 710, the thicker members were arranged closer to the center of the oxide superconducting bulk magnet 700 in the center axial line direction, while for the high strength reinforcing members 720, the thinner members were arranged closer to the center in the center axial line direction. This stacked state of the oxide superconducting bulk magnet 700 is shown in FIG. 7A. Further, FIG. 7C shows a cross-sectional view of FIG. 7A.

The obtained oxide superconducting bulk magnet was placed at room temperature in a 9.5 T magnetic field, then was cooled to 40K using a refrigerating machine, then the external magnetic field was demagnetized by 0.1 T/min in speed until a zero magnetic field. As a result, an 8.85 T trapped magnetic flux density was confirmed on the axial surface of the oxide superconducting bulk magnet 700. It could be confirmed that by this magnetization, magnetization was possible without the superconducting bulk members 710 cracking.

Figure 7B:
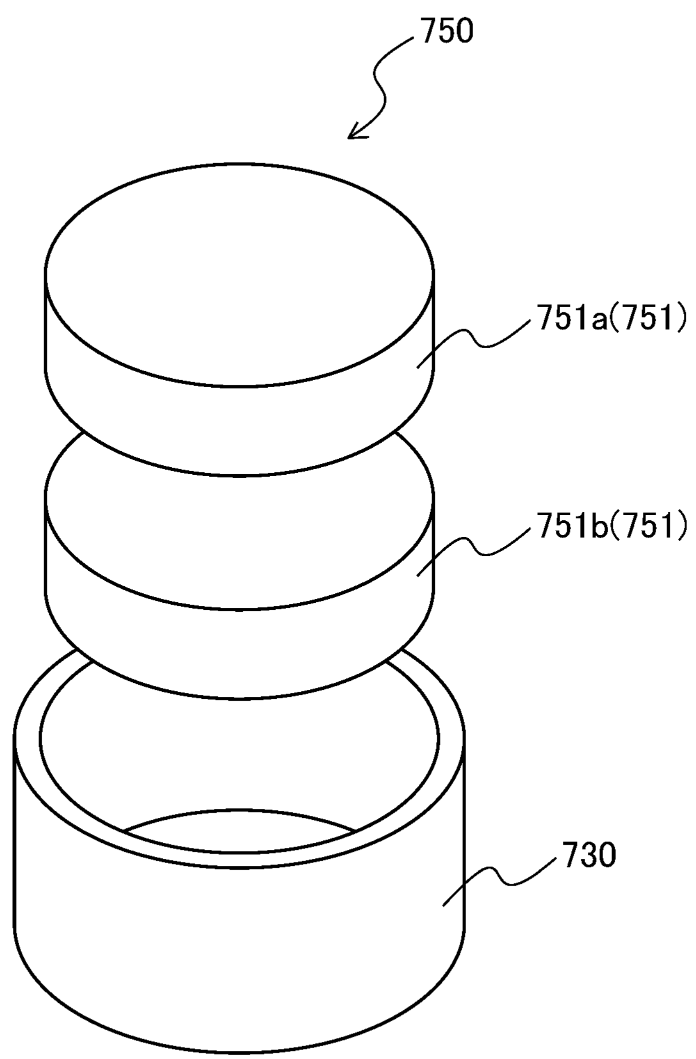
FIG. 7B is a schematic disassembled perspective view showing an oxide superconducting bulk magnet of a comparative member.
Figure 7C:
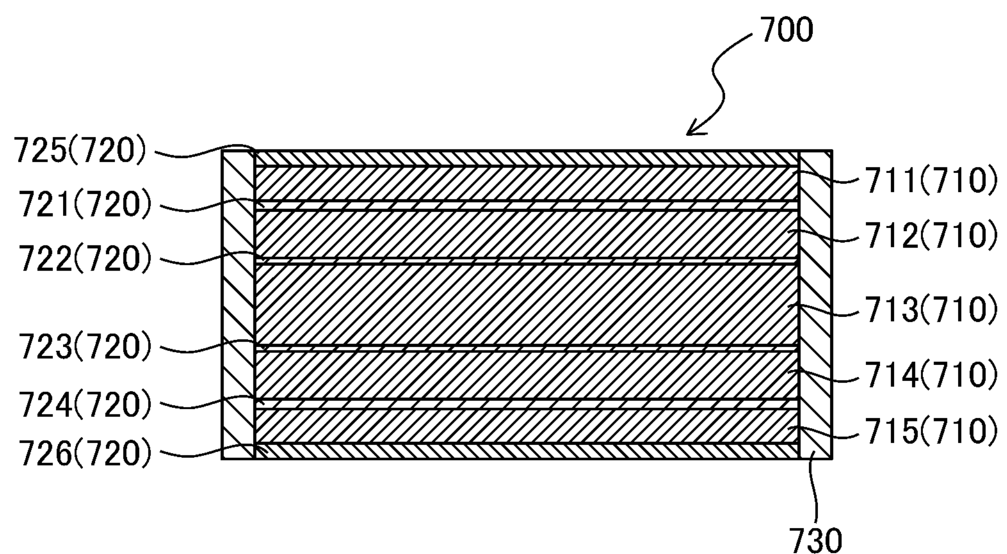
FIG. 7C is a cross-sectional view showing the state of cutting along the plane parallel to the center axis the oxide superconducting bulk magnet shown in FIG. 7A.
Figure 7D:
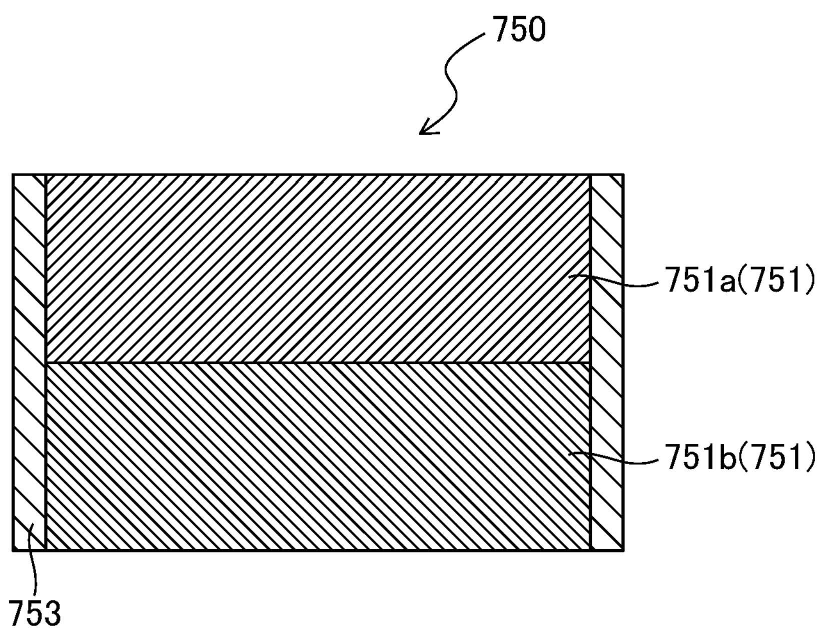
FIG. 7D is a cross-sectional view showing the state of cutting along the plane parallel to the center axis the oxide superconducting bulk magnet of the comparative member shown in FIG. 7B.

FIG. 7B shows an oxide superconducting bulk magnet prepared as a comparative member. As the comparative member, from a single-crystal form oxide superconducting bulk member prepared in the same way as explained above, two outside diameter 65.0 mm, height 18.0 mm superconducting bulk members 751 were prepared in the same way as explained above. These were placed in a SUS316L outside diameter 73.0 mm, inside diameter 65.05 mm, height 36.5 mm outer circumference reinforcing ring 753 prepared in the same way as explained above and similarly joined by solder to prepare the comparative member oxide superconducting bulk magnet 750. That is, the comparative member is not provided with high strength reinforcing members. FIG. 7B shows the state of the obtained comparative member. Further, FIG. 7D shows a cross-sectional view of FIG. 7B.

This was similarly placed at room temperature in a 9.5 T magnetic field, then was cooled to 40K using a refrigerating machine, then the external magnetic field was demagnetized by 0.1 T/min in speed until a zero magnetic field. In this magnetization process, at the stage of demagnetization down to 5.6 T, a rapid drop in the magnetic flux density was confirmed at the axial center part of the oxide superconducting bulk magnet 750. The trapped magnetic flux density at the axial surface when demagnetized to a zero magnetic field was 2.65 T. After the magnetization tests, the superconducting bulk member 751 was examined at room temperature, whereupon cracks were confirmed in a superconducting bulk member 751.

From these tests, it became clear that by placing high strength reinforcing members between oxide superconducting bulk members and joining or bonding the top and bottom oxide superconducting bulk members, the superconducting bulk members did not crack and an oxide superconducting bulk laminate having a high trapped magnetic flux density can be obtained.

Table 2 shows the results of magnetization tests for the above-mentioned Example 2. At the time of the magnetization tests, the oxide superconducting bulk members, high strength reinforcing members, and outer circumference reinforcing rings used as the present inventions and comparative example in the tests described in Table 2 were prepared. For the oxide superconducting bulk members, diameter 70 mm single-crystal form oxide superconducting bulk members prepared in the same way as the above-mentioned Example 2 were used. These were worked to different thickness outside diameter 65.0 mm columnar shapes described in Table 2 to thereby prepare oxide superconducting bulk members. Further, for the high strength members as well, the sheets of the materials and thicknesses described in Table 2 were worked to outside diameter 65.0 mm disk-shaped sheets. Furthermore, for the outer circumference reinforcing rings as well, the sheets were worked to rings of the materials and sizes described in Table 2.

TABLE 2

| Test no. | | Manufacturing conditions: High strength member: Material | Thickness (mm) | Outside diameter (mm) | No. | Presence of top and bottom surfaces | Oxide superconducting bulk member: Thickness (mm) | Outside diameter (mm) | No. | Presence of top and bottom surfaces | Outer circumference reinforcing ring: Material | Height (mm) |
|---|---|---|---|---|---|---|---|---|---|---|---|---|
| 2-1 | Present invention | Nichrome | 1.5 | 65.0 | 2 | Top and bottom surface | 4.0 | 65.0 | 2 | None | SUS316L | 36.5 |
| | | | 1.0 | 65.0 | 2 | — | 6.0 | 65.0 | 2 | None | | |
| | | | 0.5 | 65.0 | 2 | — | 10.0 | 65.0 | 1 | None | | |
| | Comp. member | — | — | — | — | — | 18.0 | 65.0 | 2 | Top and bottom surface | SUS316L | 36.5 |
| 2-2 | Present invention | Nichrome | 1.0 | 73.0 | 2 | Top and bottom surface | 10.0 | 65.0 | 3 | None | SUS316L | 31.3 |
| | | SUS304 | 0.5 | 65.0 | 2 | — | | | | | | |
| | Comp. member | — | — | — | — | — | 16.6 | 65.0 | 2 | Top and bottom surface | SUS316L | 33.3 |
| 2-3 | Present invention | SUS316L | 1.5 | 87.0 | 2 | Top and bottom surface | 4.0 | 65.0 | 4 | None | Oxygen-free copper | 17.7 |
| | | Oxygen-free copper | 0.5 | 65.0 | 3 | — | | | | | | |
| | Comp. member | — | — | — | — | — | 10.3 | 65.0 | 2 | Top and bottom surface | SUS316L | 20.7 |
| 2-4 | Present invention | Oxygen-free copper | 1.0 | 87.0 | 2 | Top and bottom surface | 4.7 | 65.0 | 6 | None | Aluminum alloy A5056 | 31.0 |
| | | SUS316L | 0.5 | 65.0 | 5 | — | | | | | | |
| | Comp. member | — | — | — | — | — | 16.5 | 65.0 | 2 | Top and bottom surface | SUS316L | 33.0 |
| 2-5 | Present invention | Oxygen-free copper clad material of Nichrome | About 1.6 mm, each 0.5 mm | 65.0 | 4 | Top and bottom surface | 10.0 | 65.0 | 3 | None | Oxygen-free copper | 37.0 |
| | Comp. member | — | — | — | — | — | 18.5 | 65.0 | 2 | Top and bottom surface | SUS316L | 37.0 |
| 2-6 | Present invention | Oxygen-free copper | 2.5 | 87.0 | 2 | Top and bottom surface | 8.0 | 65.0 | 4 | None | Inside: Cu Outside: SUS316L composite member | 33.7 |
| | | silver | 0.5 | 65.0 | 3 | — | | | | | | |
| | Comp. member | — | — | — | — | — | 19.3 | 65.0 | 2 | Top and bottom surface | SUS316L | 38.7 |

| Test no. | | Manufacturing conditions: Outer circumference reinforcing ring: Outside diameter (mm) | Inside diameter (mm) | Other conditions | Magnetization tests: Magnetization conditions: Applied magnetic field (T) | Magnetization temperature (K) | Demagnetization rate (T/min) | Magnetization results: Presence of cracking | Trapped magnetic flux density (T) |
|---|---|---|---|---|---|---|---|---|---|
| 2-1 | Present invention | 73.0 | 65.05 | — | 9.5 | 40.0 | 0.10 | No | 8.85 |
| | Comp. member | 73.0 | 65.05 | — | 9.5 | 40.0 | 0.10 | Yes | — |
| 2-2 | Present invention | 73.0 | 65.05 | — | 9.0 | 30.0 | 0.05 | No | 8.63 |
| | Comp. member | 73.0 | 65.05 | — | 9.0 | 30.0 | 0.05 | Yes | — |

TABLE 2-continued

| | | | | | | | | | |
|---|---|---|---|---|---|---|---|---|---|
| 2-3 | Present invention | 87.0 | 65.05 | — | 9.0 | 30.0 | 0.20 | No | 8.32 |
| | Comp. member | 87.0 | 65.05 | — | 9.0 | 30.0 | 0.20 | Yes | — |
| 2-4 | Present invention | 87.0 | 65.05 | — | 8.5 | 20.0 | 0.15 | No | 8.12 |
| | Comp. member | 87.0 | 65.05 | — | 8.5 | 20.0 | 0.15 | Yes | — |
| 2-5 | Present invention | 87.0 | 65.05 | — | 8.5 | 30.0 | 0.20 | No | 8.13 |
| | Comp. member | 87.0 | 65.05 | — | 8.5 | 30.0 | 0.20 | Yes | — |
| 2-6 | Present invention | 87.0 | 65.05 | Thickness: each 5.6 mm | 9.0 | 30.0 | 0.20 | No | 8.32 |
| | Comp. member | 87.0 | 65.05 | — | 9.0 | 30.0 | 0.20 | Yes | — |

These columnar-shaped oxide superconducting bulk members, high strength reinforcing members, and outer circumference reinforcing rings were joined to prepare the oxide superconducting bulk magnets used in the tests. For assembly of the bulk magnets of the present inventions and comparative example, solder was used. When using solder for assembly, in the same way as the above-mentioned Example 2, the superconducting bulk members and high strength reinforcing members were alternately inserted into outer circumference reinforcing rings heated on a hot plate to a temperature at which the solder melts, the solder was made to evenly coat them, and the overall assemblies were cooled to room temperature to thereby join the members and prepare superconducting bulk magnets. Further, topmost surface and the bottommost surface high strength reinforcing members were attached to the top surfaces and bottom surfaces of the outer circumference reinforcing rings to prepare superconducting bulk magnets.

Figure 7E:
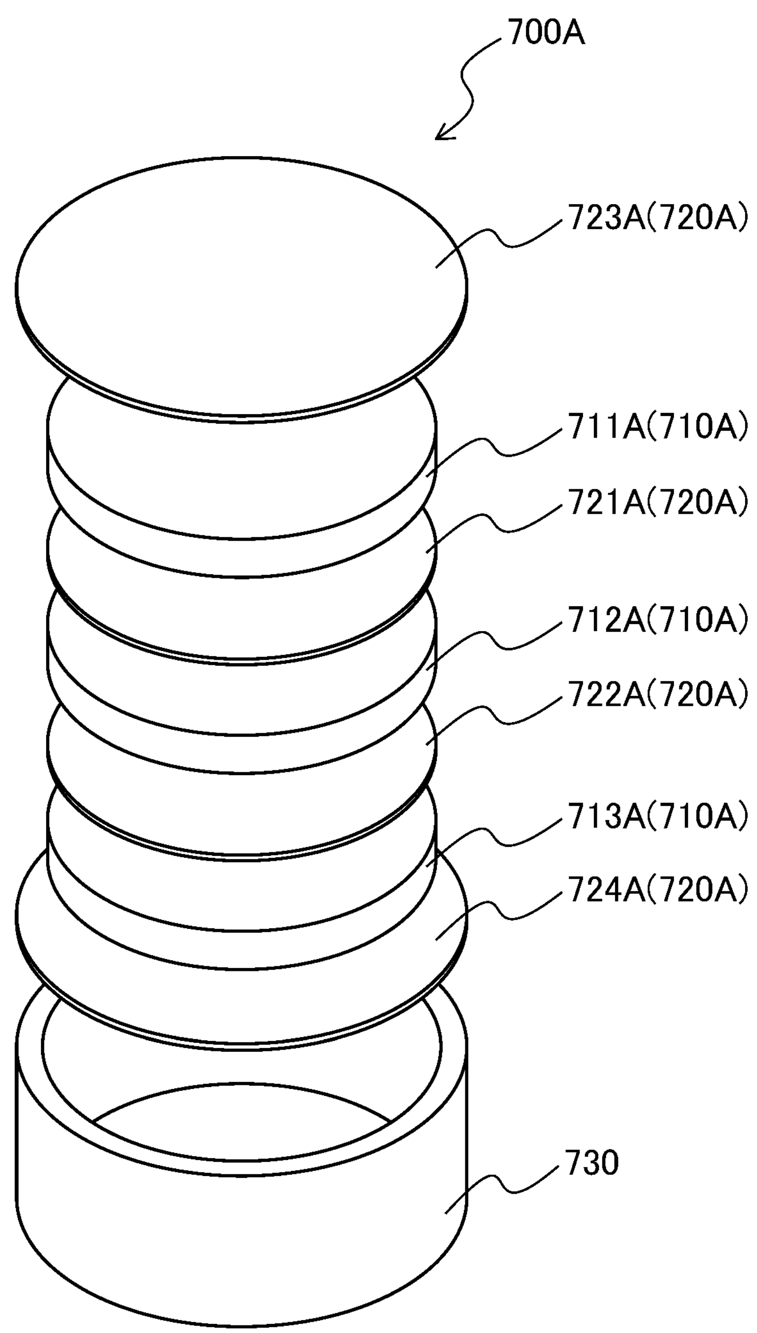
FIG. 7E is a schematic disassembled perspective view showing the configuration of an oxide superconducting bulk magnet corresponding to Test No. 2-2.
Figure 7F:
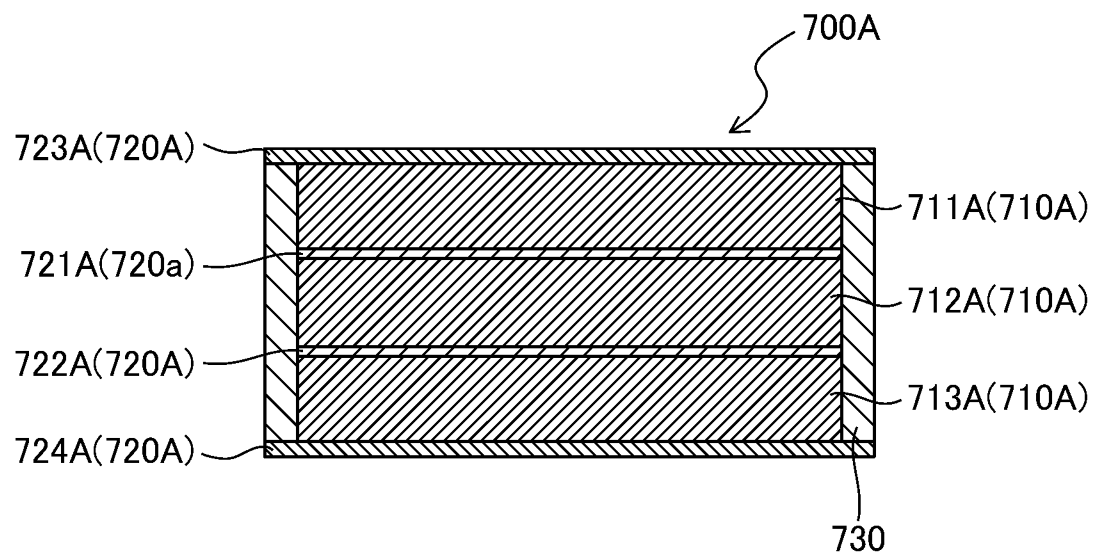
FIG. 7F is a cross-sectional view showing the state of cutting along the plane parallel to the center axis the oxide superconducting bulk magnet shown in FIG. 7E.

Note that, regarding the topmost surface and the bottommost surface high strength reinforcing members of Test No. 2-2, No. 2-3, No. 2-4, and No. 2-6 in Table 2, to make the topmost surface and the bottommost surface high strength reinforcing members and the outer circumference reinforcing rings strongly join, the top surfaces and bottom surfaces of the outer circumference reinforcing rings were joined while making the outside diameters equal to the outside diameters of the outer circumference reinforcing rings. FIG. 7E and FIG. 7F show configurations of the oxide superconducting bulk magnets corresponding to Test No. 2-2.

Further, as the materials of the high strength reinforcing members, in Table 2, Test No. 2-5, the "oxygen-free copper clad material of Nichrome" means a material of a thickness 0.5 mm Nichrome sheet on both surfaces of which thickness 0.5 mm oxygen-free copper sheets are laminated by soldering by Sn—Zn-based solder. Regarding the materials of the outer circumference reinforcing rings, in Table 2, Test No. 2-6, the "inner circumference: oxygen-free copper, outer circumference: SUS316L composite member" means a composite member comprised of an outside diameter 87.6 mm, inside diameter 76.35 mm, height 53.6 mm SUS316L ring in which an outside diameter 76.3 mm, inside diameter 65.05 mm, height 53.6 mm oxygen-free copper ring is bonded by an Sn—Zn-based solder.

The magnetization tests for evaluation of performance were conducted under the magnetization conditions shown in Table 2. The results of the magnetization tests, as shown in Table 2, were that superconducting bulk magnets with high strength reinforcing members alternately stacked and with high strength members joined to the top surface and bottom surface like in the present invention did not crack. As opposed to this, in the comparative members without high strength reinforcing members alternately stacked, cracks occurred. From this, it became clear that the reinforcement by the high strength reinforcing members functioned effectively and a strong magnetic field could be generated.

Example 3

Figure 8A:
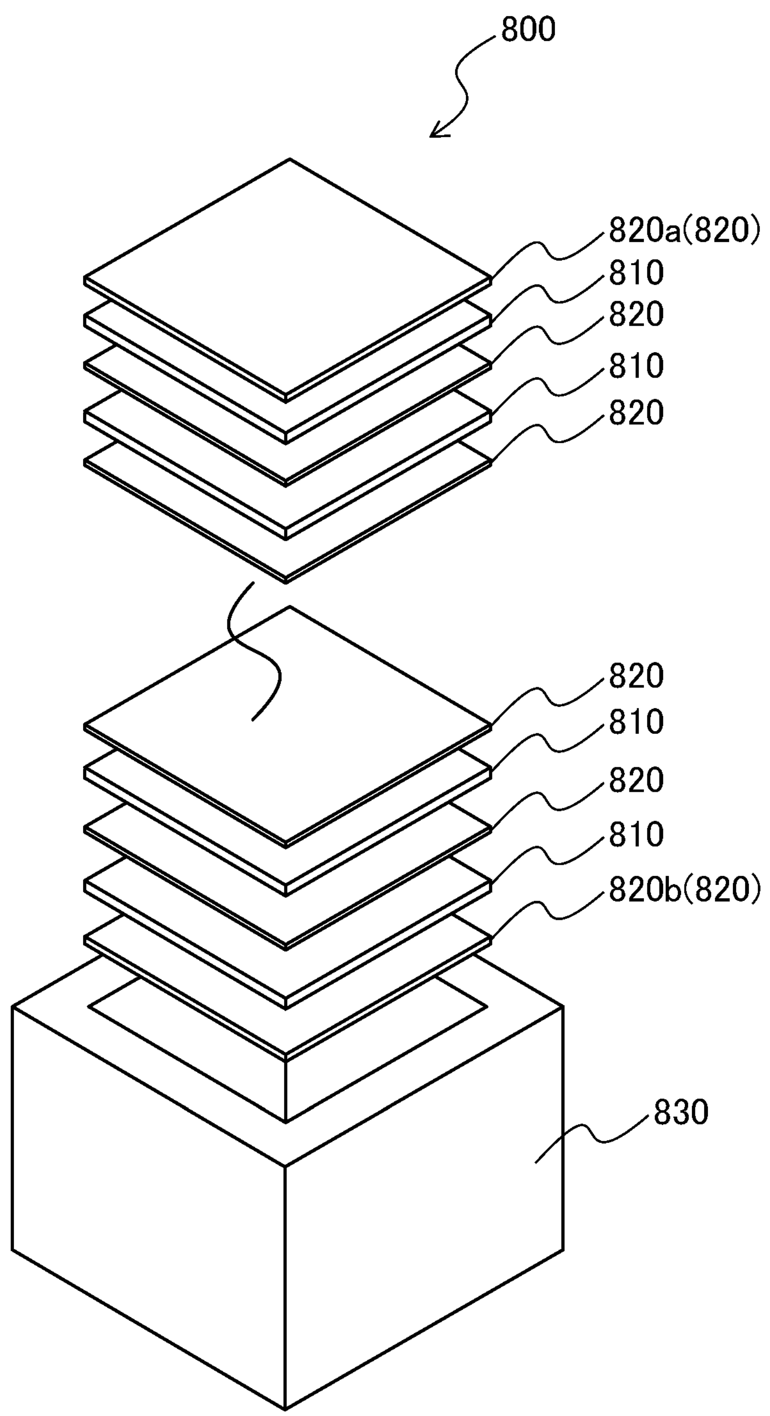
FIG. 8A is a schematic disassembled perspective view showing an oxide superconducting bulk magnet according to Example 3.

FIG. 8A shows an oxide superconducting bulk magnet of Example 3. In the oxide superconducting bulk magnet 800 of Example 3, a Eu—Ba—Cu—O-based oxide superconducting bulk member was used. First, powders of oxides of commercially available purity 99.9 mass % europium (Eu), barium (Ba), and copper (Cu) were weighed to give a molar ratio of Eu:Ba:Cu=9:12:17. To this, $BaCeO_3$ was added in 1.0 mass % and silver was added in 16 mass %. The weighed powders were fully kneaded over 1 hour, then were calcined in the atmosphere at 1173K for 8 hours.

Next, a mold was used to shape the calcined powder to a disk shape. This shaped part was heated to 1423K to a molten state, was held there for 30 minutes, then in the middle of being lowered in temperature, was seeded, and was gradually cooled over a temperature region of 1288K to 1258K over 200 hours to grow the crystal and obtain a diameter 70 mm single-crystal form oxide superconducting bulk member. This single-crystal form oxide superconducting bulk member was worked to a square shape of sides of 50.0 mm and a height of 1.8 mm. Furthermore, sputtering was used to coat the surfaces of the superconducting bulk member with silver to about 1.5 μm. This was heat treated in an oxygen stream at 713K for 100 hours. Similar processing was performed to prepare 20 superconducting bulk members 810.

Further, from a thickness 1.0 mm Nichrome sheet, two single-side 50.0 mm square-shaped high strength reinforcing members 820 (820*a*, 820*b*), while from a thickness 0.3 mm Nichrome sheet, 19 single-side 50.0 mm square-shaped high strength reinforcing members 820 were prepared. The surfaces of the Nichrome were lightly coated with solder in advance. For the outer circumference reinforcing ring 830, an aluminum alloy, outer circumference side 70.0 mm, inner circumference side 50.05 mm, height 44.2 mm ring was used. Its inner circumferential surface was also lightly coated with solder.

Next, the Nichrome (high strength reinforcing members 820) and superconducting bulk members 810 were alternately inserted into a rectangular-shaped outer circumference reinforcing ring 830 heated to a temperature at which the solder melts, the solder was made to evenly coat them, and the overall assembly was cooled to room temperature to thereby join the members. At this time, 1.0 mm thick Nichrome high strength reinforcing members 820*a*, 820*b* were arranged at the topmost surface and the bottommost surface of the oxide superconducting bulk magnet 800. The stacked state of this oxide superconducting bulk magnet 800 is shown in FIG. 8A.

The obtained oxide superconducting bulk magnet 800 was placed at room temperature in a 9.5 T magnetic field, then was cooled to 45K using a refrigerating machine, then the external magnetic field was demagnetized by 0.1 T/min in speed until a zero magnetic field. As a result, a 7.34 T trapped magnetic flux density was confirmed on the axial surface of the oxide superconducting bulk magnet 800. It could be confirmed that by this magnetization, magnetization was possible without the superconducting bulk members 810 cracking.

Figure 8B:
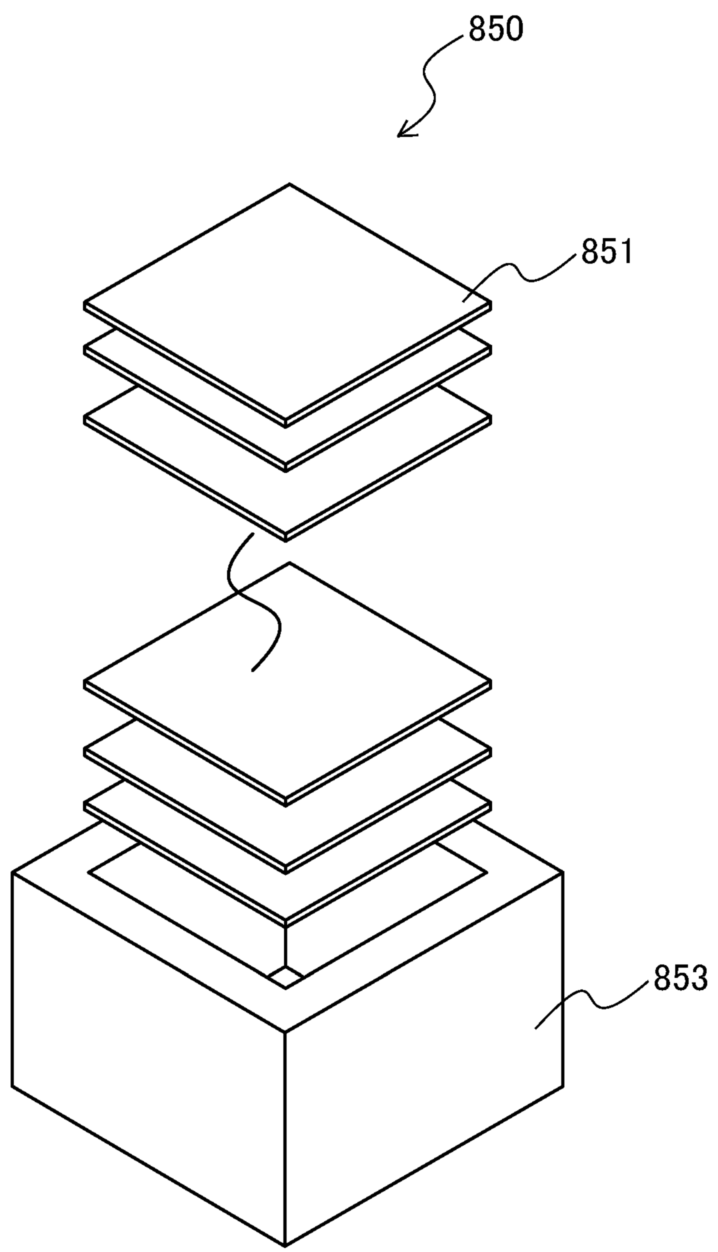
FIG. 8B is a schematic disassembled perspective view showing an oxide superconducting bulk magnet of a comparative member.

FIG. 8B shows an oxide superconducting bulk magnet prepared as a comparative member. As a comparative member, from a single-crystal form oxide superconducting bulk member prepared in the same way as above, 24 single-side 50.0 mm, height 1.8 mm rectangular-shaped superconducting bulk members 851 were prepared in the same way as explained above. These were joined together using a similarly prepared aluminum alloy outer circumference side 70.0 mm, inner circumference side 50.05 mm, height 44.2 mm outer circumference reinforcing ring 853 by solder to prepare the comparative member oxide superconducting bulk magnet 850.

The comparative member, in the same way as above, was placed at room temperature in a 9.5 T magnetic field, then was cooled to 45K using a refrigerating machine, then the external magnetic field was demagnetized by 0.1 T/min in speed until a zero magnetic field. At the stage of demagnetization to 5.1 T in this magnetization process, a sharp drop in the magnetic flux density on the axial surface of the oxide superconducting bulk magnet 850 was observed. The trapped magnetic flux density on the axial surface at the time of demagnetization to a zero magnetic field was 2.41 T. After the magnetization tests, the superconducting bulk member 851 was examined at room temperature, whereupon cracks were confirmed in a superconducting bulk member 851.

From these tests, it became clear that by arranging high strength reinforcing members between rectangular-shaped oxide superconducting bulk members and joining or bonding the top and bottom oxide superconducting bulk members, an oxide superconducting bulk laminate having a high trapped magnetic flux density is obtained without a superconducting bulk member cracking.

Example 4

The diameter 70 mm single-crystal form platinum-containing Gd-based oxide superconducting bulk member prepared in Example 1 was worked to prepare six outside diameter 65.0 mm, height 4.0 mm disk-shaped superconducting bulk members. Furthermore, sputtering was used to coat the surfaces of the superconducting members by silver to about 2.5 μm. These were heat treated in an oxygen stream at 703K for 100 hours to prepare six oxide superconducting bulk members.

Further, from a thickness 1.0 mm Nichrome sheet, two outside diameter 69.0 mm disk-shaped high strength reinforcing members were prepared, while from a thickness 0.3 mm Nichrome sheet, five outside diameter 69.0 mm disk-shaped high strength reinforcing members were prepared. The surfaces of the Nichrome were thinly coated with solder in advance. For the inside outer circumference reinforcing rings, SUS314 outside diameter 69.0 mm, inside diameter 65.05 mm, height 4.0 mm rings were used. The surfaces were also lightly coated with solder. Further, for the outside outer circumference reinforcing ring, a SUS316L outside diameter 79.0 mm, inside diameter 69.05 mm, height 28.5 mm ring was used. Their inner circumferential surfaces were also lightly coated with solder.

Figure 7G:
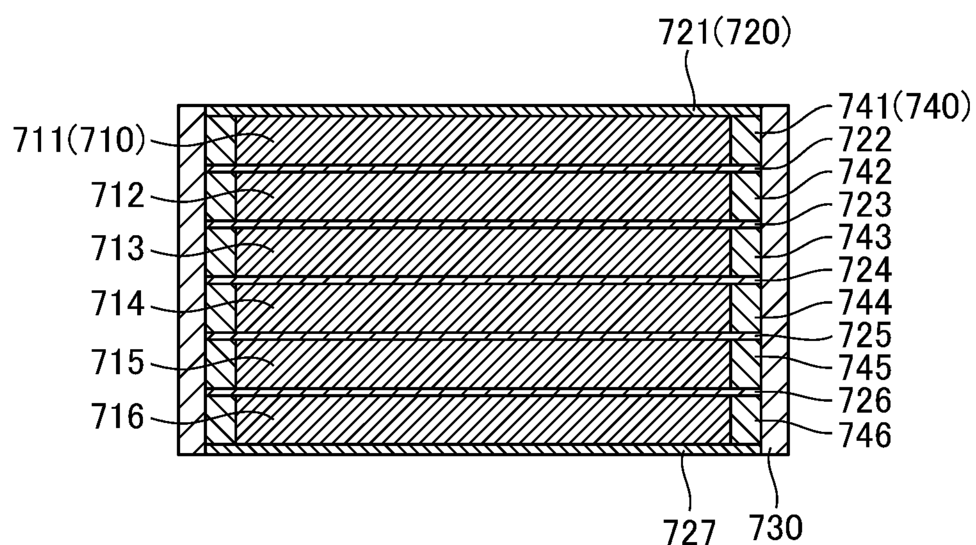
FIG. 7G is a cross-sectional view showing the state cutting along the plane parallel to the center axis an oxide superconducting bulk magnet where the outer circumference reinforcing ring has a two-layer structure in the diametrical direction and the inside diameters of inside outer circumference reinforcing rings are smaller than the outside diameters of the high strength reinforcing members.

Next, inside the outside outer circumference reinforcing ring (7300) heated to a temperature at which solder melts, the Nichrome high strength reinforcing members, inside outer circumference reinforcing rings, and superconducting bulk members were alternately inserted. These were made to be coated evenly with the solder, then the entire assembly was cooled to room temperature to join them together and thereby prepare an oxide superconducting bulk magnet (present invention (1)). A cross-sectional view of this oxide superconducting bulk magnet is shown in FIG. 7G. At the outer circumferences of the stacked oxide superconducting bulk members 710 (711 to 716) and high strength reinforcing members 720 (721 to 727), divided inside outer circumference reinforcing rings 7310 (7311 to 7316) and, at the outside of those, an outside outer circumference ring 7300 are provided.

Further, in the same way, six outside diameter 65.0 mm, height 4.0 mm disk-shaped superconducting bulk members were prepared. From a thickness 0.6 mm Nichrome sheet, seven outside diameter 69.0 mm disk-shaped high strength reinforcing members were prepared. The surfaces of the Nichrome were thinly coated with solder in advance. For the outer circumference reinforcing ring, an SUS316L outside diameter 79.0 mm, inside diameter 65.05 mm, height 28.5 mm ring was used. Its inner circumferential surface was also lightly coated with solder.

Figure 7H:
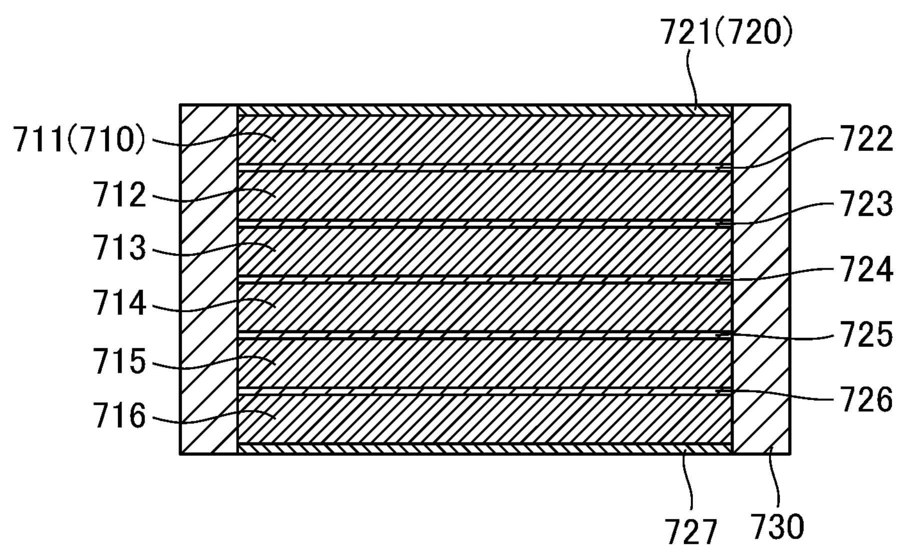
FIG. 7H is a cross-sectional view showing the state of cutting at a plane parallel to the center axis an oxide superconducting bulk magnet with an outer circumference reinforcing ring of a single-layer structure.

Next, inside the outer circumference reinforcing ring heated to a temperature at which solder melts, Nichrome high strength reinforcing members and superconducting bulk members were alternately inserted. These were made to be coated evenly with the solder, then the entire assembly was cooled to room temperature to join them together and thereby prepare an oxide superconducting bulk magnet (present invention (2)). A cross-sectional view of this oxide superconducting bulk magnet is shown in FIG. 7H. At the outer circumferences of the stacked oxide superconducting bulk members 710 (711 to 716) and high strength reinforcing members 720 (721 to 727), an outer circumference reinforcing ring 730 is provided.

Next, as a comparative member, from a single-crystal form oxide superconducting bulk member prepared in the same way as explained above, two outside diameter 65.0 mm, height 14.2 mm superconducting bulk members were prepared in the same way as explained above. These were placed in an SUS314 outside diameter 86.0 mm, inside diameter 65.05 mm, height 28.8 mm outer circumference reinforcing ring prepared in the same way as explained above and similarly joined by solder to thereby prepare a comparative member of an oxide superconducting bulk magnet. That is, the comparative member was not provided with high strength reinforcing members.

The obtained oxide superconducting bulk magnets (present invention (1), present invention (2), and comparative example) were placed at room temperature in an 8.5 T magnetic field, then were cooled to 40K using a refrigerating machine, then the external magnetic field was demagnetized by 0.05 T/min in speed until a zero magnetic field. As a result, on the axial surface of the oxide superconducting bulk magnet, in the present invention (1) and the present invention (2), a 7.2 T trapped magnetic flux density was confirmed without cracking occurring. However, in the comparative member, a rapid drop in the magnetic flux density was observed in the magnetization process. After the magnetization tests, the superconducting bulk member was examined at room temperature, whereupon cracks were confirmed in a superconducting bulk member. Next, the present invention (1) and the present invention (2) were placed at room temperature in a 12.0 T magnetic field, then were cooled to 40K using a refrigerating machine, then the external magnetic field was demagnetized by 0.05 T/min in speed until a zero magnetic field. As a result, on the axial surface of the oxide superconducting bulk magnet, in the present invention (1), a 9.5 T trapped magnetic flux density was confirmed without cracking occurring. However, in the present invention (2), a rapid drop in the magnetic flux density was observed in the magnetization process. After the magnetization tests, the superconducting bulk member was examined at room temperature, whereupon cracks were confirmed in a superconducting bulk member.

From these tests, it became clear that by placing high strength reinforcing members between oxide superconducting bulk members and joining or bonding the top and bottom oxide superconducting bulk members, there is the effect of suppressing cracking of a superconducting bulk member. Further, Furthermore by making the outer circumference reinforcing ring a two-layer structure and strongly joining the high strength reinforcing member at its outer circumference ends at the top and bottom surfaces and side surfaces, an oxide superconducting bulk laminate better suppressing cracking and having a higher trapped magnetic flux density is obtained.

Table 3 (Table 3-1 and Table 3-2 will be referred to all together as “Table 3”) shows the results of the magnetization tests for the above-mentioned Example 4. At the time of the magnetization tests, oxide superconducting bulk members, high strength reinforcing members, and outer circumference reinforcing rings used as the present inventions and comparative example of the tests described in Table 3 were prepared. For the oxide superconducting bulk members, diameter 70 mm single-crystal form oxide superconducting bulk members prepared in the same way as the above-mentioned Example 4 were used. These were worked into columnar shapes of various different thicknesses described in Table 3 to prepare oxide superconducting bulk members. Further, for the high strength reinforcing members as well, sheets of the materials and thicknesses described in Table 3 were worked into disk-shaped sheets. Furthermore, for the outer circumference reinforcing rings as well, sheets were worked into rings of the materials and sizes described in Table 3.

TABLE 3-1

| | | Manufacturing conditions | | | | | | | | |
|---|---|---|---|---|---|---|---|---|---|---|
| | | High strength member | | | | | Oxide superconducting bulk member | | | |
| | | Material | Thickness (mm) | Outside diameter (mm) | No. | Presence of top and bottom surfaces | Thickness (mm) | Outside diameter (mm) | No. | Presence of top and bottom surfaces |
| 4-1 | Present invention (1) | Nichrome | 1.0 | 69.0 | 2 | Top and bottom surface | 4.0 | 65.0 | 6 | None |
| | | | 0.3 | 69.0 | 5 | — | | | | |
| | Present invention (2) | Nichrome | 0.6 | 65.0 | 7 | Top and bottom surface | 4.0 | 65.0 | 6 | None |
| | Comp. member | — | — | — | — | — | 14.2 | 65.0 | 2 | Top and bottom surface |
| 4-2 | Present invention (1) | Oxygen-free copper | 0.8 | 66.0 | 2 | Top and bottom surface | 3.5 | 62.0 | 8 | None |
| | | SUS316 | 0.2 | 66.0 | 7 | — | | | | |
| | Present invention (2) | Oxygen-free copper | 0.8 | 62.0 | 2 | Top and bottom surface | 3.5 | 62.0 | 8 | None |
| | | SUS316 | 0.2 | 62.0 | 7 | — | | | | |
| | Comp. member | — | — | — | — | — | 16.0 | 62.0 | 2 | Top and bottom surface |
| 4-3 | Present invention (1) | Oxygen-free copper | 1.5 | 66.0 | 2 | Top and bottom surface | 2.5 | 62.0 | 12 | None |
| | | Phosphorus deoxidized copper | 0.5 | 66.0 | 11 | — | | | | |
| | Present invention (2) | Oxygen-free copper | 1.5 | 62.0 | 2 | Top and bottom surface | 2.5 | 62.0 | 12 | None |
| | | Phosphorus deoxidized copper | 0.5 | 62.0 | 11 | — | | | | |

TABLE 3-1-continued

| | | | | | | | | | |
|---|---|---|---|---|---|---|---|---|---|
| Comp. member | — | — | — | — | — | 18.4 | 62.0 | 2 | Top and bottom surface |

| | | Manufacturing conditions Outer circumference reinforcing ring | | | | | | | | | |
|---|---|---|---|---|---|---|---|---|---|---|---|
| | | Inside | | | | | Outside | | | | |
| | | Material | Height (mm) | Outside diameter (mm) | Inside diameter (mm) | No. | Material | Height (mm) | Outside diameter (mm) | Inside diameter (mm) | No. |
| 4-1 | Present invention (1) | SUS314 | 4.0 | 69.0 | 65.05 | 6 | SUS314 | 28.5 | 86.0 | 69.05 | 1 |
| | Present invention (2) | — — | — — | — — | — — | — — | SUS314 | 28.5 | 86.0 | 65.05 | 1 |
| | Comp. member | — | — | — | — | — | SUS314 | 28.5 | 86.0 | 65.05 | 1 |
| 4-2 | Present invention (1) | Oxygen-free copper | 3.5 | 66.0 | 62.05 | 8 | Aluminum alloy | 32.0 | 96.0 | 66.05 | 1 |
| | Present invention (2) | — — | — — | — — | — — | — — | Aluminum alloy | 32.0 | 96.0 | 62.05 | 1 |
| | Comp. member | — | — | — | — | — | Aluminum alloy | 32.0 | 96.0 | 62.05 | 1 |
| 4-3 | Present invention (1) | Phosphorus deoxidized copper | 2.5 | 66.0 | 62.05 | 12 | SUS316L | 39.0 | 92.0 | 66.05 | 1 |
| | Present invention (2) | — — | — — | — — | — — | — — | SUS316L | 39.0 | 92.0 | 62.05 | 1 |
| | Comp. member | — | — | — | — | — | SUS316L | 39.0 | 92.0 | 62.05 | 1 |

TABLE 3-2

| | | Magnetization test (1) | | | | | Magnetization test (2) | | | | |
|---|---|---|---|---|---|---|---|---|---|---|---|
| | | Magnetization conditions | | | Magnetization results | | Magnetization conditions | | | Magnetization results | |
| Test no. | | Applied magnetic field (T) | Magnetization temperature (K) | Demagnetization rate (T/min) | Presence of cracking | Trapped magnetic flux density (T) | Applied magnetic field (T) | Magnetization temperature (K) | Demagnetization rate (T/min) | Presence of cracking | Trapped magnetic flux density (T) |
| 4-1 | Present invention (1) | 8.5 | 40.0 | 0.05 | None | 7.2 | 12.0 | 40.0 | 0.05 | None | 9.5 |
| | Present invention (2) | 8.5 | 40.0 | 0.05 | None | 7.2 | 12.0 | 40.0 | 0.05 | Yes | — |
| | Comp. member | 8.5 | 40.0 | 0.05 | Yes | — | — | — | — | — | — |
| 4-2 | Present invention (1) | 8.5 | 20.0 | 0.20 | None | 8.45 | 11.0 | 20.0 | 0.20 | None | 9.6 |
| | Present invention (2) | 8.5 | 20.0 | 0.20 | None | 8.45 | 11.0 | 20.0 | 0.20 | Yes | — |
| | Comp. member | 8.5 | 20.0 | 0.20 | Yes | — | — | — | — | — | — |
| 4-3 | Present invention (1) | 8.0 | 30.0 | 0.15 | None | 7.95 | 12.5 | 30.0 | 0.15 | None | 9.2 |
| | Present invention (2) | 8.0 | 30.0 | 0.15 | None | 7.95 | 12.5 | 30.0 | 0.15 | Yes | — |
| | Comp. member | 8.0 | 30.0 | 0.15 | Yes | — | — | — | — | — | — |

These columnar-shaped oxide superconducting bulk members, high strength reinforcing members, and outer circumference reinforcing rings were joined to prepare the oxide superconducting bulk magnets used in the tests. For assembly of the bulk magnets of the present inventions and comparative example, solder was used. When using solder for assembly, in the same way as the above-mentioned Example 4, the superconducting bulk members, inside outer circumference reinforcing rings, and high strength reinforcing members were inserted into outer circumference reinforcing rings heated on a hot plate to a temperature at which the solder melts, the solder was made to evenly coat them, and the overall assemblies were cooled to room temperature to thereby join the members and prepare superconducting bulk magnets.

The magnetization tests for evaluation of performance were conducted under the magnetization conditions shown in Table 3. The results of the magnetization tests, as shown in Table 3, were that by placing high strength reinforcing members between oxide superconducting bulk members and joining or bonding the top and bottom oxide superconducting bulk members, there is an effect of inhibiting cracks of a superconducting bulk member. Further, it became clear that by further making the outer circumference reinforcing ring a two-layer structure and strongly bonding the high strength reinforcing members at the outer circumference end parts at the top and bottom surfaces and side surfaces, an oxide superconducting bulk laminate better suppressing cracking and having a higher trapped magnetic flux density is obtained.

Example 5

In the superconducting bulk magnet 1700 of Example 5, Gd—Ba—Cu—O-based oxide superconducting bulk members 1710 were used. First, powders of oxides of commercially available purity 99.9 mass % gadolinium (Gd), barium (Ba), copper (Cu) were weighed to give a molar ratio of Gd:Ba:Cu=1.6:2.3:3.3. To this, platinum was added in 0.5 mass % and silver was added in 10 mass %. The weighed powders were fully kneaded over 1 hour, then were calcined in the atmosphere at 1173K for 8 hours.

Next, a mold was used to shape the calcined powder to a disk shape. The shaped part was heated to 1423K to a molten state, was held there for 30 minutes, then, in the middle of being lowered in temperature, was seeded, and was gradually cooled over a temperature region of 1278K to 1252K over 180 hours to grow the crystal and obtain a disk-shaped diameter 70 mm single-crystal form oxide superconducting bulk member with a c-axis of the crystallographic orientation of the superconducting phase parallel to the normal of the substantially disk plane. This single-crystal form oxide superconducting bulk member was worked to an outside diameter 65.0 mm, inside diameter 35.0 mm, height 8.0 mm ring shape. The end material formed by this working was polished to a mirror surface and was examined for microcrystalline structure by an optical microscope, whereupon 1 μm or so parts of the 211 phase were dispersed. Furthermore, sputtering was used to coat the surface of the superconducting member with silver to about 2 μm. This was heat treated in an oxygen stream at 723K for 100 hours. Similar processing was performed to prepare six ring-shaped oxide superconducting bulk members 1710 (1711 to 1716).

Further, a thickness 1.0 mm Nichrome sheet was worked to an outside diameter 65.0 mm and inside diameter 35.0 mm. Similarly, five high strength reinforcing members 1720 (1721 to 1725) were prepared. The surfaces of the Nichrome were lightly coated with solder in advance. For the outer circumference reinforcing ring 1730, an SUS316L outside diameter 73.0 mm, inside diameter 65.05 mm, height 53.6 mm ring was used. Its inner circumferential surface was also lightly coated with solder.

Figure 17A:
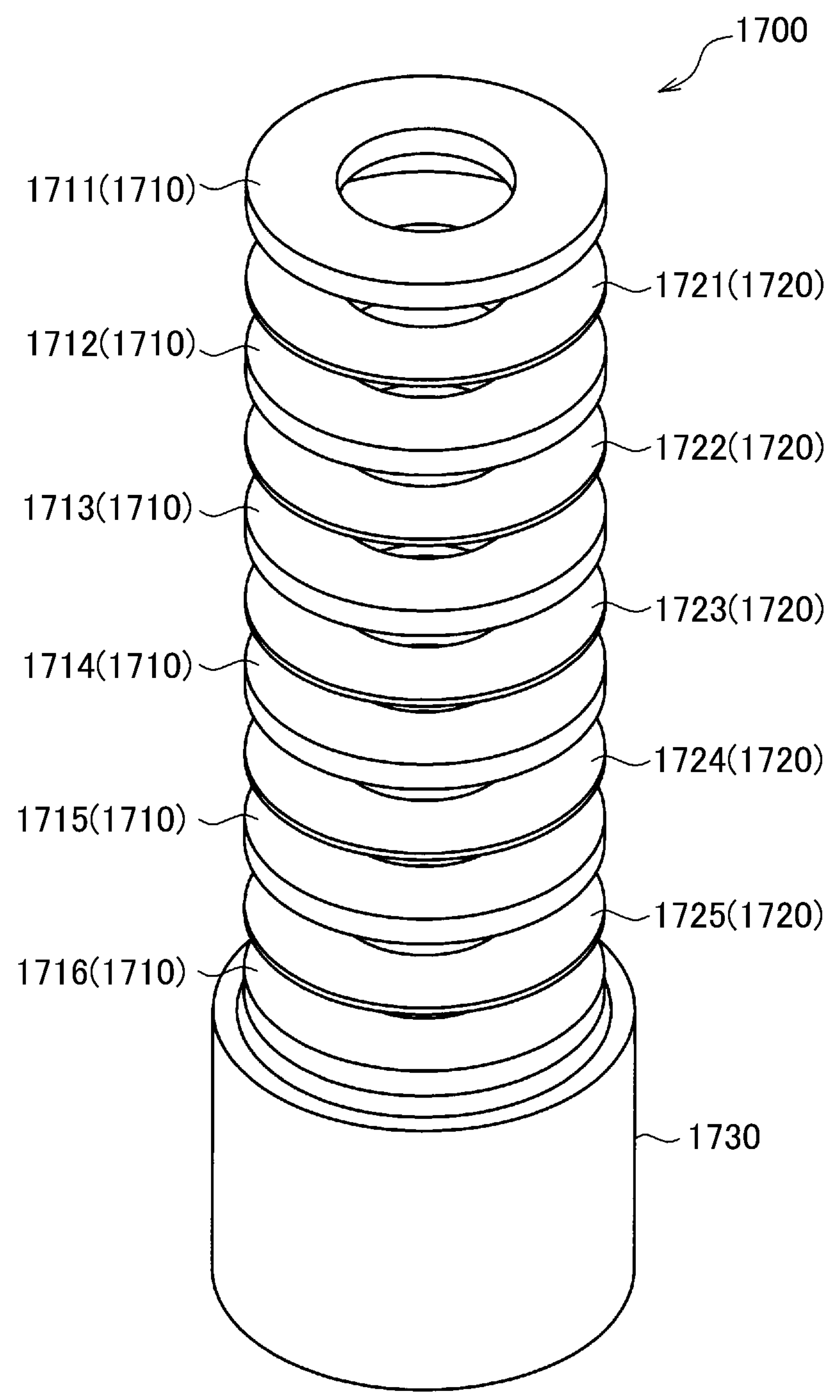
FIG. 17A is a schematic disassembled perspective view of a donut-shaped oxide superconducting bulk laminate according to Example 1.
Figure 17B:
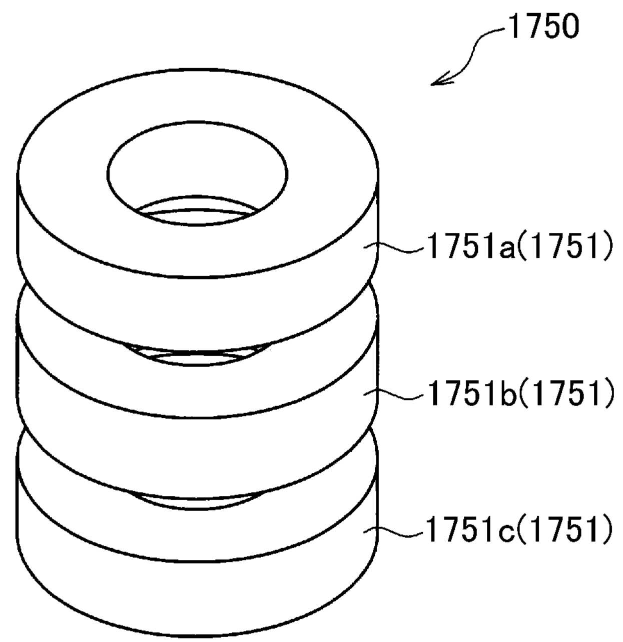
FIG. 17B is a schematic disassembled perspective view of a comparative member for Example 1.
Figure 17B:
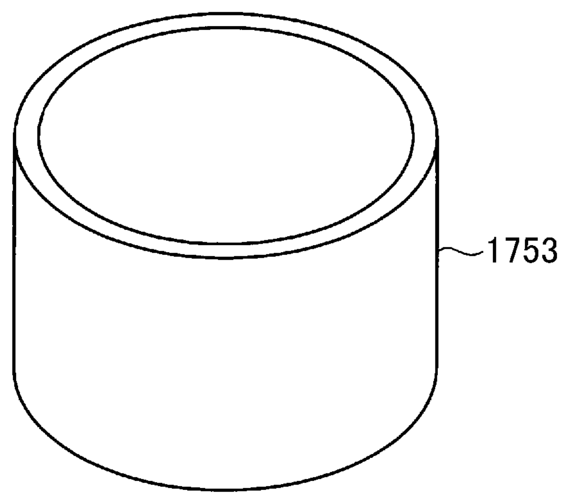
Figure 17C:
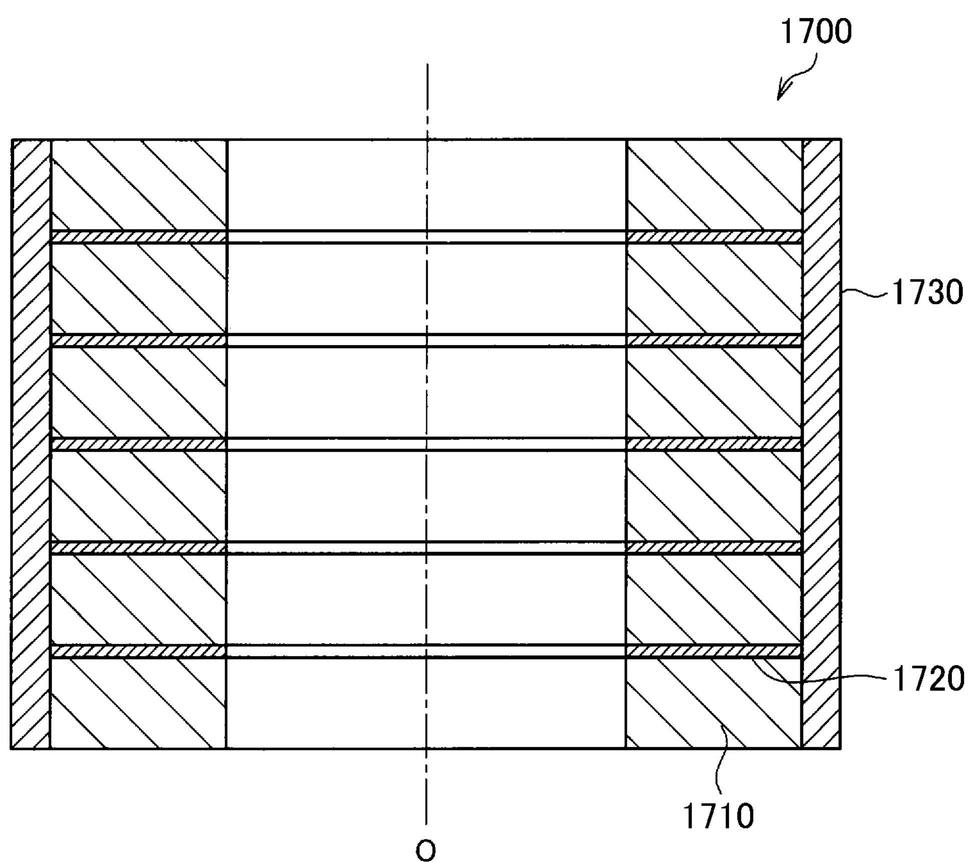
FIG. 17C is a cross-sectional view when cutting along the center axial line the oxide superconducting bulk laminate of FIG. 17A.

Next, the superconducting bulk members and Nichrome rings were alternately inserted into the outer circumference reinforcing ring 1730 heated to a temperature at which the solder melts, the solder was made to evenly coat them, then the overall assembly was cooled to room temperature to thereby join the members and prepare a superconducting bulk magnet 1700. FIG. 17A shows the stacked state of the obtained donut-shaped oxide superconducting bulk laminate. Further, FIG. 17C shows a cross-sectional view of FIG. 17A.

The obtained oxide superconducting bulk magnet 1700 was placed at room temperature in a 7 T magnetic field, then was cooled to 40K using a refrigerating machine, then the external magnetic field was demagnetized by 0.1 T/min in speed until a zero magnetic field. As a result, a 6.85 T trapped magnetic flux density was confirmed on the axial center part of the oxide superconducting bulk magnet 1700. It could be confirmed that by this magnetization, magnetization was possible without an oxide superconducting bulk member 1710 cracking.

Figure 17D:
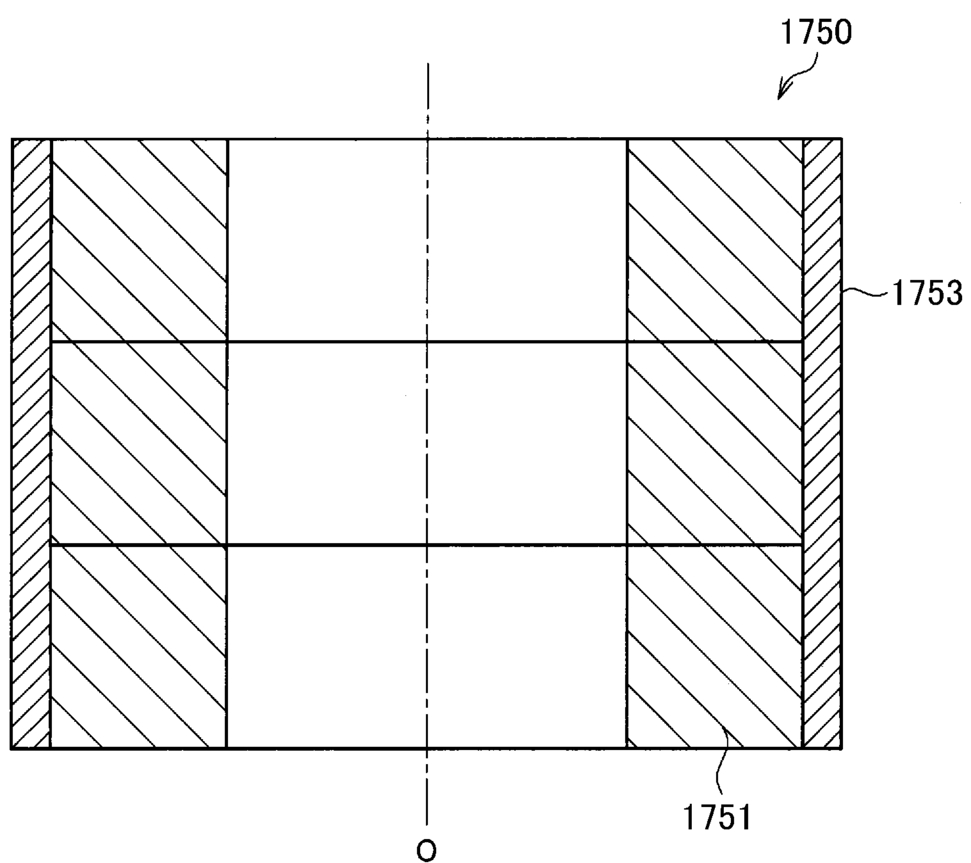
FIG. 17D is a cross-sectional view when cutting along the center axial line the oxide superconducting bulk laminate of FIG. 17B.

Next, as a comparative member, from a single-crystal form oxide superconducting bulk member 11 prepared in the same way as explained above, two outside diameter 65.0 mm, inside diameter 35.0 mm, height 17.0 mm rings and one height 19 mm ring were prepared in the same way as explained above. FIG. 17B shows the state of the comparative member obtained. Further, FIG. 17D shows a cross-sectional view of FIG. 17B. There were placed in a SUS316L outside diameter 73.0 mm, inside diameter 65.05 mm, height 53.6 mm outer circumference reinforcing ring 13 prepared in the same way as explained above and were joined by solder in the same way as explained above to prepare the comparative member oxide superconducting bulk magnet 1750. That is, the comparative member is not provided with high strength reinforcing members.

The comparative member, in the same way as explained above, was placed at room temperature in a 7 T magnetic field, then was cooled to 40K using a refrigerating machine, then the external magnetic field was demagnetized by 0.1 T/min in speed until a zero magnetic field. In this magnetization process, at the stage of demagnetization down to 5.1 T, a rapid drop in the magnetic flux density was confirmed at the axial center part of the oxide superconducting bulk magnet 1750. The trapped magnetic flux density at the axial center part when demagnetized to a zero magnetic field was 0.23 T. After the magnetization tests, the superconducting bulk member 1751 was examined at room temperature, whereupon cracks were confirmed in a superconducting bulk member 1751.

From these tests, it became clear that by placing high strength reinforcing members between ring-shaped oxide superconducting bulk members and joining or bonding the top and bottom ring-shaped oxide superconducting bulk members, an oxide superconducting bulk magnet having a high trapped magnetic flux density can be obtained without cracks forming in a superconducting member.

Table 4 (Table 4-1 and Table 4-2 will be referred to all together as “Table 4”) shows the results of the magnetization tests for the above-mentioned Example 5. At the time of the magnetization tests, ring-shaped oxide superconducting bulk members, high strength reinforcing members, and outer circumference reinforcing rings used as the present inventions and comparative example of the tests described in Table 4 were prepared. For the ring-shaped oxide superconducting bulk members, diameter 70 mm single-crystal form oxide superconducting bulk members prepared in the same way as above-mentioned Example 5 were used and worked into the various different thickness outside diameter 65.0 mm, inside diameter 35.0 mm ring shapes based on the manufacturing conditions of the tests of Table 4 to prepare ring-shaped oxide superconducting bulk members. Further, for the high strength reinforcing members as well, sheets of the materials and thicknesses described in Table 4 were worked to outside diameter 65.0 mm, inside diameter 35.0 mm to 35.2 mm rings. Furthermore, for the outer circumference reinforcing rings as well, sheets were worked to rings of the materials and sizes described in Table 4.

TABLE 4-1

| | | Manufacturing conditions | | | | | | | |
|---|---|---|---|---|---|---|---|---|---|
| | | High strength member | | | | | | Ring-shaped oxide superconducting bulk member | |
| Test no. | | Material | Thickness (mm) | Outside diameter (mm) | Inside diameter (mm) | No. | Presence of top and bottom surfaces | Thick-nesses (mm) | Outside diameter (mm) |
| 5-1 | Present invention | Nichrome | 1.0 | 65.0 | 35.0 | 5 | None | 8.0 | 65.0 |
| | Comp. member | — | — | — | — | — | — | 17.0<br>19.0 | 65.0 |
| 5-2 | Present invention | SUS316L | 1.0 | 65.0 | 35.0 | 5 | None | 8.0 | 65.0 |
| | Comp. member | — | — | — | — | — | — | 17.8 | 65.0 |
| 5-3 | Present invention | Oxygen-free copper | 0.5 | 65.0 | 35.0 | 5 | None | 3.0 | 65.0 |
| | Comp. member | — | — | — | — | — | — | 17.8 | 65.0 |
| 5-4 | Present invention | Aluminum alloy A5056 | 0.3 | 65.0 | 35.0 | 5 | None | 6.0 | 65.0 |
| | Comp. member | — | — | — | — | — | — | 19.0 | 65.0 |
| 5-5 | Present invention | Oxygen-free copper clad material of Nichrome | About 1.6 mm, each 0.5 mm | 65.0 | 34.8 | 4 | None | 6.0 | 65.0 |
| | Comp. member | — | — | — | — | — | — | 18.5 | 65.0 |
| 5-6 | Present invention | Nichrome | 1.0 | 65.0 | 34.8 | 5 | None | 8.0 | 65.0 |
| | Comp. member | — | — | — | — | — | — | 17.8 | 65.0 |
| 5-7 | Present invention | silver | 0.5 | 65.0 | 35.0 | 5 | None | 6.0 | 65.0 |
| | Comp. member | — | — | — | — | — | — | 19.5 | 65.0 |
| 5-8 | Present invention | Aluminum clad material of Nichrome | About 1.6 mm, each 0.5 mm | 65.0 | 35.0 | 4 | None | 9.5 | 65.0 |
| | Comp. member | — | — | — | — | — | — | 18.0 | 65.0 |

| | | Manufacturing conditions | | | | | | | |
|---|---|---|---|---|---|---|---|---|---|
| | | Ring-shaped oxide superconducting bulk member | | | Outer circumference reinforcing ring | | | | |
| Test no. | | Inside diameter (mm) | No. | Presence of top and bottom surfaces | Material | Height (mm | Outside diameter (mm) | Inside diameter (mm) | Other conditions |
| 5-1 | Present invention | 35.0 | 6 | Top and bottom surface | SUS316L | 53.6 | 73.0 | 65.05 | — |

TABLE 4-1-continued

| | | | | | | | | | |
|---|---|---|---|---|---|---|---|---|---|
| | Comp. member | 35.0 | 2<br>1 | Top and bottom surface | SUS316L | 53.6 | 73.0 | 65.05 | — |
| 5-2 | Present invention | 35.0 | 6 | Top and bottom surface | SUS304L | 53.6 | 73.0 | 65.05 | — |
| | Comp. member | 35.0 | 3 | Top and bottom surface | SUS304L | 53.6 | 73.0 | 65.05 | — |
| 5-3 | Present invention | 35.0 | 6 | Top and bottom surface | Oxygen-free copper | 53.6 | 87.0 | 65.05 | — |
| | Comp. member | 35.0 | 3 | Top and bottom surface | SUS316L | 53.6 | 87.0 | 65.05 | — |
| 5-4 | Present invention | 35.0 | 6 | Top and bottom surface | Oxygen-free copper | 38.0 | 87.0 | 65.05 | — |
| | Comp. member | 35.0 | 2 | Top and bottom surface | SUS316L | 38.0 | 87.0 | 65.05 | — |
| 5-5 | Present invention | 35.0 | 5 | Top and bottom surface | Oxygen-free copper | 37.0 | 87.0 | 65.05 | — |
| | Comp. member | 35.0 | 2 | Top and bottom surface | SUS316L | 37.0 | 87.0 | 65.05 | — |
| 5-6 | Present invention | 35.0 | 6 | Top and bottom surface | Inside: Cu outside: SUS316L composite member | 53.6 | 87.0 | 65.05 | Thickness: each 5.6 mm |
| | Comp. member | 35.0 | 3 | Top and bottom surface | SUS316L | 53.6 | 87.0 | 65.05 | — |
| 5-7 | Present invention | 35.0 | 6 | Top and bottom surface | Oxygen-free copper | 39.0 | 87.0 | 65.05 | — |
| | Comp. member | 35.0 | 2 | Top and bottom surface | SUS316L | 39.0 | 87.0 | 65.05 | — |
| 5-8 | Present invention | 35.0 | 5 | Top and bottom surface | Inside: Cu alloy Outside: SUS304L composite member | 54.2 | 87.0 | 65.05 | Thickness: each 5.6 mm |
| | Comp. member | 35.0 | 3 | Top and bottom surface | SUS304L | 54.2 | 87.0 | 65.05 | — |

TABLE 4-2

| | | Magnetization test | | | | |
|---|---|---|---|---|---|---|
| | | Magnetization conditions | | | Magnetization results | |
| Test no. | | Applied magnetic field (T) | Magnetization temperature (K) | Demagnetization rate (T/min) | Presence of cracking | Trapped magnetic flux density (T) |
| 5-1 | Present invention | 7.0 | 40.0 | 0.10 | None | 6.85 |
| | Comp. member | 7.0 | 40.0 | 0.10 | Yes | — |
| 5-2 | Present invention | 7.5 | 30.0 | 0.10 | None | 7.22 |
| | Comp. member | 7.5 | 30.0 | 0.10 | Yes | — |
| 5-3 | Present invention | 7.0 | 30.0 | 0.20 | None | 6.79 |
| | Comp. member | 7.0 | 30.0 | 0.20 | Yes | — |

TABLE 4-2-continued

| Test no. | | Magnetization test | | | | |
|---|---|---|---|---|---|---|
| | | Magnetization conditions | | | Magnetization results | |
| | | Applied magnetic field (T) | Magnetization temperature (K) | Demagnetization rate (T/min) | Presence of cracking | Trapped magnetic flux density (T) |
| 5-4 | Present invention | 7.0 | 20.0 | 0.15 | None | 6.87 |
| | Comp. member | 7.0 | 20.0 | 0.15 | Yes | — |
| 5-5 | Present invention | 8.0 | 40.0 | 0.20 | None | 7.77 |
| | Comp. member | 8.0 | 40.0 | 0.20 | Yes | — |
| 5-6 | Present invention | 8.0 | 30.0 | 0.15 | None | 7.78 |
| | Comp. member | 8.0 | 30.0 | 0.15 | Yes | — |
| 5-7 | Present invention | 7.0 | 40.0 | 0.15 | None | 6.81 |
| | Comp. member | 7.0 | 40.0 | 0.15 | Yes | — |
| 5-8 | Present invention | 8.0 | 30.0 | 0.15 | None | 7.79 |
| | Comp. member | 8.0 | 30.0 | 0.15 | Yes | — |

These ring-shaped oxide superconducting bulk members, high strength reinforcing members, and outer circumference reinforcing rings were joined to prepare the oxide superconducting bulk magnets used in the tests. For assembly of the oxide superconducting bulk magnets of the present inventions and comparative example, solder was used. When using solder for assembly, in the same way as the above-mentioned Example 5, the superconducting bulk members and high strength reinforcing members were alternately inserted into outer circumference reinforcing rings 1730 heated on a hot plate to a temperature at which the solder melts, the solder was made to evenly coat them, and the overall assemblies were cooled to room temperature to thereby join the members and prepare superconducting bulk magnets 1700.

Note that, as the materials of the high strength reinforcing members, in Table 4, Test No. 1-5, the "oxygen-free copper clad material of Nichrome" means a material of a thickness 0.5 mm Nichrome sheet on both surfaces of which thickness 0.5 mm oxygen-free copper sheets are laminated by soldering by Sn—Zn-based solder. Further, in Table 1, Test No. 1-8, the "aluminum clad material of Nichrome" means a material of a thickness 0.5 mm Nichrome sheet on both surfaces of which thickness 0.5 mm aluminum sheets are laminated by soldering by Sn—Zn-based solder.

Further, as the materials of the outer circumference reinforcing rings, in Table 4, Test No. 1-6, the "inner circumference: oxygen-free copper, outer circumference: SUS316L composite member" means a composite member comprised of an outside diameter 87.6 mm, inside diameter 76.05 mm, height 53.6 mm SUS316L ring in which an outside diameter 76.0 mm, inside diameter 65.05 mm, height 53.6 mm oxygen-free copper ring is bonded by an Sn—Zn-based solder. In Test No. 1-8, the "inner circumference: Cu alloy, outer circumference: SUS304L composite member" means a composite member comprised of an outside diameter 87.6 mm, inside diameter 76.35 mm, height 53.6 mm SUS304L ring in which an outside diameter 76.3 mm, inside diameter 65.05 mm, height 53.6 mm Cu alloy ring is bonded by an Sn—Zn-based solder.

The magnetization tests for evaluation of performance were conducted under the magnetization conditions shown in Table 4. The results of the magnetization tests, as shown in Table 4, were that superconducting bulk magnets with high strength reinforcing members alternately stacked did not crack, while comparative members without high strength reinforcing members alternately stacked cracked. From this, it became clear that the reinforcement by the high strength reinforcing members functioned effectively and a strong magnetic field could be generated.

Example 6

In the superconducting bulk magnet 1800 of Example 6, Eu—Ba—Cu—O-based oxide superconducting bulk members 1810 were used. First, powders of oxides of commercially available purity 99.9 mass % europium (Eu), barium (Ba), and copper (Cu) were weighed to give a molar ratio of Eu:Ba:Cu=1.6:2.3:3.3. To this, $CeO_2$ was added in 1.0 mass % and silver was added in 10 mass %. The weighed powders were fully kneaded over 1 hour, then were calcined in the atmosphere at 1173K for 8 hours.

Next, a mold was used to shape the calcined powder to a disk shape. The shaped part was heated to 1423K to a molten state, was held there for 30 minutes, then, in the middle of being lowered in temperature, was seeded, and was gradually cooled over a temperature region of 1288K to 1262K over 180 hours to grow the crystal and obtain a disk-shaped diameter 70 mm single-crystal form superconducting bulk member with a c-axis of the crystallographic orientation of the superconducting phase parallel to the normal of the substantially disk plane. This single-crystal form oxide superconducting bulk member was worked to one outside diameter 65.0 mm, inside diameter 32.0 mm, height 8.0 mm ring shape, one outside diameter 65.0 mm, inside diameter 32.0 mm, and height 10.0 mm ring, and two outside diameter 65.0 mm, inside diameter 36.0 mm, and height 10.0 mm rings. Furthermore, sputtering was used to coat the surfaces of the superconducting members with silver to about 2 μm. These were heat treated in an oxygen stream at 723K for 100 hours. Similar processing was performed to prepare four ring-shaped oxide superconducting bulk members 1810 (1811 to 1814).

Further, from a Nichrome sheet, one outside diameter 65.0 mm, inside diameter 31.8 mm, thickness 1.5 mm ring-shaped high strength reinforcing member, two outside diameter 65.0 mm, inside diameter 31.8 mm, thickness 0.8 mm ring-shaped high strength reinforcing members, and one outside diameter 65.0 mm, inside diameter 35.8 mm, thickness 0.8 mm ring-shaped high strength reinforcing member, that is, four high strength reinforcing members 1820 (1821 to 1824), were prepared. The surfaces of the Nichrome were lightly coated with solder in advance. For the outer circumference reinforcing ring 1830, an SUS316L outside diameter 73.0 mm, inside diameter 65.05 mm, height 42.2 mm ring was used. Its inner circumferential surface was also lightly coated with solder.

Figure 18A:
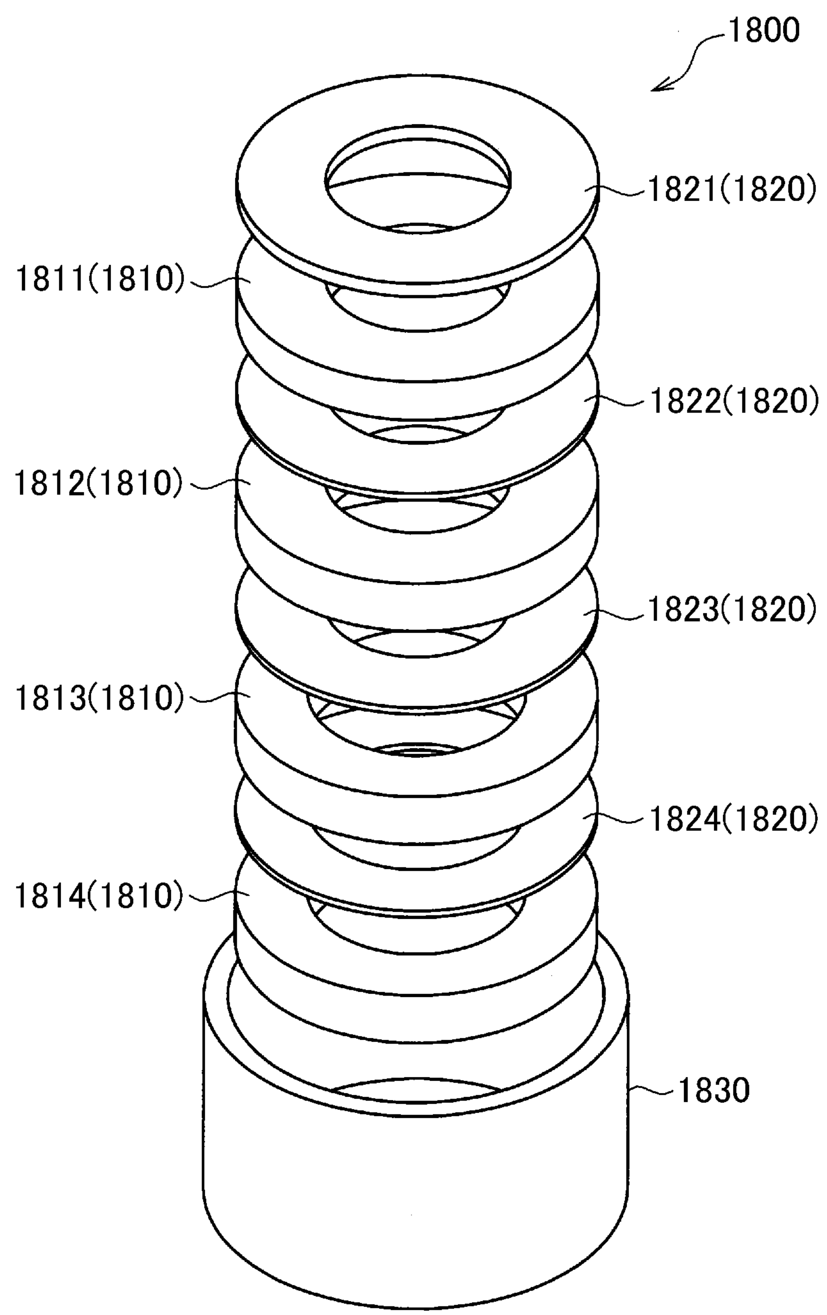
FIG. 18A is a schematic disassembled perspective view of a donut-shaped oxide superconducting bulk laminate according to Example 2.
Figure 18B:
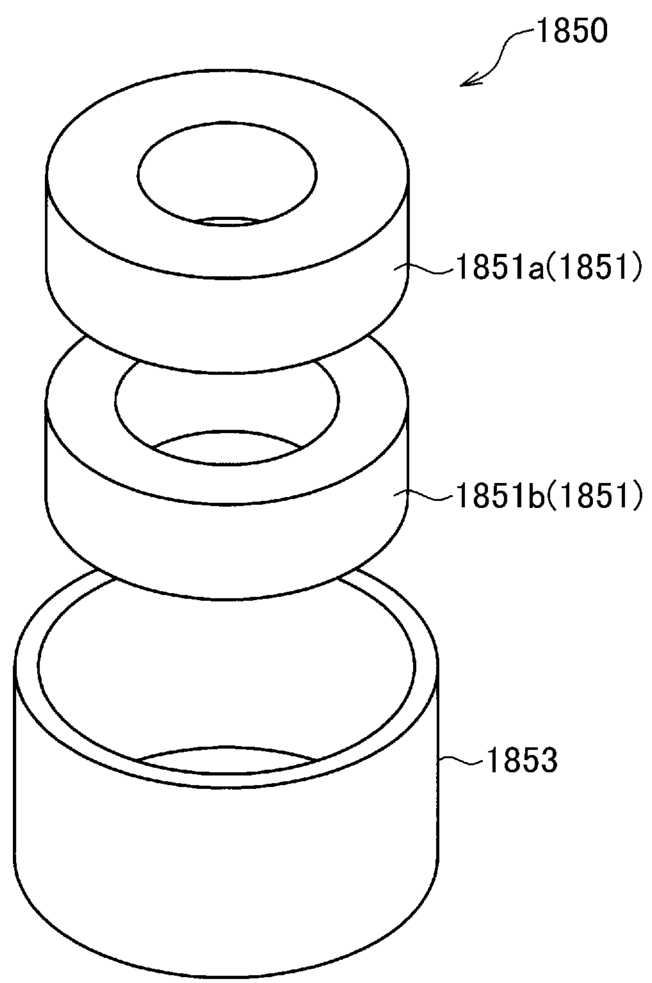
FIG. 18B is a schematic disassembled perspective view of a comparative member for Example 2.
Figure 18C:
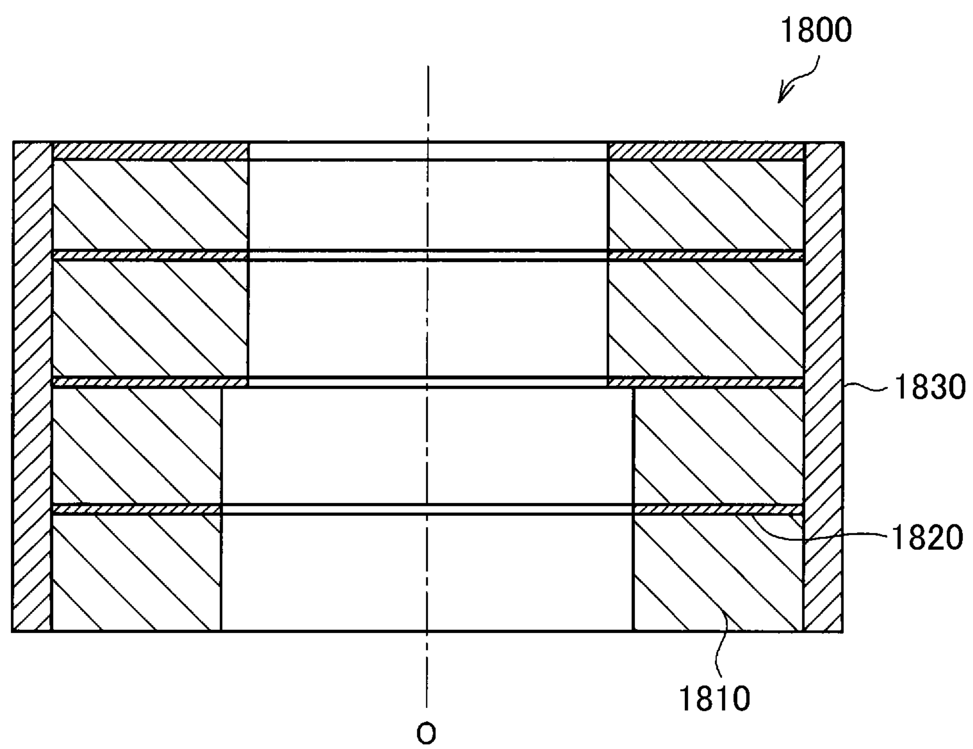
FIG. 18C is a cross-sectional view when cutting along the center axial line the oxide superconducting bulk laminate of FIG. 18A.

Next, the oxide superconducting bulk members and high strength reinforcing members were placed as follows in the outer circumference reinforcing ring 1830 heated to a temperature at which the solder melts, the solder was made to evenly coat them, and the overall assembly was cooled to room temperature to thereby join the members and prepare the donut-shaped oxide superconducting bulk laminate. This stacked state of the donut-shaped oxide superconducting bulk laminate is shown in FIG. 18A. Further, FIG. 18C shows a cross-sectional view of FIG. 18A.

1) Nichrome ring (high strength reinforcing member 1821, topmost surface): outside diameter 65.0 mm, inside diameter 31.8 mm, thickness 1.5 mm 2) Oxide superconducting bulk member 1811: outside diameter 65.0 mm, inside diameter 32.0 mm, height 8.0 mm 3) Nichrome ring (high strength reinforcing member 1822): outside diameter 65.0 mm, inside diameter 31.8 mm, thickness 0.8 mm 4) Oxide superconducting bulk member 1812: outside diameter 65.0 mm, inside diameter 32.0 mm, height 10.0 mm 5) Nichrome ring (high strength reinforcing member 1823): outside diameter 65.0 mm, inside diameter 31.8 mm, thickness 0.8 mm 6) Oxide superconducting bulk member 1813: outside diameter 65.0 mm, inside diameter 36.0 mm, height 10.0 mm 7) Nichrome ring (high strength reinforcing member 1824): outside diameter 65.0 mm, inside diameter 35.8 mm, thickness 0.8 mm 8) Oxide superconducting bulk member 1814: outside diameter 65.0 mm, inside diameter 36.0 mm, height 10.0 mm Furthermore, a similar method was used to prepare another donut-shaped oxide superconducting bulk laminate. Further, these were stacked so that the sides with the Nichrome high strength reinforcing members became the top surface and bottom surface and were bonded by a resin to obtain a single donut-shaped oxide superconducting bulk laminate.

The obtained donut-shaped oxide superconducting bulk laminate was placed at room temperature in an 8 T magnetic field, then was cooled to 40K using a refrigerating machine, then the external magnetic field was demagnetized by 0.1 T/min in speed until a zero magnetic field. As a result, a 7.85 T trapped magnetic flux density was confirmed on the axial center part of the superconducting bulk magnet. It could be confirmed that by this magnetization, magnetization was possible without a superconducting bulk member 1810 cracking.

Figure 18D:
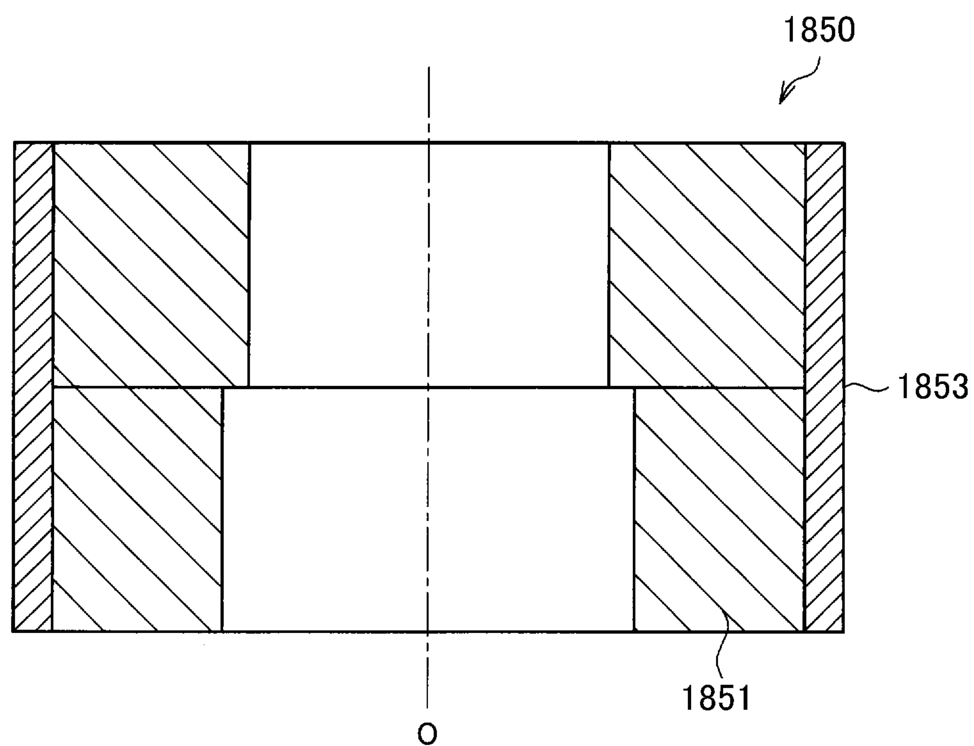
FIG. 18D is a cross-sectional view when cutting along the center axial line the oxide superconducting bulk laminate of FIG. 18B.

Next, as a comparative member, from a single-crystal form superconducting bulk member prepared in the same way as explained above, one outside diameter 65.0 mm, inside diameter 32.0 mm, height 21.0 mm ring and one outside diameter 65.0 mm, inside diameter 36.0 mm, height 21.0 mm ring were prepared in the same way as explained above (notations 1851*a*, 1851*b*). These were placed in an SUS316L outside diameter 73.0 mm, inside diameter 65.05 mm, height 42.2 mm outer circumference reinforcing ring 1853 prepared in the same way as explained above and joined by soldering in the same way as explained above to obtain a donut-shaped oxide superconducting bulk laminate. This stacked state is shown in FIG. 18B. Further, a cross-sectional view of FIG. 18B is shown in FIG. 18D.

Furthermore, a similarly prepared donut-shaped oxide superconducting bulk laminate was placed so that superconducting bulk members with small inside diameters became the top surface and bottom surface and were bonded by a resin to thereby prepare a single comparative member superconducting bulk magnet. This was, in the same way as explained above, placed at room temperature in an 8 T magnetic field, then was cooled to 40K using a refrigerating machine, then the external magnetic field was demagnetized by 0.1 T/min in speed until a zero magnetic field. In this magnetization process, at the stage of demagnetization down to 5.1 T, a rapid drop in the magnetic flux density was confirmed at the axial center part of the superconducting bulk magnet. The trapped magnetic flux density at the axial center part when demagnetized to a zero magnetic field was 0.23 T. After the magnetization tests, the superconducting bulk member 1851 was examined at room temperature, whereupon cracks were confirmed in the superconducting bulk member 1851.

From these tests, it became clear that by placing high strength reinforcing members between ring-shaped oxide superconducting bulk members and joining or bonding them to the top and bottom ring-shaped oxide superconducting bulk members and further by making the thicknesses of the high strength reinforcing members arranged at the topmost surface and the bottommost surface of the oxide superconducting bulk laminate greater than the thicknesses of the high strength reinforcing members arranged between the oxide superconducting bulk members and making the inside diameters of the high strength reinforcing members smaller than the inside diameters of the oxide superconducting bulk members, a donut-shaped oxide superconducting bulk laminate having a high trapped magnetic flux density is obtained without a superconducting bulk member cracking.

Table 5 (Table 5-1 and Table 5-2 will be referred to all together as "Table 5") shows the results of the magnetization tests for the above-mentioned Example 6. At the time of the magnetization tests, the ring-shaped oxide superconducting bulk members, high strength reinforcing members, and outer circumference reinforcing rings used as the present inventions and comparative example in the tests described in Table 5 were prepared. For the ring-shaped oxide superconducting bulk members, diameter 70 mm single-crystal form oxide superconducting bulk members prepared in the same way as the above-mentioned Example 6 were used. These were worked to different thickness outside diameter 65.0 mm, inside diameter 35.0 mm ring shapes based on the manufacturing conditions of the tests of Table 5 to thereby prepare ring-shaped oxide superconducting bulk members. Further, for the high strength reinforcing members as well, the sheets of the materials and thicknesses described in Table 5 were worked to outside diameter 65.0 mm, inside diameter 35.0 mm to 35.4 mm rings. Furthermore, for the outer circumference reinforcing rings as well, the sheets were worked to rings of the materials and sizes described Table 5.

TABLE 5-1

| | | Manufacturing conditions | | | | | | | |
|---|---|---|---|---|---|---|---|---|---|
| | | High strength member | | | | | | Ring-shaped oxide superconducting bulk member | |
| Test no. | | Material | Thicknesses (mm) | Outside diameter (mm) | Inside diameter (mm) | No. | Presence of top and bottom surfaces | Thicknesses (mm) | Outside diameter (mm) |
| 6-1 | Present invention | Nichrome | 1.5 | 65.0 | 31.8 | 1 | Top surface | 8.0 | 65.0 |
| | | | 0.8 | 65.0 | 31.8 | 2 | — | 10.0 | 65.0 |
| | | | 0.8 | 65.0 | 35.8 | 1 | — | 10.0 | 65.0 |
| | Comp. member | — | — | — | — | — | — | 21.0 | 65.0 |
| | | | | | | | | 21.0 | 65.0 |
| 6-2 | Present invention | SUS316L | 1.0 | 73.0 | 34.8 | 2 | Top and bottom surface | 10.0 | 65.0 |
| | | Nichrome | 0.8 | 65.0 | 34.8 | 4 | — | | |
| | Comp. member | — | — | — | — | — | — | 18.5 | 65.0 |
| 6-3 | Present invention | Copper alloy | 1.5 | 87.0 | 34.8 | 2 | Top and bottom surface | 4.0 | 65.0 |
| | | Oxygen-free copper | 0.5 | 65.0 | 34.8 | 4 | — | | |
| | Comp. member | — | — | — | — | — | — | 8.4 | 65.0 |
| 6-4 | Present invention | SUS316L | 1.0 | 87.0 | 35.0 | 2 | Top and bottom surface | 4.7 | 65.0 |
| | | Oxygen-free copper | 0.5 | 65.0 | 35.0 | 5 | — | | |
| | Comp. member | — | — | — | — | — | — | 16.5 | 65.0 |
| 6-5 | Present invention | Oxygen-free copper clad material of Nichrome | About 1.6 mm, each 0.5 mm | 65.0 | 34.6 | 6 | Top and bottom surface | 6.0 | 65.0 |
| | Comp. member | — | — | — | — | — | — | 20.0 | 65.0 |
| 6-6 | Present invention | Nichrome | 1.0 | 65.0 | 34.6 | 2 | Top and bottom surface | 7.6 | 65.0 |
| | | silver | 0.5 | 65.0 | 34.6 | 5 | — | | |
| | Comp. member | — | — | — | — | — | — | 17.0 | 65.0 |
| 6-7 | Present invention | Nichrome | 1.0 | 87.0 | 34.6 | 2 | Top and bottom surface | 5.5 | 65.0 |
| | | Aluminum clad material of Nichrome | About 1.6 mm, each 0.5 mm | 65.0 | 34.6 | 4 | — | | |
| | Comp. member | — | — | — | — | — | — | 11.3 | 65.0 |

| | | Manufacturing conditions | | | | | | | |
|---|---|---|---|---|---|---|---|---|---|
| | | Ring-shaped oxide superconducting bulk member | | | Outer circumference reinforcing ring | | | | |
| Test no. | | Inside diameter (mm) | No. | Presence of top and bottom surfaces | Material | Height (mm) | Outside diameter (mm) | Inside diameter (mm) | Other conditions |
| 6-1 | Present invention | 32.0 | 1 | — | SUS316L | 42.2 | 73.0 | 65.05 | Two stacked inverted in direction and joined by resin |
| | | 32.0 | 1 | — | | | | | |
| | | 36.0 | 2 | Bottom surface | | | | | |

TABLE 5-1-continued

| | | | | | | | | | |
|---|---|---|---|---|---|---|---|---|---|
| | Comp. member | 32.0 | 1 | Top surface | SUS316L | 42.2 | 73.0 | 65.05 | Two stacked inverted in direction and joined by resin |
| | | 36.0 | 1 | Bottom surface | | | | | |
| 6-2 | Present invention | 35.0 | 5 | None | SUS316L | 53.6 | 73.0 | 65.05 | — — |
| | Comp. member | 35.0 | 3 | Top and bottom surface | SUS316L | 53.6 | 73.0 | 65.05 | — |
| 6-3 | Present invention | 35.0 | 5 | None | Oxygen-free copper | 25.5 | 87.0 | 65.05 | — — |
| | Comp. member | 35.0 | 3 | Top and bottom surface | SUS316L | 25.5 | 87.0 | 65.05 | — |
| 6-4 | Present invention | 35.0 | 6 | None | Aluminum alloy A5056 | 31.0 | 87.0 | 65.05 | — — |
| | Comp. member | 35.0 | 2 | Top and bottom surface | SUS316L | 33.0 | 87.0 | 65.05 | — |
| 6-5 | Present invention | 35.0 | 5 | None | Oxygen-free copper | 40.0 | 87.0 | 65.05 | — |
| | Comp. member | 35.0 | 2 | Top and bottom surface | SUS316L | 40.0 | 87.0 | 65.05 | — |
| 6-6 | Present invention | 35.0 | 6 | None | Inside: Cu Outside: SUS316L composite member | 49.0 | 87.0 | 65.05 | Thickness: each 5.6 mm |
| | Comp. member | 35.0 | 3 | Top and bottom surface | SUS316L | 51.0 | 87.0 | 65.05 | — |
| 6-7 | Present invention | 35.0 | 5 | None | Inside: Cu alloy Outside: SUS304L composite member | 34.0 | 87.0 | 65.05 | Thickness: each 5.6 mm |
| | Comp. member | 35.0 | 3 | Top and bottom surface | SUS304L | 34.0 | 87.0 | 65.05 | — |

TABLE 5-2

| | | Magnetization tests | | | | |
|---|---|---|---|---|---|---|
| | | Magnetization conditions | | | Magnetization results | |
| Test no. | | Applied magnetic field (T) | Magnetization temperature (K) | Demagnetization rate (T/min) | Presence of cracking | Trapped magnetic flux density (T) |
| 6-1 | Present invention | 8.0 | 40.0 | 0.10 | None | 7.85 |
| | Comp. member | 8.0 | 40.0 | 0.10 | Yes | — |
| 6-2 | Present invention | 8.0 | 30.0 | 0.10 | None | 7.86 |
| | Comp. member | 8.0 | 30.0 | 0.10 | Yes | — |
| 6-3 | Present invention | 8.0 | 30.0 | 0.15 | None | 7.78 |
| | Comp. member | 8.0 | 30.0 | 0.15 | Yes | — |
| 6-4 | Present invention | 8.5 | 20.0 | 0.20 | None | 8.42 |
| | Comp. member | 8.5 | 20.0 | 0.20 | Yes | — |
| 6-5 | Present invention | 8.5 | 40.0 | 0.20 | None | 8.31 |

TABLE 5-2-continued

| Test no. | | Magnetization tests: Magnetization conditions: Applied magnetic field (T) | Magnetization temperature (K) | Demagnetization rate (T/min) | Magnetization results: Presence of cracking | Trapped magnetic flux density (T) |
|---|---|---|---|---|---|---|
| | Comp. member | 8.5 | 40.0 | 0.20 | Yes | — |
| 6-6 | Present invention | 8.5 | 30.0 | 0.15 | None | 8.37 |
| | Comp. member | 8.5 | 30.0 | 0.15 | Yes | — |
| 6-7 | Present invention | 8.0 | 30.0 | 0.15 | None | 7.79 |
| | Comp. member | 8.0 | 30.0 | 0.15 | Yes | — |

These ring-shaped oxide superconducting bulk members, high strength reinforcing members, and outer circumference reinforcing rings were joined to prepare the oxide superconducting bulk magnets used in the tests. For assembly of the oxide superconducting bulk magnets of the present inventions and comparative example, solder or, as described in Table 5, a resin was used. When using solder for assembly, in the same way as the above-mentioned Example 6, the superconducting bulk members and high strength reinforcing members were alternately inserted into outer circumference reinforcing rings 1830 heated on a hot plate to a temperature at which the solder melts, the solder was made to evenly coat them, and the overall assemblies were cooled to room temperature to thereby join the members and prepare the superconducting bulk magnets 1800.

Note that, as the materials of the high strength reinforcing members, in Table 5, Test No. 2-5, "oxygen-free copper clad material of Nichrome" means a material of a thickness 0.5 mm Nichrome sheet on both surfaces of which thickness 0.5 mm oxygen-free copper sheets are laminated by soldering by Sn—Zn-based solder. Further, in Table 5, Test No. 2-7, "aluminum clad material of Nichrome" means a material of a thickness 0.5 mm Nichrome sheet on both surfaces of which thickness 0.5 mm aluminum sheets are laminated by soldering by Sn—Zn-based solder.

Further, as the materials of the outer circumference reinforcing rings, in Table 5, Test No. 2-6, the "inner circumference: oxygen-free copper, outer circumference: SUS316L composite member" means a composite member comprised of an outside diameter 87.6 mm, inside diameter 76.05 mm, height 53.6 mm SUS316L ring in which an outside diameter 76.0 mm, inside diameter 65.05 mm, height 53.6 mm oxygen-free copper ring is bonded by an Sn—Zn-based solder. In Table 5, Test No. 2-7, the "inner circumference: copper alloy, outer circumference: SUS304L composite member" means a composite member comprised of an outside diameter 87.6 mm, inside diameter 76.05 mm, height 53.6 mm SUS304L ring in which an outside diameter 76.0 mm, inside diameter 65.05 mm, height 53.6 mm copper alloy ring is bonded by an Sn—Zn-based solder.

The magnetization tests for evaluation of performance were conducted under the magnetization conditions shown in Table 5. The results of the magnetization tests, as shown in Table 5, were that superconducting bulk magnets with high strength reinforcing members alternately stacked and with high strength reinforcing members bonded at the top surfaces and bottom surfaces like in the present invention did not crack, while comparative members without high strength reinforcing members alternately stacked cracked. From this, it became clear that the reinforcement by the high strength reinforcing members functioned effectively and a strong magnetic field could be generated.

Example 7

In the superconducting bulk magnet 1900 of Example 7, Gd—Ba—Cu—O-based oxide superconducting bulk members were used. First, powders of oxides of commercially available purity 99.9 mass % gadolinium (Gd), barium (Ba), and copper (Cu) were weighed to give a molar ratio of Gd:Ba:Cu=9:12:17. To this, $BaCeO_3$ was added in 1.0 mass % and silver was added in 10 mass %. The weighed powders were fully kneaded over 1 hour, then were calcined in the atmosphere at 1173K for 8 hours.

Next, a mold was used to shape the calcined powder to a disk shape. This shaped part was heated to 1423K to a molten state, was held there for 30 minutes, then in the middle of being lowered in temperature, was seeded, and was gradually cooled over a temperature region of 1278K to 1245K over 200 hours to grow the crystal and obtain a disk-shaped diameter 70 mm single-crystal form oxide superconducting bulk member with a c-axis of the crystallographic orientation of the superconducting phases parallel to the normal of the substantially disk-shaped plane. From the thus obtained single-crystal form oxide superconducting bulk member, two outside diameter 65.0 mm, inside diameter 35.0 mm, height 6.0 mm rings and two height 7.5 mm rings were prepared. Furthermore, sputtering was used to coat the surfaces of the oxide superconducting bulk members with silver to about 2 μm. These were heat treated in an oxygen stream at 723K for 100 hours. Similar processing was performed to prepare four ring-shaped oxide superconducting bulk members 1910 (1911 to 1914).

Further, two thickness 1.5 mm and thickness 0.5 mm Nichrome sheets were formed. From these sheets, outside diameter 65.0 mm, inside diameter 31.0 mm ring-shaped high strength reinforcing members 1920 (1921 to 1924) were prepared. The surfaces of the Nichrome were lightly coated with solder in advance. For the outer circumference reinforcing ring 1930, an aluminum alloy outside diameter 77.0 mm, inside diameter 65.05 mm, height 30.2 mm ring was used. Its inner circumferential surface was also lightly coated with solder. Furthermore, Fe-36Ni alloy inner circumference reinforcing rings (two outside diameter 34.95 mm, inside diameter 31.0 mm, height 6.0 mm rings and one outside diameter 34.95 mm, inside diameter 31.0 mm, height 15.0 mm ring) 1940 (1941 to 1943) were prepared. Their outer circumferential surfaces were also lightly coated with solder.

Figure 19A:
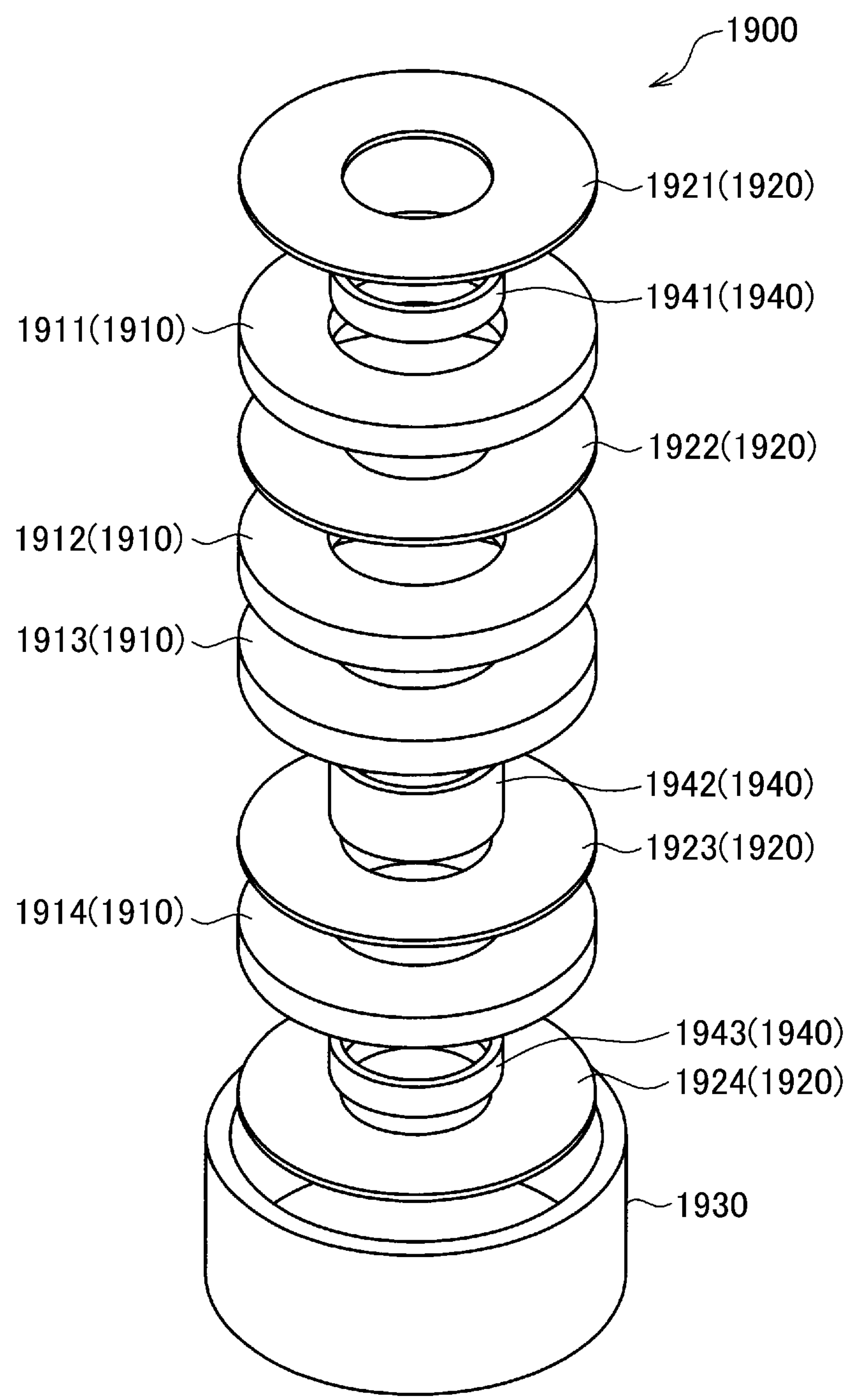
FIG. 19A is a schematic disassembled perspective view of a donut-shaped oxide superconducting bulk laminate according to Example 3.
Figure 19B:
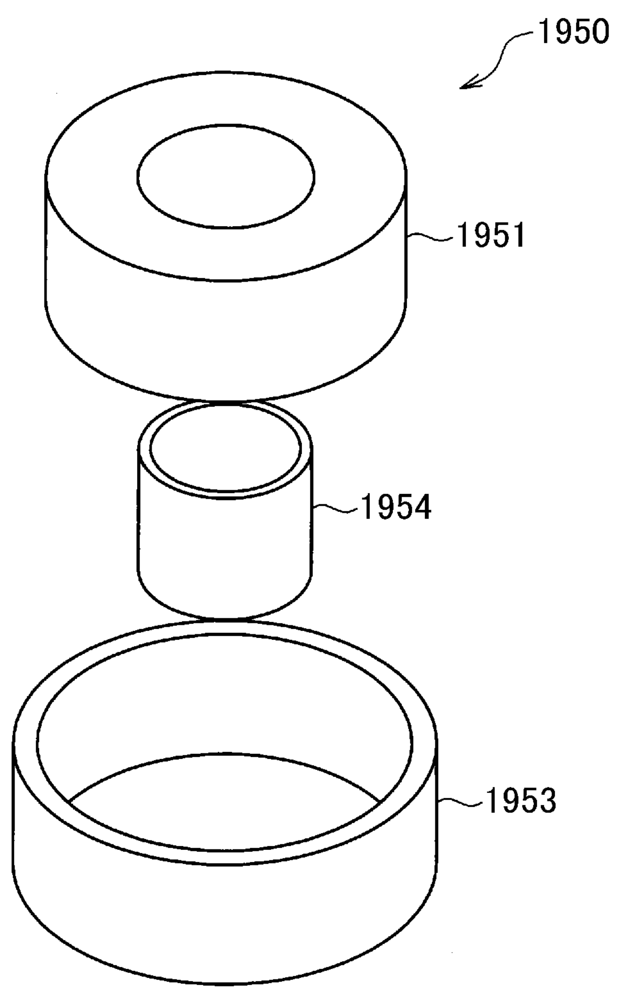
FIG. 19B is a schematic disassembled perspective view of a comparative member for Example 3.
Figure 19C:
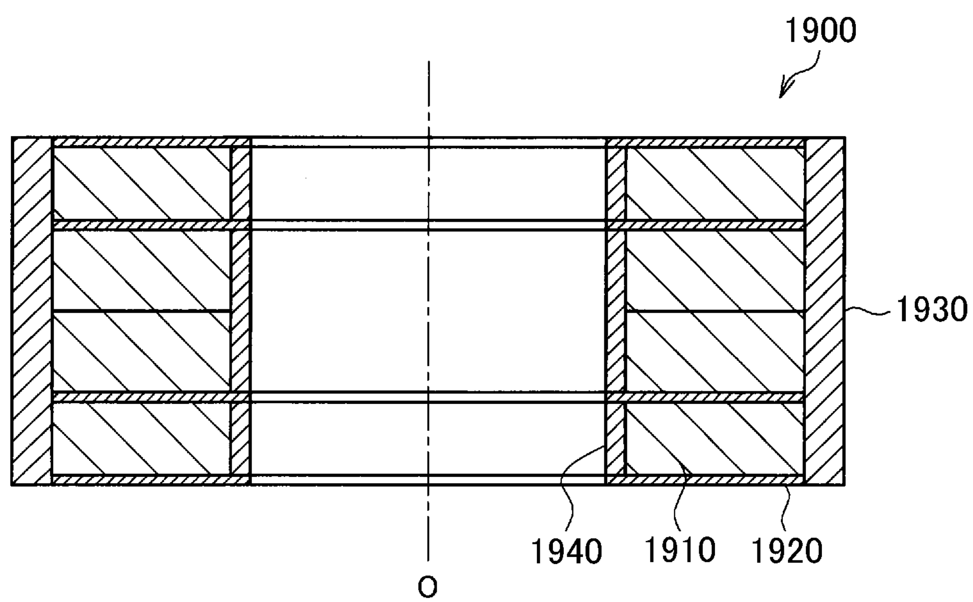
FIG. 19C is a cross-sectional view when cutting along the center axial line the oxide superconducting bulk laminate of FIG. 19A.

Next, the high strength reinforcing members comprised of the Nichrome rings, the ring-shaped superconducting bulk members, and the inner circumference reinforcing rings were successively inserted into the outer circumference reinforcing ring 1930 heated to a temperature at which the solder melts, the solder was made to evenly coat them, then the overall assembly was cooled to room temperature to thereby join the members. At this time the superconducting bulk members were stacked while offsetting their a-axes in the crystallographic orientations of the superconducting phases by about 7°. FIG. 19A shows the stacked state of the obtained donut-shaped oxide superconducting bulk laminate. Further, FIG. 19C shows a cross-sectional view of FIG. 19A.

The obtained superconducting bulk magnet 1000 was placed at room temperature in a 9.5 T magnetic field, then was cooled to 45K using a refrigerating machine, then the external magnetic field was demagnetized by 0.1 T/min in speed until a zero magnetic field. As a result, an 8.9 T trapped magnetic flux density was confirmed at the axial center part of the superconducting bulk magnet. It could be confirmed that by this magnetization, magnetization was possible without a superconducting bulk member 1910 cracking.

Figure 19D:
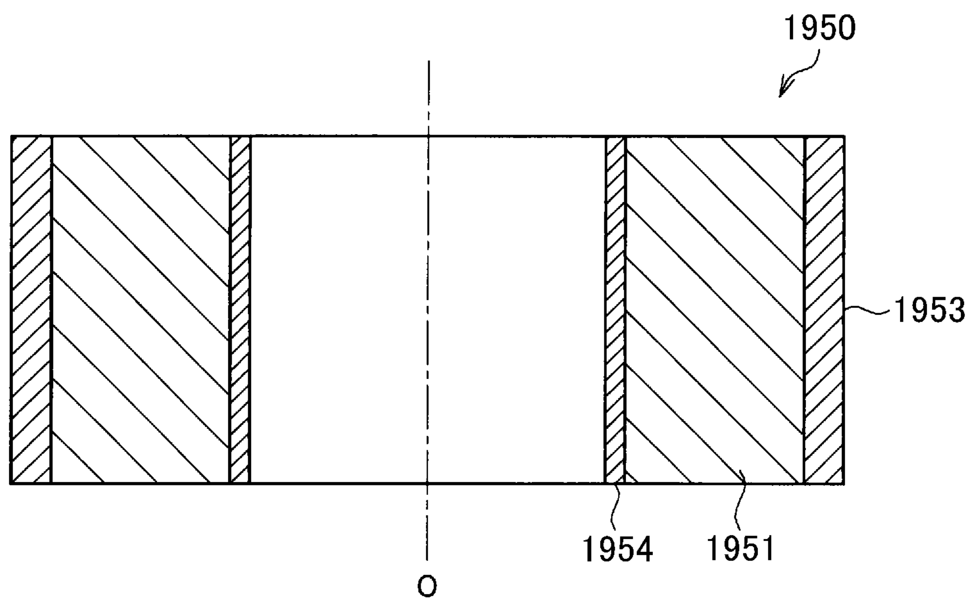
FIG. 19D is a cross-sectional view when cutting along the center axial line the oxide superconducting bulk laminate of FIG. 19B.

Next, as a comparative member, from a single-crystal form oxide superconducting bulk member prepared in the same way as explained above, one outside diameter 65.0 mm, inside diameter 35.0 mm, height 30.2 mm ring was prepared in the same way as explained above. These were placed in an aluminum alloy outside diameter 77.0 mm, inside diameter 65.05 mm, height 30.2 mm outer circumference reinforcing ring 1953 prepared in the same way as explained above. Furthermore, an Fe-36Ni alloy outside diameter 34.95 mm, inside diameter 31.0 mm, height 30.2 mm inner circumference reinforcing ring 1954 was placed inside the superconducting bulk member 1951 and joined by solder in the same way as explained above to prepare a comparative member donut-shaped oxide superconducting bulk laminate. This stacked state is shown in FIG. 19B. Further, FIG. 19D shows a cross-sectional view of FIG. 19B.

In the same way as explained above, this was placed at room temperature in a 9.5 T magnetic field, then was cooled to 45K using a refrigerating machine, then the external magnetic field was demagnetized by 0.1 T/min in speed until a zero magnetic field. In this magnetization process, at the stage of demagnetization down to 5.8 T, a rapid drop in the magnetic flux density was confirmed at the axial center part of the superconducting bulk magnet. The trapped magnetic flux density at the axial center part when demagnetized to a zero magnetic field was 1.89 T. After the magnetization tests, the superconducting bulk member 1951 was examined at room temperature, whereupon cracks were confirmed in the superconducting bulk member 1951.

From these tests, a donut-shaped oxide superconducting bulk laminate is formed where high strength reinforcing members are arranged between ring-shaped oxide superconducting bulk members, inner circumference reinforcing rings are arranged and joined or bonded with the top and bottom oxide superconducting bulk members, the inside diameters of the strength reinforcing members are the same or smaller than the inside diameters of the oxide superconducting bulk members, and their inner circumference axes match. It became clear that by arranging inner circumference reinforcing rings joined or bonded with the inner circumferential surfaces of the donut-shaped oxide superconducting bulk laminate, an oxide superconducting bulk magnet having a high trapped magnetic flux density is obtained without a superconducting bulk member cracking.

Table 6 (Table 6-1 and Table 6-2 will be referred to all together as "Table 6") shows the results of the magnetization tests for the above-mentioned Example 7. At the time of the magnetization tests, ring-shaped oxide superconducting bulk members, high strength reinforcing members, and outer circumference reinforcing rings used as the present inventions and comparative example of the tests described in Table 6 were prepared. For the ring-shaped oxide superconducting bulk members, diameter 70 mm single-crystal form oxide superconducting bulk members prepared in the same way as above-mentioned Example 7 were used and worked into the various different thickness, outside diameter 65.0 mm, inside diameter 35.0 mm ring shapes described in Table 6 to prepare ring-shaped oxide superconducting bulk members. Further, for the high strength reinforcing members as well, sheets of the materials and thicknesses described in Table 6 were worked to outside diameter 65.0 mm, inside diameter 31.0 mm rings. Furthermore, for the outer circumference reinforcing rings as well, sheets were worked to the rings of the materials and sizes described in Table 6.

TABLE 6-1

| | | Manufacturing conditions | | | | | | | | | | |
|---|---|---|---|---|---|---|---|---|---|---|---|---|
| | | High strength member | | | | | | Ring-shaped oxide superconducting bulk member | | | | |
| Test no. | | Material | Thickness (mm) | Outside diameter (mm) | Inside diameter (mm) | No. | Presence of top and bottom surfaces | Thickness (mm) | Outside diameter (mm) | Inside diameter (mm) | No. | Presence of top and bottom surfaces |
| 7-1 | Present invention | Nichrome | 1.5 | 65.0 | 31.0 | 2 | Top and bottom surface | 6.0 | 65.0 | 35.0 | 2 | None |
| | | | 0.5 | 65.0 | 31.0 | 2 | — | 7.5 | 65.0 | 35.0 | 2 | — |
| | Comp. member | — | — | — | — | — | — | 30.2 | 65.0 | 35.0 | 1 | Top and bottom surface |
| 7-2 | Present invention | SUS316L | 1.0 | 73.0 | 31.0 | 2 | Top and bottom surface | 10.0 | 65.0 | 35.0 | 5 | None |
| | | Nichrome | 0.5 | 65.0 | 31.0 | 4 | — | | | | | |

TABLE 6-1-continued

| | | | | | | | | | | | | |
|---|---|---|---|---|---|---|---|---|---|---|---|---|
| | Comp. member | — | — | — | — | — | — | 18.0 | 65.0 | 35.0 | 3 | Top and bottom surface |
| 7-3 | Present invention | Copper alloy | 1.5 | 87.0 | 31.0 | 2 | Top and bottom surface | 4.5 | 65.0 | 35.0 | 5 | None |
| | | Oxygen-free copper | 0.4 | 65.0 | 31.0 | 4 | — | | | | | |
| | Comp. member | — | — | — | — | — | — | 26.5 | 65.0 | 35.0 | 1 | Top and bottom surface |
| 7-4 | Present invention | SUS316L | 1.0 | 87.0 | 31.0 | 2 | Top and bottom surface | 4.7 | 65.0 | 35.0 | 6 | None |
| | | Aluminum alloy | 0.5 | 65.0 | 31.0 | 5 | — | | | | | |
| | Comp. member | — | — | — | — | — | — | 16.5 | 65.0 | 35.0 | 2 | Top and bottom surface |

| | | Manufacturing conditions | | | | | | | | | |
|---|---|---|---|---|---|---|---|---|---|---|---|
| | | Outer circumference reinforcing ring | | | | Inner circumference reinforcing ring | | | | | |
| Test no. | | Material | Height (mm) | Outside diameter (mm) | Inside diameter (mm) | Material | Height (mm) | Outside diameter (mm) | Inside diameter (mm) | No. | Other |
| 7-1 | Present invention | Aluminum alloy | 30.2 | 73.0 | 65.05 | Fe—36Ni | 6.0 | 34.95 | 31.0 | 2 | — |
| | | | | | | | 15.0 | 34.95 | 31.0 | 1 | — |
| | Comp. member | Aluminum alloy | 30.2 | 73.0 | 65.05 | Fe—36Ni | 30.2 | 34.95 | 31.0 | 1 | — |
| 7-2 | Present invention | SUS316L | 52.0 | 73.0 | 65.05 | Cu alloy | 10.0 | 34.95 | 31.0 | 5 | — |
| | Comp. member | SUS316L | 54.0 | 73.0 | 65.05 | SUS316L | 54.0 | 34.95 | 31.0 | 1 | — |
| 7-3 | Present invention | Oxygen-free copper | 24.5 | 87.0 | 65.05 | Oxygen-free copper | 4.5 | 34.95 | 31.0 | 5 | — |
| | Comp. member | SUS316L | 26.5 | 87.0 | 65.05 | SUS316L | 26.5 | 34.95 | 31.0 | 1 | — |
| 7-4 | Present invention | Aluminum alloy A5056 | 31.0 | 87.0 | 65.05 | SUS304L | 4.7 | 34.95 | 31.0 | 6 | — |
| | Comp. member | SUS316L | 33.0 | 87.0 | 65.05 | SUS304L | 33.0 | 34.95 | 31.0 | 1 | — |

TABLE 6-2

| | | Magnetization tests | | | | |
|---|---|---|---|---|---|---|
| | | Magnetization conditions | | | Magnetization results | |
| Test no. | | Applied magnetic field (T) | Magnetization temperature (K) | Demagnetization rate (T/min) | Presence of cracking | Trapped magnetic flux density (T) |
| 7-1 | Present invention | 9.5 | 45.0 | 0.10 | None | 8.9 |
| | Comp. member | 9.5 | 45.0 | 0.10 | Yes | — |
| 7-2 | Present invention | 9.0 | 30.0 | 0.10 | None | 8.85 |
| | Comp. member | 9.0 | 30.0 | 0.10 | Yes | — |
| 7-3 | Present invention | 9.5 | 30.0 | 0.15 | None | 9.12 |
| | Comp. member | 9.5 | 30.0 | 0.15 | Yes | — |
| 7-4 | Present invention | 9.5 | 20.0 | 0.20 | None | 9.32 |
| | Comp. member | 9.5 | 20.0 | 0.20 | Yes | — |

These ring-shaped oxide superconducting bulk members, high strength reinforcing members, and outer circumference reinforcing rings were joined to prepare the oxide superconducting bulk magnets used in the various tests. For assembly of the bulk magnets of the present invention and comparative example of the examples, solder was used. When using solder for assembly, in the same way as the above-mentioned examples, the superconducting bulk members and high strength reinforcing members were alternately inserted into outer circumference reinforcing rings 1930 heated on a hot plate to a temperature at which the solder melts, the solder was made to evenly coat them, and the overall assemblies were cooled to room temperature to thereby join the members and prepare superconducting bulk magnets 1900.

The magnetization tests for evaluation of performance were conducted under the magnetization conditions shown in Table 6. The results of the magnetization tests, as shown in Table 6, were that in bulk magnets having inner circumference reinforcing rings, superconducting bulk magnets with high strength reinforcing members alternately stacked and joined did not crack, while comparative members without high strength reinforcing members alternately stacked cracked. From this, it became clear that the reinforcement by the high strength reinforcing members functioned effectively and a strong magnetic field could be generated.

Example 8

In the superconducting bulk magnet 2000 of this example, Gd(Dy)—Ba—Cu—O-based oxide superconducting bulk members were used. First, powders of oxides of commercially available purity 99.9 mass % gadolinium (Gd), barium (Ba), and copper (Cu) were weighed to give a molar ratio of Gd:Dy:Ba:Cu=8:1:12:17. To this, $CeO_2$ was added in 1.0 mass % and silver was added in 12 mass %. The weighed powders were fully kneaded over 1 hour, then were calcined in the atmosphere at 1173K for 8 hours.

Next, a mold was used to shape the calcined powder to a disk shape. This shaped part was heated to 1423K to a molten state, was held there for 30 minutes, then in the middle of being lowered in temperature, was seeded, and was gradually cooled over a temperature region of 1278K to 1245K over 200 hours to grow the crystal and obtain a diameter 70 mm single-crystal form oxide superconducting bulk member. This single-crystal form oxide superconducting bulk member was worked into an outside diameter 65.0 mm, inside diameter 35.0 mm, height 10.0 mm ring shape. Furthermore, sputtering was used to coat the surfaces of the superconducting bulk members with silver to about 2 μm. These were heat treated in an oxygen stream at 723K for 100 hours. Similar processing was performed to prepare four ring-shaped oxide superconducting bulk members 2010 (2011 to 2014).

Further, two thickness 1.5 mm Nichrome sheets and three thickness 1.0 mm Nichrome sheets were worked to prepare outside diameter 65.0 mm, inside diameter 31.0 mm ring-shaped high strength reinforcing members 2020 (2021 to 2025). The surfaces of the Nichrome were lightly coated with solder in advance. For the outer circumference reinforcing ring 2030, an aluminum alloy outside diameter 77.0 mm, inside diameter 65.05 mm, height 46.5 mm ring was used. Its inner circumferential surface was also lightly coated with solder. Furthermore, Fe-36Ni alloy outside diameter 34.95 mm, inside diameter 31.0 mm, height 10.0 mm inner circumference reinforcing rings 2040 (2041 to 2044) were prepared. Their outer circumferential surfaces were also lightly coated with solder.

Figure 20A:
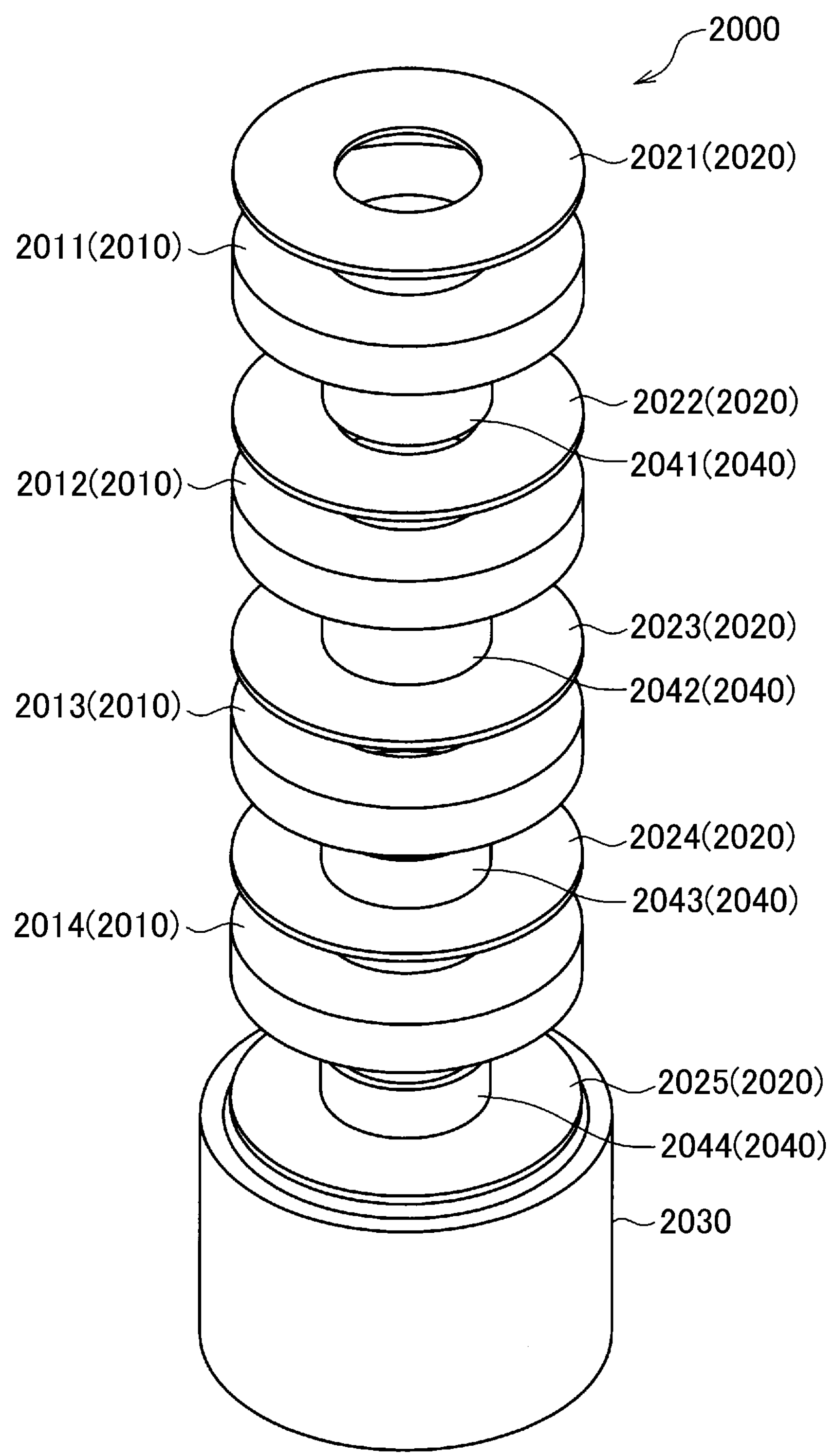
FIG. 20A is a schematic disassembled perspective view of a donut-shaped oxide superconducting bulk laminate according to Example 3.
Figure 20B:
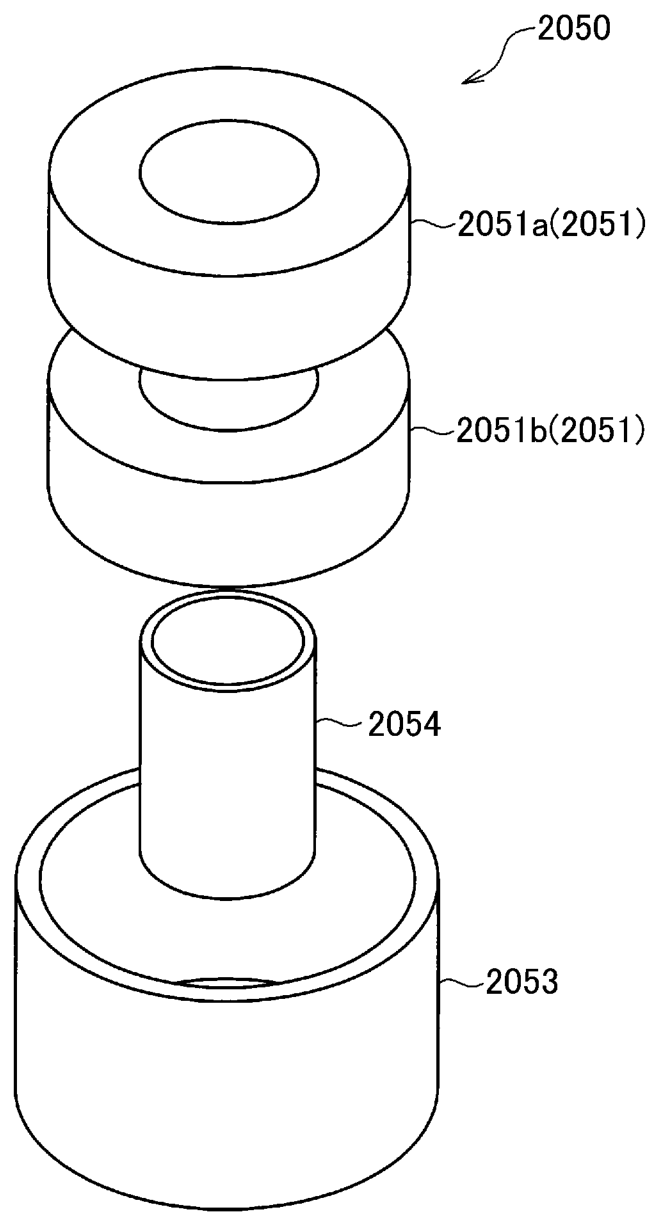
FIG. 20B is a schematic disassembled perspective view of a comparative member for Example 3.
Figure 20C:
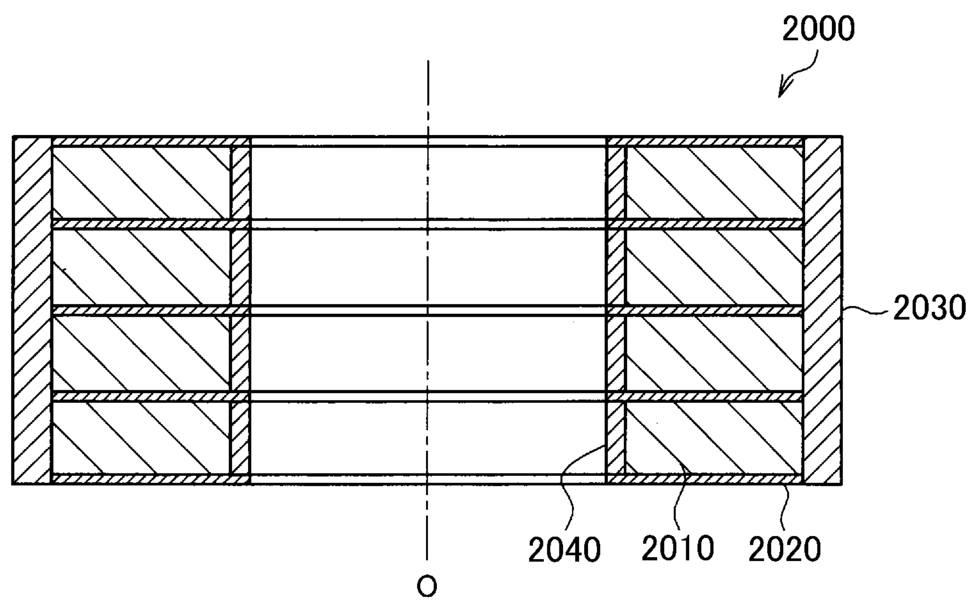
FIG. 20C is a cross-sectional view when cutting along the center axial line the oxide superconducting bulk laminate of FIG. 20A.

Next, the high strength reinforcing members comprised of the Nichrome rings, ring-shaped superconducting bulk members, and inner circumference reinforcing rings were successively inserted into the outer circumference reinforcing ring 2030 heated to a temperature at which the solder melts, the solder was made to evenly coat them, then the overall assembly was cooled to room temperature to thereby join the members. At this time, 1.5 mm thick Nichrome rings were arranged at the topmost surface and the bottommost surface of the oxide superconducting bulk members. At this time, the superconducting bulk members 2041 to 2044 were stacked while offsetting their a-axes in the crystallographic orientation of the superconducting phases by about 9°. FIG. 20A shows the stacked state of the obtained donut-shaped oxide superconducting bulk laminate. Further, FIG. 20C shows a cross-sectional view of FIG. 20A.

The obtained superconducting bulk magnet 2000 was placed at room temperature in a 9 T magnetic field, then was cooled to 40K using a refrigerating machine, then the external magnetic field was demagnetized by 0.1 T/min in speed until a zero magnetic field. As a result, an 8.85 T trapped magnetic flux density was confirmed on the axial center part of the superconducting bulk magnet. It could be confirmed that by this magnetization, magnetization was possible without a superconducting bulk member 2010 cracking.

Figure 20D:
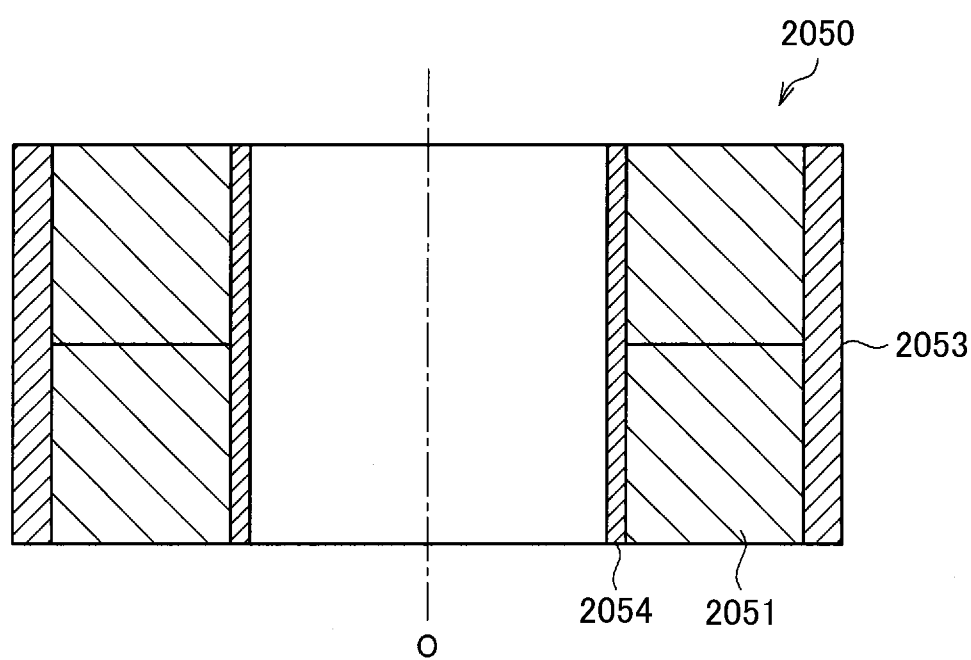
FIG. 20D is a cross-sectional view when cutting along the center axial line the oxide superconducting bulk laminate of FIG. 20B.

Next, as a comparative member, from a single-crystal form oxide superconducting bulk member prepared in the same way as explained above, two outside diameter 65.0 mm, inside diameter 35.0 mm, height 23.1 mm rings were prepared in the same way as explained above (notations 2051 (2051*a*, 2051*b*)). These were placed in an aluminum alloy outside diameter 77.0 mm, inside diameter 65.05 mm, height 46-5 mm outer circumference reinforcing ring 2053 prepared in the same way as explained above. Furthermore, these were joined with an Fe-36Ni alloy outside diameter 34.95 mm, inside diameter 31.0 mm, height 46.5 mm inner circumference reinforcing ring 2054 in the same way as explained above using solder to thereby prepare a comparative member donut-shaped oxide superconducting bulk laminate. This stacked state is shown in FIG. 20B. Further, FIG. 20D shows a cross-sectional view of FIG. 20B.

This was, in the same way as explained above, placed at room temperature in a 9 T magnetic field, then was cooled to 40K using a refrigerating machine, then the external magnetic field was demagnetized by 0.1 T/min in speed until a zero magnetic field. In this magnetization process, at the stage of demagnetization down to 5.8 T, a rapid drop in the magnetic flux density was confirmed at the axial center part of the superconducting bulk magnet. The trapped magnetic flux density at the axial center part when demagnetized to a zero magnetic field was 1.89 T. After the magnetization tests the superconducting bulk member 2051 was examined at room temperature, whereupon cracks were confirmed in the superconducting bulk member 2051.

From these tests, a donut-shaped oxide superconducting bulk laminate is formed where high strength reinforcing members are arranged between ring-shaped oxide superconducting bulk members, inner circumference reinforcing rings are arranged and joined or bonded with the top and bottom oxide superconducting bulk members, the inside diameters of the strength reinforcing members are smaller than the inside diameters of the oxide superconducting bulk members, and their inner circumference axes match. It became clear that by metal rings being arranged joined or bonded with the inner circumference of the donut-shaped oxide superconducting bulk laminate, an oxide superconducting bulk magnet having a high trapped magnetic flux density is obtained without a superconducting bulk member cracking.

Example 9

In the superconducting bulk magnet 2100 of this example, Eu—Ba—Cu—O-based oxide superconducting bulk members were used. First, powders of oxides of commercially available purity 99.9 mass % europium (Eu), barium (Ba), and copper (Cu) were weighed to give a molar ratio of Eu:Ba:Cu=9:12:17. To this, $BaCeO_3$ was added in 1.0 mass % and silver was added in 16 mass %. The weighed powders were fully kneaded over 1 hour, then were calcined in the atmosphere at 1173K for 8 hours.

Next, a mold was used to shape the calcined powder to a disk shape. This shaped part was heated to 1423K to a molten state, was held there for 30 minutes, then in the middle of being lowered in temperature, was seeded, and was gradually cooled over a temperature region of 1288K to 1258K over 200 hours to grow the crystal and obtain a diameter 70 mm single-crystal form oxide superconducting bulk member. This single-crystal form oxide superconducting bulk member was worked to an outside diameter 65.0 mm, inside diameter 35.0 mm, height 1.8 mm two-layer ring shape. The groove of the two-layer ring-shape superconducting bulk member 2110 was formed by sandblasting at a position 23.5 mm from the center to a width of about 1.0 mm. At this time, connecting parts connecting the inside ring 2111 and outside ring 2112 of the oxide superconducting bulk member 2110 (corresponding to connecting part 1615 of FIG. 16D) were provided at two locations. Furthermore, sputtering was used to coat the surfaces of the superconducting bulk members with silver to about 2 μm. This was heat treated in an oxygen stream at 723K for 100 hours. Similar processing was performed to prepare 20 ring-shaped oxide superconducting bulk members 2110.

Further, two thickness 1.0 mm Nichrome sheets and 19 thickness 0.3 mm Nichrome sheets were worked to prepare outside diameter 65.0 mm, inside diameter 31.0 mm ring-shaped high strength reinforcing members 2120. The surfaces of the Nichrome were lightly coated with solder in advance. For the outer circumference reinforcing ring 2130, an aluminum alloy outside diameter 77.0 mm, inside diameter 65.05 mm, height 44.0 mm ring was used. Its inner circumferential surface was also lightly coated with solder. Furthermore, a Nichrome outside diameter 34.95 mm, inside diameter 31.0 mm, height 1.8 mm inner circumference reinforcing ring 2140 was prepared. Its surface was also lightly coated with solder.

Figure 21A:
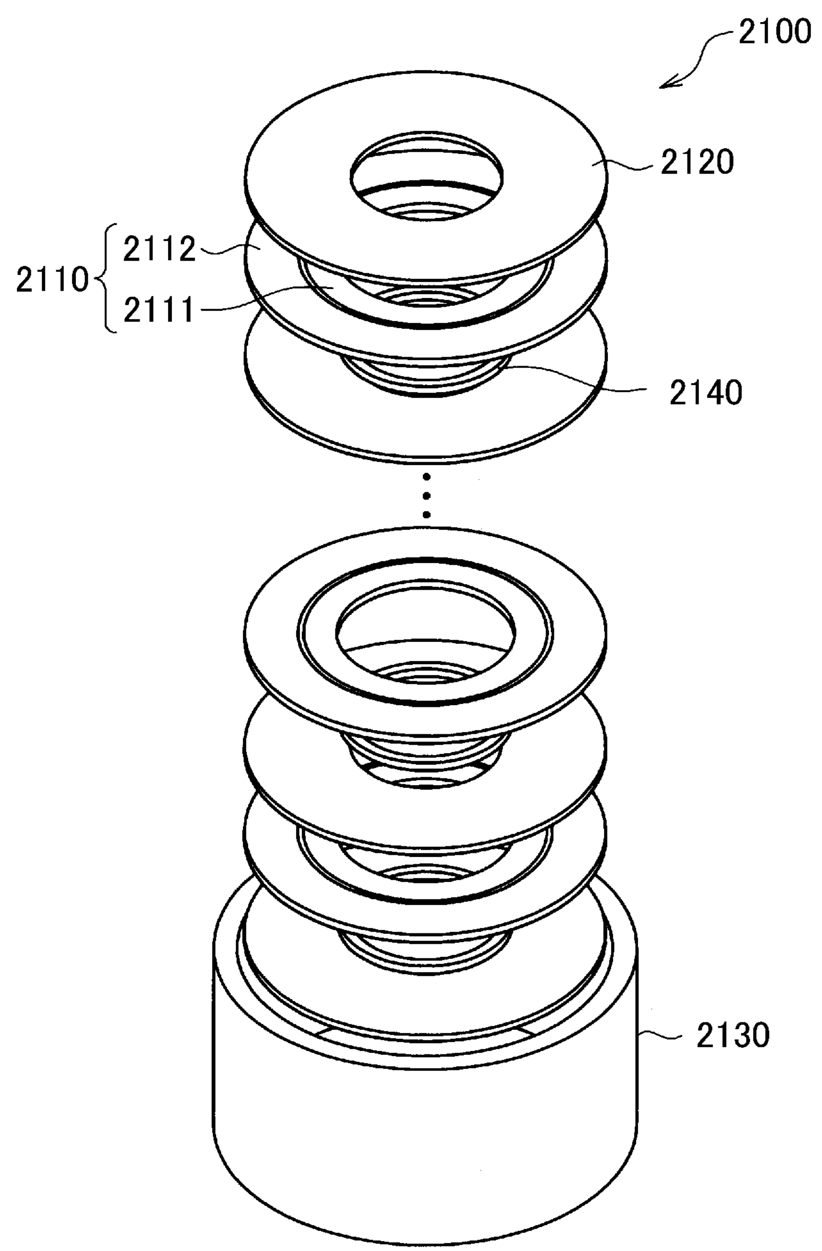
FIG. 21A is a schematic disassembled perspective view showing an oxide superconducting bulk laminate having a hole according to Example 5.

Next, the high strength reinforcing members comprised of the Nichrome rings, ring-shaped superconducting bulk members, and inner circumference reinforcing ring were successively inserted into the outer circumference reinforcing ring 2130 heated to a temperature at which the solder melts, the solder was made to evenly coat them, then the overall assembly was cooled to room temperature to thereby join the members. At this time, 1.0 mm thick Nichrome ring high strength reinforcing members were arranged at the topmost surface and the bottommost surface of the oxide superconducting bulk members. Further, at this time, the superconducting bulk members 2110 were stacked while offsetting their a-axes in the crystallographic orientations of the superconducting phases by about 4°. FIG. 21A shows the stacked state of the obtained donut-shaped oxide superconducting bulk laminate.

The obtained superconducting bulk magnet 2140 was placed at room temperature in a 7 T magnetic field, then was cooled to 40K using a refrigerating machine, then the external magnetic field was demagnetized by 0.1 T/min in speed until a zero magnetic field. As a result, a 6.85 T trapped magnetic flux density was confirmed on the axial center part of the superconducting bulk magnet. It could be confirmed that by this magnetization, magnetization was possible without a superconducting bulk member cracking.

Figure 21B:
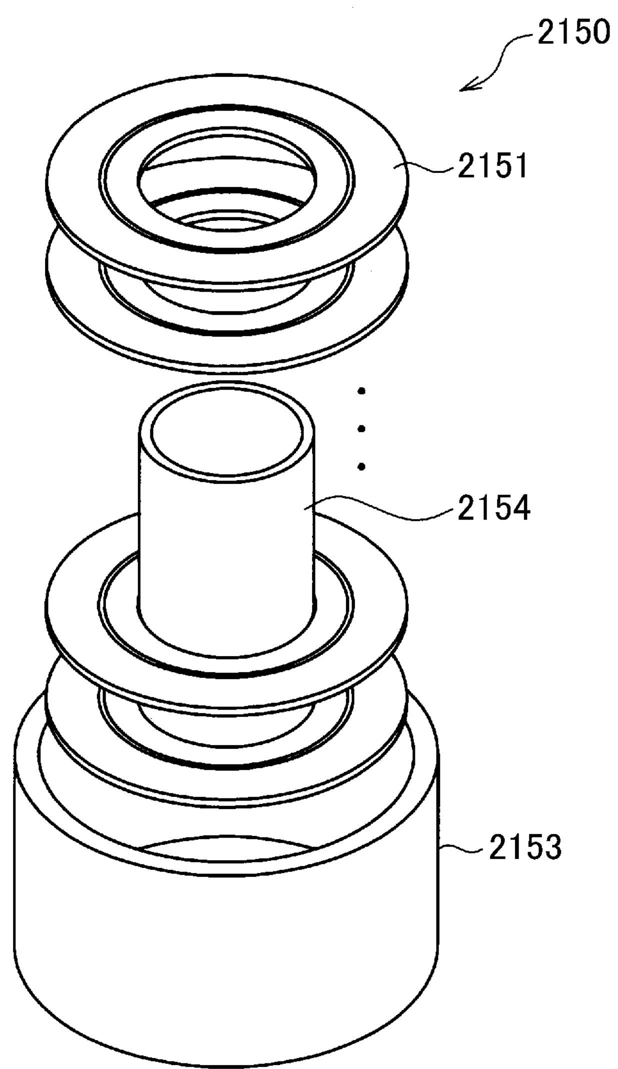
FIG. 21B is a schematic disassembled perspective view of a comparative member for Example 5.

Next, as a comparative member, from a single-crystal form oxide superconducting bulk member prepared in the same way as explained above, 22 outside diameter 65.0 mm, inside diameter 35.0 mm, height 1.8 mm two-layer ring-shape superconducting bulk members were similarly prepared (notations 2151). These were arranged in an aluminum alloy outside diameter 77.0 mm, inside diameter 65.05 mm, height 44.0 mm outer circumference reinforcing ring 2153 prepared in the same way as explained above. Furthermore, a GFRP (glass fiber reinforced plastic) outside diameter 34.95 mm, inside diameter 31.0 mm, height 44.0 mm inner circumference reinforcing ring 2154 was similarly arranged and joined by solder to prepare a comparative member donut-shaped oxide superconducting bulk laminate. This stacked state is shown in FIG. 21B.

This was, in the same way as explained above, placed at room temperature in a 7 T magnetic field, then was cooled to 40K using a refrigerating machine, then the external magnetic field was demagnetized by 0.1 T/min in speed until a zero magnetic field. In this magnetization process, at the stage of demagnetization down to 4.8 T, a rapid drop in the magnetic flux density was confirmed at the axial center part of the superconducting bulk magnet. The trapped magnetic flux density at the axial center part when demagnetized to a zero magnetic field was 1.35 T. After the magnetization tests the superconducting bulk member 2151 was examined at room temperature, whereupon cracks were confirmed in the superconducting bulk member 2151.

From these tests, it became clear that by placing high strength reinforcing members between ring-shaped oxide superconducting bulk members and further placing an inner circumference reinforcing ring and joining or bonding it with the top and bottom oxide superconducting bulk members, an oxide superconducting bulk magnet having a high trapped magnetic flux density is obtained without a superconducting bulk member cracking.

Example 10

Using the platinum-added Gd-based diameter 70 mm oxide superconducting members prepared in Example 5, eight outside diameter 62.0 mm, inside diameter 32.0 mm, height 3.0 mm rings were prepared. Furthermore, sputtering was used to coat the surfaces of the oxide superconducting bulk members with silver to about 2 μm. These were heat treated in an oxygen stream at 723K for 100 hours. Similar processing was performed to prepare eight ring-shaped oxide superconducting bulk members 2210 (2211 to 2218).

Further, two thickness 1.0 mm and seven thickness 0.3 mm SUS316 sheets were worked to prepare outside diameter 66.0 mm, inside diameter 29.0 mm ring-shaped high strength reinforcing members 2220 (2221 to 2227). Their surfaces were lightly coated in advance with solder. For the inside outer circumference reinforcing rings 22310 (22311 to 22318), eight SUS314 outside diameter 66.0 mm, inside diameter 62.05 mm, height 3.0 mm rings were used. Further, for the outside outer circumference reinforcing ring 22300, an SUS314 outside diameter 86.0 mm, inside diameter 66.05 mm, height 28.8 mm ring was used. Its inner circumferential surface was also lightly coated with solder. Furthermore, eight outside Nichrome inner circumference reinforcing rings (outside diameter 31.95 mm, inside diameter 29.0 mm, height 3.0 mm) were prepared. For the inside SUS314 inner circumference ring, one outside diameter 28.95 mm, inside diameter 27.0 mm, height 28.8 mm ring was prepared. Its outer circumferential surface was also lightly coated with solder.

Figure 22A:
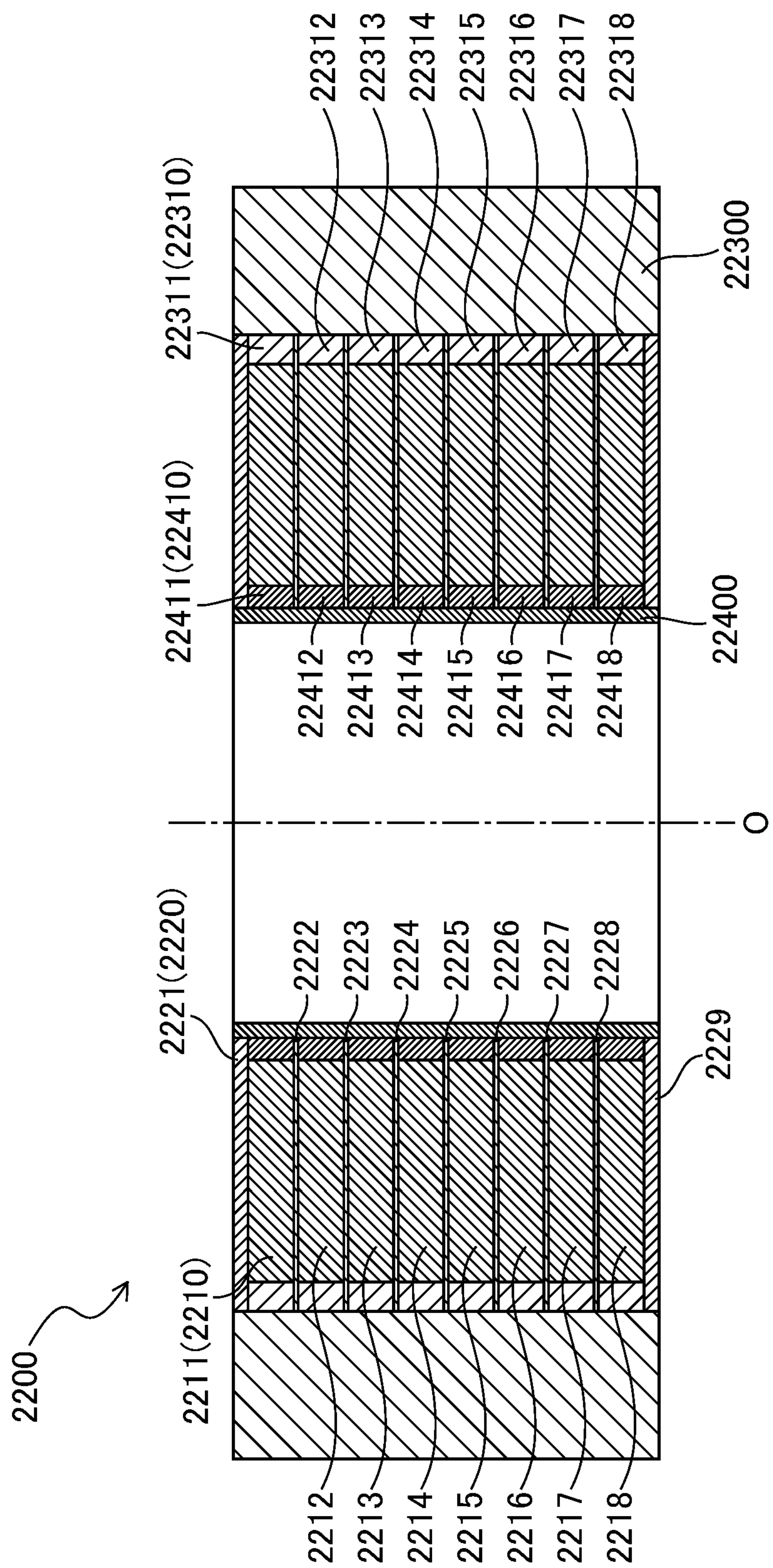
FIG. 22A is a cross-sectional view when cutting along the center axial line the oxide superconducting laminate magnet of the present invention according to one aspect of Example 10.

Next, the high strength reinforcing members comprised of the SUS316 rings, the inside outer circumference reinforcing rings, the ring-shaped superconducting bulk members, the outside inner circumference reinforcing rings, and the inside inner circumference reinforcing ring were inserted into the outside outer circumference reinforcing ring 22300 heated to a temperature at which the solder melts, the solder was made to evenly coat them, then the overall assembly was cooled to room temperature to thereby join the members. At this time the superconducting bulk members were stacked while offsetting their a-axes in the crystallographic orientation of the superconducting phase by about 7°. FIG. 22A shows a cross-sectional view of the obtained donut-shaped oxide superconducting bulk laminate (present invention (1)).

Further, two thickness 1.0 mm and seven thickness 0.3 mm SUS316 sheets were worked to prepare outside diameter 62.0 mm, inside diameter 32.0 mm ring-shaped high strength reinforcing member. Their surfaces were lightly coated with solder in advance. For the outer circumference reinforcing ring, a SUS314 outside diameter 86.0 mm, inside diameter 62.05 mm, height 28.8 mm ring was used. Its inner circumferential surface was also lightly coated with solder. Furthermore, for the SUS314 inner circumference ring, one outside diameter 31.95 mm, inside diameter 27.0 mm, height 28.8 mm ring was prepared. Its outer circumferential surface was also lightly coated with solder.

Figure 22B:
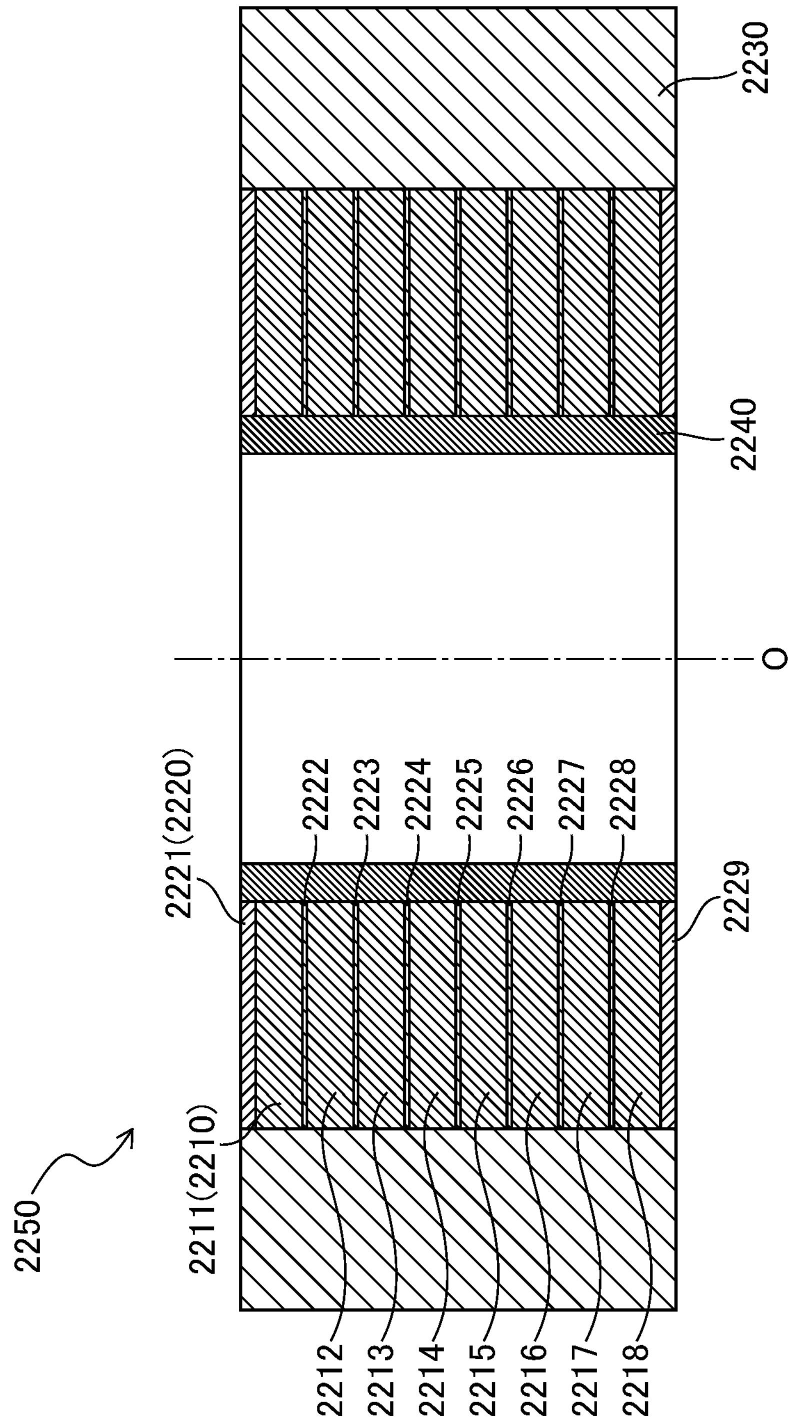
FIG. 22B is a cross-sectional view when cutting the oxide superconducting laminate magnet of the present invention along the center axial line according to another aspect of Example 10.

Next, the high strength reinforcing member comprised of the SUS316 rings, ring-shaped superconducting bulk members, and inner circumference reinforcing ring were inserted into the outside outer circumference reinforcing ring 2230 heated to a temperature at which the solder melts, the solder was made to evenly coat them, then the overall assembly was cooled to room temperature to thereby join the members. At this time the superconducting bulk members were stacked while offsetting their a-axes in the crystallographic orientation of the superconducting phase by about 7°. FIG. 22B shows a cross-sectional view of the obtained donut-shaped oxide superconducting bulk laminate (present invention (2)).

Figure 22C:
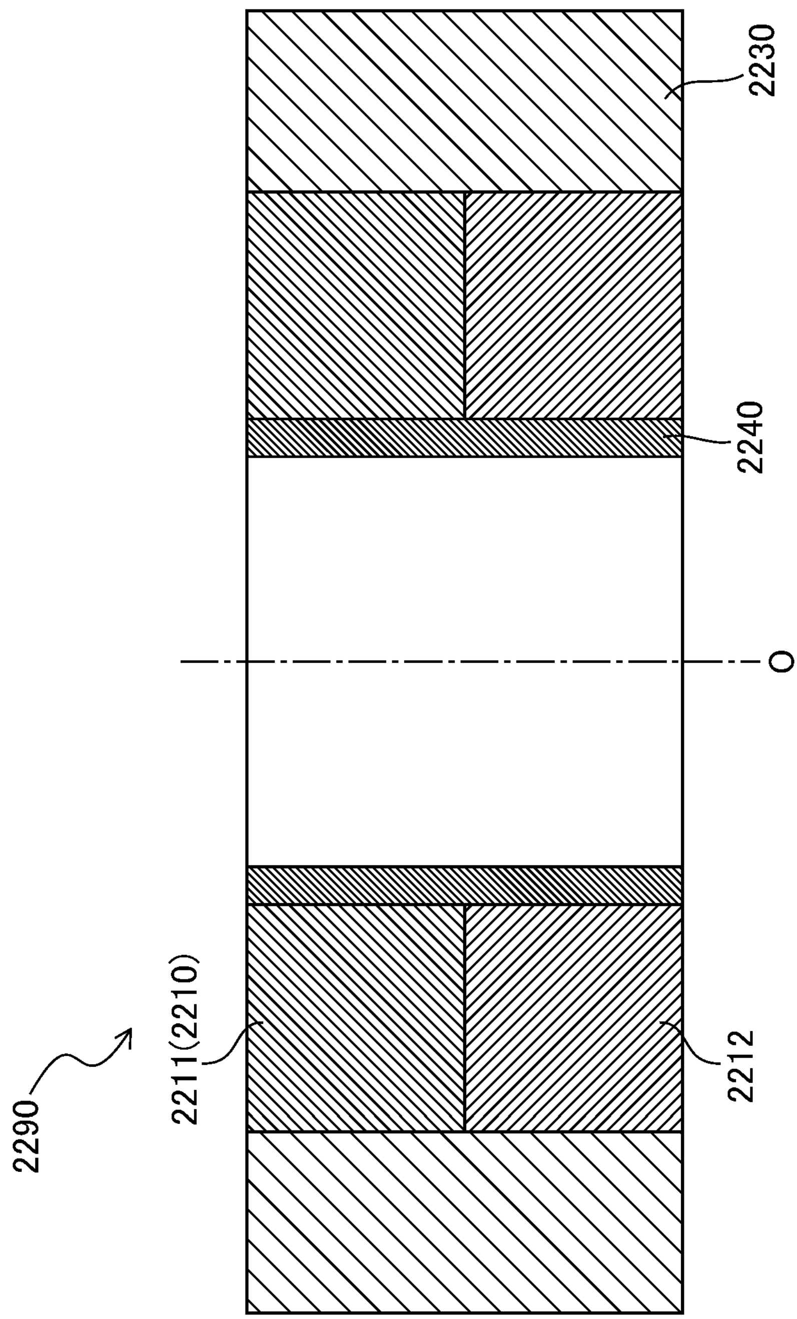
FIG. 22C is a cross-sectional view when cutting along the center axial line the oxide superconducting laminate magnet of the comparative example according to Example 10.

Next, as a comparative member, from a single-crystal form oxide superconducting bulk member prepared in the same way as explained above, two outside diameter 62.0 mm, inside diameter 32.0 mm, height 14.3 mm rings were prepared in the same way as explained above. These were placed in an SUS314 outside diameter 86.0 mm, inside diameter 62.05 mm, height 28.8 mm outer circumference reinforcing ring prepared in the same way as explained above. Furthermore, an SUS314 outside diameter 31.95 mm, inside diameter 27.0 mm, height 28.8 mm inner circumference reinforcing ring was placed inside the superconducting bulk members and joined in the same way as explained above using solder to thereby prepare a comparative member donut-shaped oxide superconducting bulk laminate (comparative member). A cross-sectional view of this is shown in FIG. 22C.

The obtained superconducting bulk magnets (present invention (1), present invention (2), and comparative member) were placed at room temperature in an 8.0 T magnetic field, then were cooled to 40K using a refrigerating machine, then the external magnetic field was demagnetized by 0.05 T/min in speed until a zero magnetic field. As a result, at the axial center parts of the superconducting bulk magnets, in the present invention (1) and the present invention (2), 7.95 T was trapped without cracking, but in the comparative member, cracks were confirmed in the superconducting bulk member when the superconducting bulk member was examined at room temperature after the magnetization test.

Next, the present invention (1) and the present invention (2) were placed in a 11.0 T magnetic field, then were cooled to 40K using a refrigerating machine, then the external magnetic field was demagnetized by 0.05 T/min in speed until zero magnetic field. As a result, at the axial center part of the superconducting bulk magnet, in the present invention (1), 10.9 T was trapped without cracking, but in the present invention (2), after the magnetization tests when examining the superconducting bulk member at room temperature, cracks were confirmed in the superconducting bulk member.

From these tests, it became clear that by placing high strength reinforcing members between ring-shaped oxide superconducting bulk members and, furthermore, placing two-layer inner circumference and outer circumference reinforcing rings and joining or bonding top and bottom oxide superconducting bulk members, an oxide superconducting bulk magnet having a high trapped magnetic flux density is obtained without a superconducting bulk member cracking.

Table 7 (Table 7-1, Table 7-2, and Table 7-3 will be referred to all together as "Table 7") shows the results of the magnetization tests for the above-mentioned Example 10. At the time of the magnetization tests, ring-shaped oxide superconducting bulk members, high strength reinforcing members, and outer circumference reinforcing rings used as the present invention (1), the present invention (2), and comparative example in the tests described in Table 7 were prepared. For the ring-shaped oxide superconducting bulk members, diameter 70 mm single-crystal form oxide superconducting bulk members prepared in the same way as the above-mentioned Example 10 were worked into ring shapes of different thicknesses described in Table 4 to prepare ring-shaped oxide superconducting bulk members. Further, for the high strength reinforcing members as well, these were worked from sheets of the materials and thicknesses described in Table 7. Furthermore, for the outer circumference reinforcing rings as well, rings of the materials and sizes described in Table 7 were worked.

TABLE 7-1

| | | Manufacturing conditions | | | | | | | | | | |
|---|---|---|---|---|---|---|---|---|---|---|---|---|
| | | High strength member | | | | | | Ring-shaped oxide superconducting bulk member | | | | |
| Test no. | | Material | Thickness (mm) | Outside diameter (mm) | Inside diameter (mm) | No. | Presence of top and bottom surfaces | Thickness (mm) | Outside diameter (mm) | Inside diameter (mm) | No. | Presence of top and bottom surfaces |
| 10-1 | Present invention (1) | SUS316 | 1.0 | 66.0 | 29.0 | 2 | Top and bottom surface | 3.0 | 62.0 | 32.0 | 8 | None |
| | | | 0.3 | 66.0 | 29.0 | 7 | — | | | | | |
| | Present invention (2) | SUS316 | 1.0 | 62.0 | 32.0 | 2 | Top and bottom surface | 3.0 | 62.0 | 32.0 | 8 | None |
| | | | 0.3 | 62.0 | 32.0 | 7 | — | | | | | |
| | Comp. member | — | — | — | — | — | — | 14.3 | 62.0 | 32.0 | 2 | Top and bottom surface |
| 10-2 | Present invention (1) | Oxygen-free copper | 0.8 | 66.0 | 29.0 | 2 | Top and bottom surface | 3.0 | 62.0 | 32.0 | 9 | None |
| | | Nichrome | 0.2 | 66.0 | 29.0 | 8 | — | | | | | |
| | Present invention (2) | Oxygen-free copper | 0.8 | 62.0 | 32.0 | 2 | Top and bottom surface | 3.0 | 62.0 | 32.0 | 9 | None |
| | | Nichrome | 0.2 | 62.0 | 32.0 | 8 | — | | | | | |
| | Comp. member | — | — | — | — | — | — | 14.0 | 62.0 | 32.0 | 2 | Top and bottom surface |
| 10-3 | Present invention (1) | Oxygen-free copper | 1.5 | 66.0 | 27.0 | 2 | Top and bottom surface | 2.5 | 62.0 | 30.0 | 12 | None |
| | | SUS316 | 0.3 | 66.0 | 27.0 | 11 | — | | | | | |
| | Present invention (2) | Oxygen-free copper | 1.5 | 62.0 | 30.0 | 2 | Top and bottom surface | 2.5 | 62.0 | 30.0 | 12 | None |
| | | SUS316 | 0.3 | 62.0 | 30.0 | 11 | — | | | | | |
| | Comp. member | — | — | — | — | — | — | 18.4 | 62.0 | 30.0 | 2 | Top and bottom surface |
| 10-4 | Present invention (1) | Oxygen-free copper | 2.0 | 66.0 | 27.0 | 2 | Top and bottom surface | 2.0 | 62.0 | 30.0 | 10 | None |
| | | SUS314 | 0.4 | 66.0 | 27.0 | 9 | — | | | | | |
| | Present invention (2) | Oxygen-free copper | 2.0 | 62.0 | 30.0 | 2 | Top and bottom surface | 2.0 | 62.0 | 30.0 | 10 | None |
| | | SUS314 | 0.4 | 62.0 | 30.0 | 9 | — | | | | | |
| | Comp. member | — | — | — | — | — | — | 14.0 | 62.0 | 30.0 | 2 | Top and bottom surface |

TABLE 7-2

| | | Manufacturing conditions Outer circumference reinforcing ring | | | | | | | | | |
|---|---|---|---|---|---|---|---|---|---|---|---|
| | | Inside | | | | | Outside | | | | |
| Test no. | | Material | Height (mm) | Outside diameter (mm) | Inside diameter (mm) | No. | Material | Height (mm) | Outside diameter (mm) | Inside diameter (mm) | No. |
| 10-1 | Present invention (1) | SUS314 | 3.0 | 66.0 | 62.05 | 8 | SUS314 | 28.8 | 86.0 | 66.05 | 1 |
| | Present invention (2) | — | — | — | — | — | SUS314 | 28.8 | 86.0 | 62.05 | 1 |
| | Comp. member | — | — | — | — | — | SUS314 | 28.8 | 86.0 | 62.05 | 1 |
| 10-2 | Present invention (1) | Oxygen-free copper | 3.0 | 66.0 | 62.05 | 9 | SUS316 | 31.0 | 86.0 | 66.05 | 1 |

TABLE 7-2-continued

| | | | | | | | | | | | |
|---|---|---|---|---|---|---|---|---|---|---|---|
| | Present invention (2) | — | — | — | — | — | SUS316 | 31.0 | 86.0 | 62.05 | 1 |
| | Comp. member | — | — | — | — | — | SUS316 | 31.0 | 86.0 | 62.05 | 1 |
| 10-3 | Present invention (1) | Phosphorus deoxidized copper | 2.5 | 66.0 | 62.05 | 12 | Aluminum alloy | 37.0 | 96.0 | 66.05 | 1 |
| | Present invention (2) | — | — | — | — | — | Aluminum alloy | 37.0 | 96.0 | 62.05 | 1 |
| | Comp. member | — | — | — | — | — | Aluminum alloy | 37.0 | 96.0 | 62.05 | 1 |
| 10-4 | Present invention (1) | Aluminum alloy | 2.5 | 66.0 | 62.05 | 10 | Aluminum alloy | 37.0 | 96.0 | 66.05 | 1 |
| | Present invention (2) | — | — | — | — | — | Aluminum alloy | 37.0 | 96.0 | 62.05 | 1 |
| | Comp. member | — | — | — | — | — | Aluminum alloy | 37.0 | 96.0 | 62.05 | 1 |

| | | Manufacturing conditions Inner circumference reinforcing ring | | | | | | | | | |
|---|---|---|---|---|---|---|---|---|---|---|---|
| | | Outside | | | | | Inside | | | | |
| Test no. | | Material | Height (mm) | Outside diameter (mm) | Inside diameter (mm) | No. | Material | Height (mm) | Outside diameter (mm) | Inside diameter (mm) | No. |
| 10-1 | Present invention (1) | Nichrome | 3.0 | 31.95 | 29.0 | 8 | SUS314 | 28.8 | 28.95 | 27.0 | 1 |
| | Present invention (2) | — | — | — | — | — | SUS314 | 28.8 | 31.95 | 27.0 | 1 |
| | Comp. member | — | — | — | — | — | SUS314 | 28.8 | 31.95 | 27.0 | 1 |
| 10-2 | Present invention (1) | SUS314 | 3.0 | 31.95 | 29.0 | 9 | SUS316 | 31.0 | 28.95 | 27.0 | 1 |
| | Present invention (2) | — | — | — | — | — | SUS316 | 31.0 | 31.95 | 27.0 | 1 |
| | Comp. member | — | — | — | — | — | SUS316 | 31.0 | 31.95 | 27.0 | 1 |
| 10-3 | Present invention (1) | SUS316 | 2.5 | 29.95 | 27.0 | 12 | SUS316 | 37.0 | 26.95 | 25.0 | 1 |
| | Present invention (2) | — | — | — | — | — | SUS316 | 37.0 | 29.95 | 25.0 | 1 |
| | Comp. member | — | — | — | — | — | SUS316 | 37.0 | 29.95 | 25.0 | 1 |
| 10-4 | Present invention (1) | Oxygen-free copper | 2.5 | 29.95 | 27.0 | 10 | Oxygen-free copper | 37.0 | 26.95 | 25.0 | 1 |
| | Present invention (2) | — | — | — | — | — | Oxygen-free copper | 37.0 | 29.95 | 25.0 | 1 |
| | Comp. member | — | — | — | — | — | Oxygen-free copper | 37.0 | 29.95 | 25.0 | 1 |

TABLE 7-3

| Test no. | | Magnetization test (1): Magnetization conditions: Applied magnetic field (T) | Magnetization test (1): Magnetization conditions: Magnetization temperature (K) | Magnetization test (1): Magnetization conditions: Demagnetization rate (T/min) | Magnetization test (1): Magnetization results: Presence of cracking | Magnetization test (1): Magnetization results: Trapped magnetic flux density (T) | Magnetization test (2): Magnetization conditions: Applied magnetic field (T) | Magnetization test (2): Magnetization conditions: Magnetization temperature (K) | Magnetization test (2): Magnetization conditions: Demagnetization rate (T/min) | Magnetization test (2): Magnetization results: Presence of cracking | Magnetization test (2): Magnetization results: Trapped magnetic flux density (T) |
|---|---|---|---|---|---|---|---|---|---|---|---|
| 10-1 | Present invention (1) | 8.0 | 40.0 | 0.05 | None | 7.95 | 11.0 | 40.0 | 0.05 | None | 10.9 |
| | Present invention (2) | 8.0 | 40.0 | 0.05 | None | 7.95 | 11.0 | 40.0 | 0.05 | Yes | — |
| | Comp. member | 8.0 | 40.0 | 0.05 | Yes | — | — | — | — | — | — |
| 10-2 | Present invention (1) | 8.5 | 20.0 | 0.20 | None | 8.45 | 11.0 | 20.0 | 0.20 | None | 10.95 |
| | Present invention (2) | 8.5 | 20.0 | 0.20 | None | 8.45 | 11.0 | 20.0 | 0.20 | Yes | — |
| | Comp. member | 8.5 | 20.0 | 0.20 | Yes | — | — | — | — | — | — |
| 10-3 | Present invention (1) | 8.0 | 30.0 | 0.15 | None | 7.95 | 11.5 | 30.0 | 0.15 | None | 11.45 |
| | Present invention (2) | 8.0 | 30.0 | 0.15 | None | 7.95 | 11.5 | 30.0 | 0.15 | Yes | — |
| | Comp. member | 8.0 | 30.0 | 0.15 | Yes | — | — | — | — | — | — |
| 10-4 | Present invention (1) | 8.0 | 55.0 | 0.20 | None | 7.3 | 12.0 | 55.0 | 0.20 | None | 10.5 |
| | Present invention (2) | 8.0 | 55.0 | 0.20 | None | 7.3 | 12.0 | 55.0 | 0.20 | Yes | — |
| | Comp. member | 8.0 | 55.0 | 0.20 | Yes | — | — | — | — | — | — |

These ring-shaped oxide superconducting bulk members, high strength reinforcing members, and outer circumference reinforcing rings were joined to prepare the oxide superconducting bulk magnets used in the tests. For assembly of the bulk magnets of the present inventions and comparative example of the embodiments, solder was used. When using solder for assembly, in the same way as the above-mentioned examples, the superconducting bulk members and high strength reinforcing members were alternately inserted into outer circumference reinforcing rings 2230 heated on a hot plate to a temperature at which the solder melts, the solder was made to evenly coat them, and the overall assemblies were cooled to room temperature to thereby join the members and prepare superconducting bulk magnets 2200.

The magnetization tests for evaluating the performance were conducted under the magnetization conditions shown in Table 7. The results of the magnetization tests, as shown in Table 7, were that in bulk magnets having inner circumference reinforcing rings, at 10 T or less magnetization conditions, superconducting bulk magnets having high strength reinforcing members alternately stacked and joined did not crack, while in the comparative member not having high strength reinforcing members alternately stacked, cracks occurred. Further, it became clear that at 11 T or more magnetization conditions, even in superconducting bulk magnets having two-layer outer circumference and inner circumference ring structures and joining the high strength reinforcing members more strongly, no cracks formed and a stronger magnetic field could be generated.

Above, preferred embodiments of the present invention were explained in detail while referring to the attached drawings, but the present invention is not limited to these. It is clear that a person with ordinary skill in the field of art to which the present invention belongs could conceive of various modifications or corrections within the scope of the technical idea described in the claims. It will be understood that these also naturally fall in the technical scope of the present invention.

REFERENCE SIGNS LIST

100, 100A, 100B, 100C. oxide superconducting bulk magnet
110. superconducting bulk member
120 high strength reinforcing member
130. outer circumference reinforcing ring
600. oxide superconducting bulk magnet
610. superconducting bulk member
620. high strength reinforcing member
630. outer circumference reinforcing ring
700. oxide superconducting bulk magnet
710. superconducting bulk member
720. high strength reinforcing member
730. outer circumference reinforcing ring
740. outside outer circumference reinforcing ring

800. oxide superconducting bulk magnet
810. superconducting bulk member
820. high strength reinforcing member
830. outer circumference reinforcing ring
900. oxide superconducting bulk magnet
910. ring-shaped oxide superconducting bulk member
920. high strength reinforcing member
930. outer circumference reinforcing ring
1000. oxide superconducting bulk magnet
1010. ring-shaped oxide superconducting bulk member
1020. high strength reinforcing member
1030. outer circumference reinforcing ring
1100. oxide superconducting bulk magnet
1110. ring-shaped oxide superconducting bulk member
1120. high strength reinforcing member
1130. outer circumference reinforcing ring
1200. oxide superconducting bulk magnet
1210. ring-shaped oxide superconducting bulk member
1220. high strength reinforcing member
1230. outer circumference reinforcing ring
1300. oxide superconducting bulk magnet
1310. ring-shaped oxide superconducting bulk member
1320. high strength reinforcing member
1330. outer circumference reinforcing ring
1340. outer circumference reinforcing ring
1400. oxide superconducting bulk magnet
1410. ring-shaped oxide superconducting bulk member
1420. high strength reinforcing member
1430. inside outer circumference reinforcing ring
1440. outside outer circumference reinforcing ring
1450. outside inner circumference reinforcing ring
1460. inside inner circumference reinforcing ring
1510. ring-shaped oxide superconducting bulk member
1600. oxide superconducting bulk magnet
1610. ring-shaped oxide superconducting bulk member
**1610*a*, 1610*b*, 1610*c*, 1610*d*, 1610*e*** ring (oxide superconducting bulk member)
1613. gap
1615. connecting part
1620. high strength reinforcing member
1630. outer circumference reinforcing ring
1700. oxide superconducting bulk magnet (Example 5)
1710. ring-shaped oxide superconducting bulk member
1720. high strength reinforcing member
1730. outer circumference reinforcing ring
1800. oxide superconducting bulk magnet (Example 6)
1810. ring-shaped oxide superconducting bulk member
1820. high strength reinforcing member
1830. outer circumference reinforcing ring
1900. oxide superconducting bulk magnet (Example 7)
1910. ring-shaped oxide superconducting bulk member
1920. high strength reinforcing member
1930. outer circumference reinforcing ring
1940. inner circumference reinforcing ring
2000. oxide superconducting bulk magnet (Example 8)
2010. ring-shaped oxide superconducting bulk member
2020. high strength reinforcing member
2030. outer circumference reinforcing ring
2040. inner circumference reinforcing ring
2100. oxide superconducting bulk magnet (Example 9)
2110. ring-shaped oxide superconducting bulk member
2111 inside ring of ring-shaped oxide superconducting bulk member
2112 outside ring of ring-shaped oxide superconducting bulk member
2120. high strength reinforcing member
2130. outer circumference reinforcing ring
2140. inner circumference reinforcing ring
2200. oxide superconducting bulk magnet (Example 10 FIG. 22A)
2250. oxide superconducting bulk magnet (Example 10 FIG. 22B)
2290. oxide superconducting bulk magnet (Example 10 FIG. 22C)
2210. ring-shaped oxide superconducting bulk member
2220. high strength reinforcing member
22300. outside outer circumference reinforcing ring
22310. inside outer circumference reinforcing ring
22400. inside inner circumference reinforcing ring
22410. outside inner circumference reinforcing ring
2230. outer circumference reinforcing ring
2240. inner circumference reinforcing ring
O. center axial lines of oxide superconducting bulk members and outer circumference reinforcing rings

The invention claimed is:

1. An oxide superconducting bulk magnet comprising an oxide superconducting bulk laminate including a plurality of sheet-shaped oxide superconducting bulk members each made of a single-crystal form $RE_1Ba_2Cu_3O_y$ (RE is one or more elements selected from Y or rare earth elements, where $6.8 \le y \le 7.1$) in which $RE_2BaCuO_5$ is dispersed, and including one or more high strength reinforcing members arranged between stacked oxide superconducting bulk members and one or more outer circumference reinforcing members provided at an outer circumference of the oxide superconducting bulk laminate, wherein the oxide superconducting bulk members is joined or bonded with the high strength reinforcing members, the high strength reinforcing member is joined or bonded with the outer circumference reinforcing member, and the high strength reinforcing member has a tensile strength at room temperature of 80 MPa or more.

2. The oxide superconducting bulk magnet according to claim 1, wherein the outer circumference reinforcing member is divided into a plurality of sections in a stacking direction of the oxide superconducting bulk laminate.

3. The oxide superconducting bulk magnet according to claim 2, wherein the adjoining outer circumference reinforcing members are arranged across the high strength reinforcing member.

4. The oxide superconducting bulk magnet according to claim 1, wherein the high strength reinforcing member is arranged at least at one of a topmost surface and a bottommost surface of the oxide superconducting bulk laminate.

5. The oxide superconducting bulk magnet according to claim 4, wherein at least one of the high strength reinforcing members arranged at the topmost surface and the bottommost surface of the oxide superconducting bulk laminate has a thickness greater than a thickness of the high strength reinforcing member arranged between the oxide superconducting bulk members.

6. The oxide superconducting bulk magnet according to claim 4, wherein the high strength reinforcing members arranged at the topmost surface and the bottommost surface of the oxide superconducting bulk laminate are bonded or joined with the outer circumference reinforcing member.

7. The oxide superconducting bulk magnet according to claim 1, further comprising a second outer circumference reinforcing member at an outside of the outer circumference reinforcing member.

8. The oxide superconducting bulk magnet according to claim 7, wherein the second outer circumference reinforcing member has a tensile strength at room temperature of 80 MPa or more.

9. The oxide superconducting bulk magnet according to claim 7, wherein the second outer circumference reinforcing member has a thermal conductivity of 20 W/(m·K) or more.

10. The oxide superconducting bulk magnet according to claim 1, wherein the oxide superconducting bulk members and a high strength reinforcing member are ring shaped and the oxide superconducting bulk laminate is a donut-shaped structure.

11. The oxide superconducting bulk magnet according to claim 10, wherein an inner circumference reinforcing member is provided integrally at an inner circumference of the oxide superconducting bulk laminate.

12. The oxide superconducting bulk magnet according to claim 10, wherein an inner circumference reinforcing member divided into a plurality of sections in the stacking direction of the oxide superconducting bulk laminate is provided at an inner circumference of the oxide superconducting bulk laminate.

13. The oxide superconducting bulk magnet according to claim 12, wherein the adjoining inner circumference reinforcing members are arranged across the high strength reinforcing member.

14. The oxide superconducting bulk magnet according to claim 11, wherein the inner circumference reinforcing member has a tensile strength at room temperature of 80 MPa or more.

15. The oxide superconducting bulk magnet according to claim 11, wherein the inner circumference reinforcing member has a thermal conductivity of 20 W/(m·K) or more.

16. The oxide superconducting bulk magnet according to claim 11, wherein the high strength reinforcing member is joined or bonded to at least one of the topmost surface and the bottommost surface of the oxide superconducting bulk laminate and wherein the high strength reinforcing member is also joined or bonded to the inner circumference reinforcing member provided at an inner circumference of the oxide superconducting bulk laminate.

17. The oxide superconducting bulk magnet according to claim 11, further comprising a second inner circumference reinforcing member at an inside of the inner circumference reinforcing member.

18. The oxide superconducting bulk magnet according to claim 17, wherein the second inner circumference reinforcing member has a tensile strength at room temperature of 80 MPa or more.

19. The oxide superconducting bulk magnet according to claim 17, wherein the second inner circumference reinforcing member has a thermal conductivity of 20 W/(m·K) or more.

20. The oxide superconducting bulk magnet according to claim 10, wherein the oxide superconducting bulk members are stacked so that the c-axial directions of the crystal axes substantially match the inner circumferential axes of the oxide superconducting bulk members and the a-axial directions of the crystal axes are offset between the oxide superconducting bulk members by within a predetermined angular range.

21. The oxide superconducting bulk magnet according, to claim 10, wherein the ring-shaped oxide superconducting bulk members at the donut-shaped oxide superconducting bulk laminate have multi-layer ring structures with matching inner circumferential axes.

22. The oxide superconducting bulk magnet according to claim 1, wherein the oxide superconducting bulk members are joined or bonded with the outer circumference reinforcing member.

23. The oxide superconducting bulk magnet according to claim 1, wherein the high strength reinforcing member has a thermal conductivity of 20 W/(m·K) or more.

24. The oxide superconducting bulk magnet according to claim 1, wherein the outer circumference reinforcing member is provided integrally with the outer circumference of the oxide superconducting bulk laminate.

25. The oxide superconducting bulk magnet according to claim 1, wherein the outer circumference reinforcing member has a tensile strength at room temperature of 80 MPa or more.

26. The oxide superconducting bulk magnet according to claim 1, wherein the outer circumference reinforcing member has a thermal conductivity of 20 W/(m·K) or more.

* * * * *